(12) United States Patent
Schleif et al.

(10) Patent No.: US 12,187,127 B2
(45) Date of Patent: Jan. 7, 2025

(54) OFF-ROAD VEHICLE

(71) Applicant: Polaris Industries Inc., Medina, MN (US)

(72) Inventors: Andrew C. Schleif, Stacy, MN (US); Paul W. Barton, Warwickshire (GB); Ralph W. Lauzze, III, Hugo, MN (US); Robert C. Wilmot, Stacy, MN (US); Anthony J. Ripley, Ham Lake, MN (US); Brian R. Gillingham, Osceola, WI (US)

(73) Assignee: Polaris Industries Inc., Medina, MN (US)

( * ) Notice: Subject to any disclaimer, the term of this patent is extended or adjusted under 35 U.S.C. 154(b) by 0 days.

(21) Appl. No.: 16/875,448

(22) Filed: May 15, 2020

(65) Prior Publication Data
US 2021/0354542 A1 Nov. 18, 2021

(51) Int. Cl.
| | |
|---|---|
| *B60K 5/04* | (2006.01) |
| *B60K 5/02* | (2006.01) |
| *B60K 13/02* | (2006.01) |
| *B60K 13/04* | (2006.01) |
| *B60K 17/00* | (2006.01) |
| *B60K 17/06* | (2006.01) |
| *B60K 17/22* | (2006.01) |
| *F02B 37/00* | (2006.01) |

(Continued)

(52) U.S. Cl.
CPC ............... *B60K 5/02* (2013.01); *B60K 5/04* (2013.01); *B60K 13/02* (2013.01); *B60K 13/04* (2013.01); *B60K 17/00* (2013.01); *B60K 17/06* (2013.01); *B60K 17/22* (2013.01); *F02B 37/00* (2013.01); *F02F 7/0021* (2013.01); *F16H 9/16* (2013.01)

(58) Field of Classification Search
CPC ............ B60K 5/02; B60K 5/04; B60K 13/02; B60K 13/04; B60K 17/00; B60K 17/06; B60K 17/22; F02F 7/0021; F16H 9/16
See application file for complete search history.

(56) References Cited

U.S. PATENT DOCUMENTS

| | | | |
|---|---|---|---|
| 1,521,976 | A | 1/1925 | Swain |
| 1,989,585 | A | 1/1935 | Bigelow |

(Continued)

FOREIGN PATENT DOCUMENTS

| | | |
|---|---|---|
| CA | 317335 | 11/1956 |
| CA | 1163510 A | 3/1984 |

(Continued)

OTHER PUBLICATIONS

RideNow Powersports, "2017 Can-Am Maverick X3 Walk Around", Sep. 14, 2016, YouTube.com. https://www.youtube.com/watch?v=5I0sIScF-y4 (Year: 2016).*

(Continued)

*Primary Examiner* — Bryan A Evans
(74) *Attorney, Agent, or Firm* — Faegre Drinker Biddle & Reath LLP

(57) ABSTRACT

A vehicle shown herein is a side by side utility vehicle having a powertrain an engine with at least three cylinders, an intake and an exhaust, where the intake is forward of the engine and the exhaust is rearward of the engine. The vehicle may further or alternatively include an engine block configured to couple with various transmissions without alteration of the engine block itself.

24 Claims, 39 Drawing Sheets

(51) Int. Cl.
*F02F 7/00* (2006.01)
*F16H 9/16* (2006.01)

(56) References Cited

U.S. PATENT DOCUMENTS

| | | |
|---|---|---|
| D119,377 S | 3/1940 | Cadwallader |
| 2,525,131 A | 10/1950 | Hallett |
| 2,553,795 A | 5/1951 | Staude |
| 2,623,612 A | 12/1952 | Scheiterlein |
| 2,624,592 A | 1/1953 | Macpherson |
| 2,660,449 A | 11/1953 | Macpherson |
| 2,672,103 A | 3/1954 | Hohmes |
| 2,795,962 A | 6/1957 | Uher |
| 2,839,038 A | 6/1958 | Middlebrooks, Jr. |
| 2,986,130 A | 5/1961 | Cyril |
| 3,048,233 A | 8/1962 | Crain et al. |
| 3,400,607 A | 9/1968 | Smith |
| 3,422,918 A | 1/1969 | Musser et al. |
| 3,508,764 A | 4/1970 | Dobson et al. |
| 3,523,592 A | 8/1970 | Fenton |
| 3,560,022 A | 2/1971 | Gold |
| 3,597,987 A | 8/1971 | Kiekhaefer |
| 3,605,511 A | 9/1971 | Deschene |
| 3,694,661 A | 9/1972 | Minowa |
| 3,727,478 A | 4/1973 | Deschene et al. |
| 3,733,918 A | 5/1973 | Domaas |
| 3,734,219 A | 5/1973 | Christensen et al. |
| 3,759,111 A | 9/1973 | Hoff et al. |
| 3,777,584 A | 12/1973 | Domaas |
| RE27,858 E | 1/1974 | Laughlin |
| 3,794,142 A | 2/1974 | Perreault |
| 3,858,902 A | 1/1975 | Howells et al. |
| 3,861,229 A | 1/1975 | Domaas |
| 3,868,862 A | 3/1975 | Bessette |
| 3,916,707 A | 11/1975 | Wells |
| 3,939,720 A | 2/1976 | Aaen et al. |
| 3,951,224 A | 4/1976 | Beaudoin et al. |
| 3,958,461 A | 5/1976 | Aaen et al. |
| 3,961,539 A | 6/1976 | Tremblay et al. |
| 3,962,927 A | 6/1976 | Beaudoin et al. |
| 3,968,702 A | 7/1976 | Beaudoin et al. |
| 3,971,263 A | 7/1976 | Beaudoin et al. |
| 4,010,725 A | 3/1977 | White |
| 4,010,975 A | 3/1977 | Horton |
| 4,022,272 A | 5/1977 | Miller |
| 4,027,892 A | 6/1977 | Parks |
| 4,046,403 A | 9/1977 | Yoshida |
| 4,061,187 A | 12/1977 | Rajasekaran et al. |
| 4,098,414 A | 7/1978 | Abiera |
| 4,150,655 A | 4/1979 | Forlai et al. |
| 4,159,835 A | 7/1979 | Leja et al. |
| 4,217,970 A | 8/1980 | Chika |
| 4,236,492 A | 12/1980 | Tholen |
| 4,284,158 A | 8/1981 | Schield |
| 4,284,408 A | 8/1981 | Boer et al. |
| 4,294,073 A | 10/1981 | Neff |
| 4,313,728 A | 2/1982 | Prasad |
| 4,337,406 A | 6/1982 | Binder |
| 4,344,718 A | 8/1982 | Taylor |
| 4,366,878 A | 1/1983 | Warf |
| 4,404,936 A | 9/1983 | Tatebe et al. |
| 4,434,755 A | 3/1984 | Kazuta et al. |
| 4,434,934 A | 3/1984 | Moser et al. |
| 4,458,491 A | 7/1984 | Deutschmann |
| 4,464,144 A | 8/1984 | Kobayashi |
| 4,470,389 A | 9/1984 | Mitadera et al. |
| 4,474,162 A | 10/1984 | Mason |
| 4,483,686 A | 11/1984 | Kobayashi et al. |
| 4,515,221 A | 5/1985 | van der Lely |
| 4,529,244 A | 7/1985 | Zaydel |
| 4,561,323 A | 12/1985 | Stromberg |
| 4,575,363 A | 3/1986 | Burgess et al. |
| 4,577,716 A | 3/1986 | Norton |
| 4,598,687 A | 7/1986 | Hayashi |
| D286,760 S | 11/1986 | Doba et al. |
| 4,630,446 A | 12/1986 | Iwai et al. |
| 4,638,172 A | 1/1987 | Williams |
| 4,650,210 A | 3/1987 | Hirose et al. |
| 4,671,521 A | 6/1987 | Talbot et al. |
| 4,685,430 A | 8/1987 | Ap |
| 4,686,433 A | 8/1987 | Shimizu |
| 4,688,529 A | 8/1987 | Mitadera et al. |
| 4,699,234 A | 10/1987 | Shinozaki et al. |
| 4,708,105 A | 11/1987 | Leydorf et al. |
| 4,712,629 A | 12/1987 | Takahashi et al. |
| 4,714,126 A | 12/1987 | Shinozaki et al. |
| 4,722,548 A | 2/1988 | Hamilton et al. |
| 4,732,244 A | 3/1988 | Verkuylen |
| 4,733,639 A | 3/1988 | Kohyama et al. |
| 4,779,895 A | 10/1988 | Rubel |
| 4,779,905 A | 10/1988 | To et al. |
| 4,798,399 A | 1/1989 | Cameron |
| 4,817,985 A | 4/1989 | Enokimoto et al. |
| 4,821,825 A | 4/1989 | Somerton-Rayner |
| 4,826,205 A | 5/1989 | Kouda et al. |
| 4,826,467 A | 5/1989 | Reese et al. |
| 4,827,416 A | 5/1989 | Kawagoe et al. |
| 4,828,017 A | 5/1989 | Watanabe et al. |
| 4,848,294 A | 7/1989 | Yamamoto |
| 4,867,474 A | 9/1989 | Smith |
| 4,890,510 A | 1/1990 | Inui |
| 4,890,586 A | 1/1990 | Fujii et al. |
| 4,898,261 A | 2/1990 | Winberg et al. |
| 4,907,552 A | 3/1990 | Martin |
| 4,924,959 A | 5/1990 | Handa et al. |
| 4,927,170 A | 5/1990 | Wada |
| 4,934,737 A | 6/1990 | Nakatsuka |
| 4,941,784 A | 7/1990 | Flament |
| D312,441 S | 11/1990 | Guelfi et al. |
| 4,973,082 A | 11/1990 | Kincheloe |
| D312,989 S | 12/1990 | Murata et al. |
| 5,010,970 A | 4/1991 | Yamamoto |
| 5,015,009 A | 5/1991 | Ohyama et al. |
| 5,016,903 A | 5/1991 | Kijima et al. |
| 5,018,490 A | 5/1991 | Martin |
| 5,020,616 A | 6/1991 | Yagi et al. |
| 5,021,721 A | 6/1991 | Oshita et al. |
| 5,024,460 A | 6/1991 | Hanson et al. |
| 5,027,915 A | 7/1991 | Suzuki et al. |
| 5,036,939 A | 8/1991 | Johnson et al. |
| 5,038,582 A | 8/1991 | Takamatsu |
| 5,044,614 A | 9/1991 | Rau |
| 5,062,654 A | 11/1991 | Kakimoto et al. |
| 5,062,657 A | 11/1991 | Majeed |
| 5,063,811 A | 11/1991 | Smith et al. |
| 5,076,383 A | 12/1991 | Inoue et al. |
| 5,078,223 A | 1/1992 | Ishiwatari et al. |
| 5,078,225 A | 1/1992 | Ohmura et al. |
| 5,080,392 A | 1/1992 | Bazergui |
| 5,086,858 A | 2/1992 | Mizuta et al. |
| D327,237 S | 6/1992 | Miyamoto et al. |
| 5,129,700 A | 7/1992 | Trevisan et al. |
| 5,163,538 A | 11/1992 | Derr et al. |
| 5,174,622 A | 12/1992 | Gutta |
| 5,181,696 A | 1/1993 | Abe |
| 5,189,615 A | 2/1993 | Rubel et al. |
| 5,195,607 A | 3/1993 | Shimada et al. |
| 5,205,371 A | 4/1993 | Karnopp |
| 5,209,703 A | 5/1993 | Mastine et al. |
| 5,212,431 A | 5/1993 | Origuchi et al. |
| 5,251,588 A | 10/1993 | Tsujii et al. |
| 5,251,713 A | 10/1993 | Enokimoto |
| 5,253,730 A | 10/1993 | Hayashi et al. |
| 5,255,733 A | 10/1993 | King |
| 5,264,764 A | 11/1993 | Kuang |
| 5,271,473 A | 12/1993 | Ikeda et al. |
| 5,326,330 A | 7/1994 | Bostelmann |
| 5,327,989 A | 7/1994 | Furuhashi et al. |
| 5,342,023 A | 8/1994 | Kuriki et al. |
| 5,358,450 A | 10/1994 | Robert |
| 5,359,247 A | 10/1994 | Baldwin et al. |
| D354,264 S | 1/1995 | McCoy |
| 5,382,833 A | 1/1995 | Wirges |
| 5,390,121 A | 2/1995 | Wolfe |

(56) References Cited

U.S. PATENT DOCUMENTS

| | | |
|---|---|---|
| 5,401,056 A | 3/1995 | Eastman |
| 5,407,130 A | 4/1995 | Jyeki et al. |
| 5,408,965 A | 4/1995 | Fulton et al. |
| 5,473,990 A | 12/1995 | Anderson et al. |
| 5,475,596 A | 12/1995 | Henry et al. |
| 5,483,448 A | 1/1996 | Liubakka et al. |
| 5,528,148 A | 6/1996 | Rogers |
| 5,529,544 A | 6/1996 | Berto |
| D373,099 S | 8/1996 | Molzon et al. |
| 5,546,901 A | 8/1996 | Acker et al. |
| 5,549,153 A | 8/1996 | Baruschke et al. |
| 5,549,428 A | 8/1996 | Yeatts |
| 5,550,445 A | 8/1996 | Nii |
| 5,550,739 A | 8/1996 | Hoffmann et al. |
| 5,558,057 A | 9/1996 | Everts |
| 5,562,555 A | 10/1996 | Peterson |
| 5,597,060 A | 1/1997 | Huddleston et al. |
| 5,614,809 A | 3/1997 | Kiuchi et al. |
| 5,621,304 A | 4/1997 | Kiuchi et al. |
| 5,647,534 A | 7/1997 | Kelz et al. |
| 5,647,810 A | 7/1997 | Huddleston |
| 5,653,304 A | 8/1997 | Renfroe |
| 5,676,292 A | 10/1997 | Miller |
| 5,678,847 A | 10/1997 | Izawa et al. |
| 5,692,983 A | 12/1997 | Bostelmann |
| D391,911 S | 3/1998 | Lagaay et al. |
| 5,738,062 A | 4/1998 | Everts et al. |
| 5,738,471 A | 4/1998 | Zentner et al. |
| 5,752,791 A | 5/1998 | Ehrlich |
| 5,776,568 A | 7/1998 | Andress et al. |
| 5,788,597 A | 8/1998 | Boll et al. |
| 5,795,255 A | 8/1998 | Hooper |
| 5,797,816 A | 8/1998 | Bostelmann |
| 5,816,650 A | 10/1998 | Lucas, Jr. |
| 5,820,114 A | 10/1998 | Tsai |
| 5,820,150 A | 10/1998 | Archer et al. |
| 5,855,386 A | 1/1999 | Atkins |
| 5,860,403 A | 1/1999 | Hirano et al. |
| 5,863,277 A | 1/1999 | Melbourne |
| 5,867,009 A | 2/1999 | Kiuchi et al. |
| 5,883,496 A | 3/1999 | Esaki et al. |
| 5,887,671 A | 3/1999 | Yuki et al. |
| 5,895,063 A | 4/1999 | Hasshi et al. |
| 5,921,343 A | 7/1999 | Yamakaji |
| 5,947,075 A | 9/1999 | Ryu et al. |
| 5,950,590 A | 9/1999 | Everts et al. |
| 5,950,750 A | 9/1999 | Dong et al. |
| 5,957,252 A | 9/1999 | Berthold |
| D414,735 S | 10/1999 | Gerisch et al. |
| 5,960,764 A | 10/1999 | Araki |
| 5,961,106 A | 10/1999 | Shaffer |
| 5,971,290 A | 10/1999 | Echigoya et al. |
| 5,975,573 A | 11/1999 | Belleau |
| 5,976,044 A | 11/1999 | Kuyama |
| 6,000,702 A | 12/1999 | Streiter |
| D421,934 S | 3/2000 | Hunter et al. |
| 6,032,752 A | 3/2000 | Karpik et al. |
| 6,041,744 A | 3/2000 | Oota et al. |
| 6,047,678 A | 4/2000 | Kurihara et al. |
| 6,062,024 A | 5/2000 | Zander et al. |
| 6,067,078 A | 5/2000 | Hartman |
| 6,068,295 A | 5/2000 | Skabrond et al. |
| 6,070,681 A | 6/2000 | Catanzarite et al. |
| 6,078,252 A | 6/2000 | Kulczycki et al. |
| 6,092,877 A | 7/2000 | Rasidescu et al. |
| 6,095,275 A | 8/2000 | Shaw |
| 6,098,739 A | 8/2000 | Anderson et al. |
| 6,112,866 A | 9/2000 | Boichot et al. |
| 6,113,328 A | 9/2000 | Clauchery |
| 6,114,784 A | 9/2000 | Nakano |
| 6,119,636 A | 9/2000 | Fan |
| 6,120,399 A | 9/2000 | Okeson et al. |
| 6,149,540 A | 11/2000 | Johnson et al. |
| 6,152,098 A | 11/2000 | Becker et al. |
| 6,176,796 B1 | 1/2001 | Lislegard |
| 6,184,603 B1 | 2/2001 | Hamai et al. |
| 6,186,547 B1 | 2/2001 | Skabrond et al. |
| 6,196,168 B1 | 3/2001 | Eckerskorn et al. |
| 6,196,634 B1 | 3/2001 | Jurinek |
| 6,198,183 B1 | 3/2001 | Baeumel et al. |
| 6,199,894 B1 | 3/2001 | Anderson |
| 6,202,993 B1 | 3/2001 | Wilms et al. |
| 6,203,043 B1 | 3/2001 | Lehman |
| 6,213,079 B1 | 4/2001 | Watanabe |
| 6,213,081 B1 | 4/2001 | Ryu et al. |
| 6,216,660 B1 | 4/2001 | Ryu et al. |
| 6,217,758 B1 | 4/2001 | Lee |
| 6,227,160 B1 | 5/2001 | Kurihara et al. |
| 6,249,728 B1 | 6/2001 | Streiter |
| 6,260,609 B1 | 7/2001 | Takahashi |
| 6,293,617 B1 | 9/2001 | Sukegawa |
| 6,301,993 B1 | 10/2001 | Orr et al. |
| 6,309,317 B1 | 10/2001 | Joss |
| 6,311,676 B1 | 11/2001 | Oberg et al. |
| 6,314,931 B1 | 11/2001 | Yasuda et al. |
| 6,328,004 B1 | 12/2001 | Rynhart |
| 6,333,620 B1 | 12/2001 | Schmitz et al. |
| 6,334,269 B1 | 1/2002 | Dilks |
| 6,338,688 B1 | 1/2002 | Minami et al. |
| 6,352,142 B1 | 3/2002 | Kim |
| 6,353,786 B1 | 3/2002 | Yamada et al. |
| 6,359,344 B1 | 3/2002 | Klein et al. |
| 6,362,602 B1 | 3/2002 | Kozarekar |
| 6,370,458 B1 | 4/2002 | Shal et al. |
| 6,394,061 B2 | 5/2002 | Ryu et al. |
| 6,397,795 B2 | 6/2002 | Hare |
| D461,151 S | 8/2002 | Morris |
| 6,467,787 B1 | 10/2002 | Marsh |
| D467,200 S | 12/2002 | Luo et al. |
| 6,504,259 B1 | 1/2003 | Kuroda et al. |
| 6,507,778 B2 | 1/2003 | Koh |
| 6,510,829 B2 | 1/2003 | Ito et al. |
| 6,510,891 B2 | 1/2003 | Anderson et al. |
| 6,520,133 B1 | 2/2003 | Wenger et al. |
| 6,520,878 B1 | 2/2003 | Leclair et al. |
| 6,523,634 B1 | 2/2003 | Gagnon et al. |
| D472,193 S | 3/2003 | Sinkwitz |
| 6,528,918 B2 | 3/2003 | Paulus-Neues et al. |
| 6,530,730 B2 | 3/2003 | Swensen |
| 6,543,523 B2 | 4/2003 | Hasumi |
| 6,547,224 B2 | 4/2003 | Jensen et al. |
| 6,553,761 B2 | 4/2003 | Beck |
| 6,557,515 B2 | 5/2003 | Furuya et al. |
| 6,561,315 B2 | 5/2003 | Furuya et al. |
| 6,582,002 B2 | 6/2003 | Hogan et al. |
| 6,582,004 B1 | 6/2003 | Hamm |
| D476,935 S | 7/2003 | Boyer |
| 6,591,896 B1 | 7/2003 | Hansen |
| 6,604,034 B1 | 8/2003 | Speck et al. |
| 6,622,804 B2 | 9/2003 | Schmitz et al. |
| 6,622,968 B1 | 9/2003 | St et al. |
| 6,626,260 B2 | 9/2003 | Gagnon et al. |
| 6,640,766 B2 | 11/2003 | Furuya et al. |
| 6,648,569 B2 | 11/2003 | Douglass et al. |
| 6,659,566 B2 | 12/2003 | Bombardier |
| 6,661,108 B1 | 12/2003 | Yamada et al. |
| 6,675,562 B2 | 1/2004 | Lawrence |
| 6,685,174 B2 | 2/2004 | Behmenburg et al. |
| 6,691,767 B2 | 2/2004 | Southwick et al. |
| 6,695,566 B2 | 2/2004 | Rodriguez Navio |
| 6,702,052 B1 | 3/2004 | Wakashiro et al. |
| 6,725,905 B2 | 4/2004 | Hirano et al. |
| 6,725,962 B1 | 4/2004 | Fukuda |
| D490,018 S | 5/2004 | Berg et al. |
| 6,732,830 B2 | 5/2004 | Gagnon et al. |
| 6,752,235 B1 | 6/2004 | Bell et al. |
| 6,752,401 B2 | 6/2004 | Burdock |
| 6,761,748 B2 | 7/2004 | Schenk et al. |
| 6,767,022 B1 | 7/2004 | Chevalier |
| D493,749 S | 8/2004 | Duncan |
| 6,769,391 B1 | 8/2004 | Lee et al. |
| 6,772,824 B1 | 8/2004 | Tsuruta |
| 6,777,846 B2 | 8/2004 | Feldner et al. |
| 6,786,187 B2 | 9/2004 | Nagai et al. |

(56) References Cited

U.S. PATENT DOCUMENTS

| | | |
|---|---|---|
| 6,786,526 B1 | 9/2004 | Blalock |
| D497,324 S | 10/2004 | Chestnut et al. |
| D497,327 S | 10/2004 | Lai |
| 6,799,779 B2 | 10/2004 | Shibayama |
| 6,799,781 B2 | 10/2004 | Rasidescu et al. |
| 6,809,429 B1 | 10/2004 | Frank |
| D498,435 S | 11/2004 | Saito et al. |
| 6,810,667 B2 | 11/2004 | Jung et al. |
| 6,810,977 B2 | 11/2004 | Suzuki |
| 6,820,583 B2 | 11/2004 | Maier |
| 6,820,708 B2 | 11/2004 | Nakamura |
| 6,822,353 B2 | 11/2004 | Koga et al. |
| 6,825,573 B2 | 11/2004 | Suzuki et al. |
| 6,827,184 B1 | 12/2004 | Lin |
| 6,834,736 B2 | 12/2004 | Kramer et al. |
| D500,707 S | 1/2005 | Lu |
| D501,570 S | 2/2005 | Tandrup et al. |
| 6,851,679 B2 | 2/2005 | Downey et al. |
| 6,857,498 B2 | 2/2005 | Mtale et al. |
| 6,860,826 B1 | 3/2005 | Johnson |
| D503,657 S | 4/2005 | Katoh |
| D503,658 S | 4/2005 | Lu |
| D503,905 S | 4/2005 | Saito et al. |
| D504,638 S | 5/2005 | Tanaka et al. |
| 6,892,842 B2 | 5/2005 | Bouffard et al. |
| 6,895,318 B1 | 5/2005 | Barton et al. |
| 6,901,992 B2 | 6/2005 | Kent et al. |
| 6,907,916 B2 | 6/2005 | Koyama |
| 6,908,108 B1 | 6/2005 | Scarla |
| 6,909,200 B2 | 6/2005 | Bouchon |
| D507,766 S | 7/2005 | McMahan et al. |
| 6,915,770 B2 | 7/2005 | Lu |
| 6,916,142 B2 | 7/2005 | Hansen et al. |
| 6,921,077 B1 | 7/2005 | Pupo |
| D508,224 S | 8/2005 | Mays et al. |
| 6,923,507 B1 | 8/2005 | Billberg et al. |
| 6,935,297 B2 | 8/2005 | Honda et al. |
| 6,938,508 B1 | 9/2005 | Saagge |
| 6,942,050 B1 | 9/2005 | Honkala et al. |
| 6,945,541 B2 | 9/2005 | Brown |
| 6,951,240 B2 | 10/2005 | Kolb |
| RE38,895 E | 11/2005 | McLemore |
| D511,317 S | 11/2005 | Tanaka et al. |
| 6,966,395 B2 | 11/2005 | Schuehmacher et al. |
| 6,966,399 B2 | 11/2005 | Tanigaki et al. |
| 6,976,720 B1 | 12/2005 | Bequette |
| 6,978,857 B2 | 12/2005 | Korenjak |
| 6,988,759 B2 | 1/2006 | Fin et al. |
| 6,997,239 B2 | 2/2006 | Kato |
| 7,000,931 B1 | 2/2006 | Chevalier |
| 7,004,134 B2 | 2/2006 | Higuchi |
| 7,004,137 B2 | 2/2006 | Kunugi et al. |
| 7,011,174 B1 | 3/2006 | James |
| 7,014,241 B2 | 3/2006 | Toyota et al. |
| 7,017,542 B2 | 3/2006 | Wilton et al. |
| D519,439 S | 4/2006 | Dahl et al. |
| 7,032,895 B2 | 4/2006 | Folchert |
| 7,035,836 B2 | 4/2006 | Caponetto et al. |
| D521,413 S | 5/2006 | Katoh |
| 7,040,260 B2 | 5/2006 | Yoshimatsu et al. |
| 7,040,437 B1 | 5/2006 | Fredrickson et al. |
| 7,044,203 B2 | 5/2006 | Yagi et al. |
| 7,051,824 B1 | 5/2006 | Jones et al. |
| 7,055,454 B1 | 6/2006 | Whiting et al. |
| 7,073,482 B2 | 7/2006 | Kirchberger |
| 7,076,351 B2 | 7/2006 | Hamilton et al. |
| 7,077,233 B2 | 7/2006 | Hasegawa |
| 7,086,673 B2 | 8/2006 | Connett et al. |
| 7,089,737 B2 | 8/2006 | Claus |
| 7,096,988 B2 | 8/2006 | Moriyama |
| 7,097,166 B2 | 8/2006 | Folchert |
| 7,100,562 B2 | 9/2006 | Terada et al. |
| 7,104,242 B2 | 9/2006 | Nishi et al. |
| 7,114,585 B2 | 10/2006 | Man et al. |
| 7,117,927 B2 | 10/2006 | Kent et al. |
| 7,124,853 B1 | 10/2006 | Kole, Jr. |
| 7,125,134 B1 | 10/2006 | Hedlund et al. |
| 7,136,729 B2 | 11/2006 | Salman et al. |
| 7,137,764 B2 | 11/2006 | Johnson |
| 7,140,619 B2 | 11/2006 | Hrovat et al. |
| 7,147,075 B2 | 12/2006 | Tanaka et al. |
| 7,152,706 B2 | 12/2006 | Pichler et al. |
| 7,159,557 B2 | 1/2007 | Yasuda et al. |
| 7,165,522 B2 | 1/2007 | Malek et al. |
| 7,168,709 B2 | 1/2007 | Niwa et al. |
| 7,182,169 B2 | 2/2007 | Suzuki |
| 7,185,732 B2 | 3/2007 | Saito et al. |
| 7,204,219 B2 | 4/2007 | Sakurai |
| 7,208,847 B2 | 4/2007 | Taniguchi |
| 7,213,669 B2 | 5/2007 | Fecteau et al. |
| 7,216,733 B2 | 5/2007 | Wami et al. |
| 7,224,132 B2 | 5/2007 | Cho et al. |
| 7,234,707 B2 | 6/2007 | Green et al. |
| 7,237,789 B1 | 7/2007 | Herman |
| 7,239,032 B1 | 7/2007 | Wilson et al. |
| 7,243,564 B2 | 7/2007 | Chonan et al. |
| 7,243,632 B2 | 7/2007 | Hu |
| D548,662 S | 8/2007 | Markefka |
| D549,133 S | 8/2007 | LePage |
| 7,270,335 B2 | 9/2007 | Hio et al. |
| 7,281,753 B2 | 10/2007 | Curtis et al. |
| 7,286,919 B2 | 10/2007 | Nordgren et al. |
| 7,287,508 B2 | 10/2007 | Kurihara |
| 7,287,619 B2 | 10/2007 | Tanaka et al. |
| D555,036 S | 11/2007 | Eck |
| 7,325,526 B2 | 2/2008 | Kawamoto |
| 7,347,296 B2 | 3/2008 | Nakamura et al. |
| 7,359,787 B2 | 4/2008 | Ono et al. |
| 7,363,961 B2 | 4/2008 | Mori et al. |
| 7,367,247 B2 | 5/2008 | Horiuchi et al. |
| 7,367,417 B2 | 5/2008 | Inui et al. |
| 7,370,724 B2 | 5/2008 | Saito et al. |
| 7,374,012 B2 | 5/2008 | Inui et al. |
| 7,377,351 B2 | 5/2008 | Smith et al. |
| 7,380,622 B2 | 6/2008 | Shimizu |
| 7,386,378 B2 | 6/2008 | Lauwerys et al. |
| 7,387,180 B2 | 6/2008 | Konno et al. |
| 7,387,307 B2 | 6/2008 | Tanaka et al. |
| 7,395,804 B2 | 7/2008 | Takemoto et al. |
| 7,401,794 B2 | 7/2008 | Laurent et al. |
| 7,407,190 B2 | 8/2008 | Berg et al. |
| 7,412,310 B2 | 8/2008 | Brigham et al. |
| 7,416,234 B2 | 8/2008 | Bequette |
| 7,421,954 B2 | 9/2008 | Bose |
| 7,427,072 B2 | 9/2008 | Brown |
| 7,427,248 B2 | 9/2008 | Chonan |
| D578,433 S | 10/2008 | Kawaguchi et al. |
| D578,934 S | 10/2008 | Tanaka et al. |
| 7,431,024 B2 | 10/2008 | Buchwitz et al. |
| 7,438,147 B2 | 10/2008 | Kato et al. |
| 7,438,153 B2 | 10/2008 | Kalsnes et al. |
| 7,441,789 B2 | 10/2008 | Geiger et al. |
| 7,449,793 B2 | 11/2008 | Cho et al. |
| 7,451,808 B2 | 11/2008 | Busse et al. |
| 7,455,134 B2 | 11/2008 | Severinsky et al. |
| 7,458,593 B2 | 12/2008 | Saito et al. |
| 7,481,287 B2 | 1/2009 | Madson et al. |
| 7,481,293 B2 | 1/2009 | Ogawa et al. |
| 7,483,775 B2 | 1/2009 | Karaba et al. |
| D586,694 S | 2/2009 | Huang et al. |
| 7,490,694 B1 | 2/2009 | Berg et al. |
| 7,497,299 B2 | 3/2009 | Kobayashi |
| 7,497,471 B2 | 3/2009 | Kobayashi |
| 7,497,472 B2 | 3/2009 | Cymbal et al. |
| 7,506,712 B2 | 3/2009 | Kato et al. |
| 7,506,714 B2 | 3/2009 | Davis et al. |
| 7,510,060 B2 | 3/2009 | Zawa et al. |
| 7,510,199 B2 | 3/2009 | Nash et al. |
| D592,998 S | 5/2009 | Woodard et al. |
| 7,530,420 B2 | 5/2009 | Davis et al. |
| 7,537,070 B2 | 5/2009 | Maslov et al. |
| 7,540,511 B2 | 6/2009 | Saito et al. |
| 7,546,892 B2 | 6/2009 | An et al. |
| D595,613 S | 7/2009 | Lai et al. |

(56) References Cited

U.S. PATENT DOCUMENTS

| | | |
|---|---|---|
| 7,559,308 B2 | 7/2009 | Matsuda et al. |
| 7,565,944 B2 | 7/2009 | Sakamoto et al. |
| 7,565,945 B2 | 7/2009 | Okada et al. |
| 7,571,039 B2 | 8/2009 | Chen et al. |
| 7,575,211 B2 | 8/2009 | Andritter |
| 7,597,385 B2 | 10/2009 | Shibata et al. |
| 7,600,603 B2 | 10/2009 | Okada et al. |
| 7,600,762 B2 | 10/2009 | Yasui et al. |
| 7,604,084 B2 | 10/2009 | Okada et al. |
| 7,607,368 B2 | 10/2009 | Takahashi et al. |
| 7,610,132 B2 | 10/2009 | Yanai et al. |
| D604,201 S | 11/2009 | Kawaguchi et al. |
| 7,611,154 B2 | 11/2009 | Delaney |
| 7,621,262 B2 | 11/2009 | Zubeck |
| 7,623,327 B2 | 11/2009 | Ogawa |
| D605,555 S | 12/2009 | Tanaka et al. |
| D606,900 S | 12/2009 | Flores |
| 7,630,807 B2 | 12/2009 | Yoshimura et al. |
| D607,377 S | 1/2010 | Shimomura et al. |
| 7,641,208 B1 | 1/2010 | Barron et al. |
| 7,644,934 B2 | 1/2010 | Mizuta |
| 7,650,959 B2 | 1/2010 | Kato et al. |
| D610,514 S | 2/2010 | Eck |
| 7,658,258 B2 | 2/2010 | Denney |
| 7,677,343 B2 | 3/2010 | Kitai et al. |
| 7,677,646 B2 | 3/2010 | Nakamura |
| 7,682,115 B1 | 3/2010 | Jay et al. |
| 7,684,911 B2 | 3/2010 | Seifert et al. |
| 7,703,566 B2 | 4/2010 | Wilson et al. |
| 7,703,730 B2 | 4/2010 | Best et al. |
| 7,703,826 B1 | 4/2010 | German |
| 7,712,562 B2 | 5/2010 | Nozaki |
| 7,717,495 B2 | 5/2010 | Leonard et al. |
| 7,740,092 B2 | 6/2010 | Bender |
| 7,740,103 B2 | 6/2010 | Sasajima |
| 7,740,256 B2 | 6/2010 | Davis |
| 7,742,851 B2 | 6/2010 | Hisada et al. |
| 7,751,959 B2 | 7/2010 | Boon et al. |
| 7,753,427 B2 | 7/2010 | Yamamura et al. |
| D621,423 S | 8/2010 | Nakanishi et al. |
| D622,631 S | 8/2010 | Lai et al. |
| 7,769,505 B2 | 8/2010 | Rask et al. |
| 7,778,741 B2 | 8/2010 | Rao et al. |
| 7,786,886 B2 | 8/2010 | Maruyama et al. |
| 7,795,602 B2 | 9/2010 | Leonard et al. |
| 7,802,816 B2 | 9/2010 | McGuire |
| D625,662 S | 10/2010 | Li |
| 7,810,818 B2 | 10/2010 | Bushko |
| 7,819,220 B2 | 10/2010 | Sunsdahl et al. |
| 7,828,098 B2 | 11/2010 | Yamamoto et al. |
| 7,845,452 B2 | 12/2010 | Bennett et al. |
| 7,857,334 B2 | 12/2010 | Seki |
| D631,395 S | 1/2011 | Tandrup et al. |
| 7,862,061 B2 | 1/2011 | Jung |
| 7,874,391 B2 | 1/2011 | Dahl et al. |
| D631,792 S | 2/2011 | Sanschagrin |
| D633,006 S | 2/2011 | Sanschagrin et al. |
| 7,882,912 B2 | 2/2011 | Nozaki et al. |
| 7,884,574 B2 | 2/2011 | Fukumura et al. |
| 7,885,750 B2 | 2/2011 | Lu |
| 7,899,594 B2 | 3/2011 | Messih et al. |
| 7,912,610 B2 | 3/2011 | Saito et al. |
| 7,913,505 B2 | 3/2011 | Nakamura |
| 7,913,782 B1 | 3/2011 | Foss et al. |
| D636,295 S | 4/2011 | Eck |
| D636,704 S | 4/2011 | Yoo et al. |
| D636,787 S | 4/2011 | Luxon et al. |
| D636,788 S | 4/2011 | Luxon et al. |
| 7,926,822 B2 | 4/2011 | Ohletz et al. |
| 7,931,106 B1 | 4/2011 | Suzuki et al. |
| D637,623 S | 5/2011 | Luxon et al. |
| D638,446 S | 5/2011 | Luxon et al. |
| 7,942,427 B2 | 5/2011 | Lloyd |
| 7,942,447 B2 | 5/2011 | Davis et al. |
| 7,950,486 B2 | 5/2011 | Van et al. |
| D640,598 S | 6/2011 | Zhang |
| 7,954,853 B2 | 6/2011 | Davis et al. |
| 7,959,163 B2 | 6/2011 | Beno et al. |
| 7,962,261 B2 | 6/2011 | Bushko et al. |
| 7,963,529 B2 | 6/2011 | Oteman et al. |
| 7,967,100 B2 | 6/2011 | Cover et al. |
| 7,970,512 B2 | 6/2011 | Lu et al. |
| D641,288 S | 7/2011 | Sun |
| 7,984,780 B2 | 7/2011 | Hirukawa |
| 7,984,915 B2 | 7/2011 | Post et al. |
| D642,493 S | 8/2011 | Goebert et al. |
| 8,002,061 B2 * | 8/2011 | Yamamura ............ B60K 11/00 180/68.1 |
| 8,005,596 B2 | 8/2011 | Lu et al. |
| 8,011,342 B2 | 9/2011 | Bluhm |
| 8,011,420 B2 | 9/2011 | Mazzocco et al. |
| 8,027,775 B2 | 9/2011 | Takenaka et al. |
| 8,032,281 B2 | 10/2011 | Bujak et al. |
| 8,037,959 B2 | 10/2011 | Yamamura et al. |
| D648,745 S | 11/2011 | Luxon et al. |
| D649,162 S | 11/2011 | Luxon et al. |
| 8,047,324 B2 | 11/2011 | Yao et al. |
| 8,047,451 B2 | 11/2011 | McNaughton |
| 8,050,818 B2 | 11/2011 | Mizuta |
| 8,050,851 B2 | 11/2011 | Aoki et al. |
| 8,050,857 B2 | 11/2011 | Lu et al. |
| 8,051,842 B2 | 11/2011 | Hagelstein et al. |
| 8,052,202 B2 | 11/2011 | Nakamura |
| 8,056,392 B2 | 11/2011 | Ryan et al. |
| 8,056,912 B2 | 11/2011 | Kawabe et al. |
| 8,065,054 B2 | 11/2011 | Tarasinski et al. |
| D650,311 S | 12/2011 | Bracy |
| 8,074,753 B2 | 12/2011 | Tahara et al. |
| 8,075,002 B1 | 12/2011 | Pionke et al. |
| 8,086,371 B2 | 12/2011 | Furuichi et al. |
| 8,087,676 B2 | 1/2012 | Mcintyre |
| 8,095,268 B2 | 1/2012 | Parison et al. |
| 8,104,524 B2 | 1/2012 | Manesh et al. |
| 8,108,104 B2 | 1/2012 | Hrovat et al. |
| 8,116,938 B2 | 2/2012 | Tagaki et al. |
| 8,121,757 B2 | 2/2012 | Song et al. |
| 8,122,988 B2 | 2/2012 | Obayashi et al. |
| 8,152,880 B2 | 4/2012 | Matschl et al. |
| 8,157,039 B2 | 4/2012 | Melvin et al. |
| 8,162,086 B2 | 4/2012 | Robinson |
| D660,746 S | 5/2012 | Bracy |
| 8,170,749 B2 | 5/2012 | Mizuta |
| 8,176,957 B2 | 5/2012 | Manesh et al. |
| 8,186,333 B2 | 5/2012 | Sakuyama |
| 8,191,930 B2 | 6/2012 | Davis et al. |
| 8,205,910 B2 | 6/2012 | Leonard et al. |
| 8,209,087 B2 | 6/2012 | Haegglund et al. |
| 8,214,106 B2 | 7/2012 | Ghoneim et al. |
| 8,215,427 B2 | 7/2012 | Rouaud et al. |
| 8,219,262 B2 | 7/2012 | Stiller |
| 8,229,642 B2 | 7/2012 | Post et al. |
| 8,235,155 B2 | 8/2012 | Seegert et al. |
| 8,260,496 B2 | 9/2012 | Gagliano |
| 8,271,175 B2 | 9/2012 | Takenaka et al. |
| 8,272,685 B2 | 9/2012 | Lucas et al. |
| 8,281,891 B2 | 10/2012 | Sugiura |
| 8,296,010 B2 | 10/2012 | Hirao et al. |
| D670,198 S | 11/2012 | Li et al. |
| 8,308,170 B2 | 11/2012 | Van et al. |
| 8,315,764 B2 | 11/2012 | Chen et al. |
| 8,321,088 B2 | 11/2012 | Brown et al. |
| 8,322,497 B2 | 12/2012 | Marjoram et al. |
| 8,328,235 B2 | 12/2012 | Schneider |
| 8,352,143 B2 | 1/2013 | Lu et al. |
| 8,353,265 B2 | 1/2013 | Pursifull |
| 8,355,840 B2 | 1/2013 | Ammon et al. |
| 8,356,472 B2 | 1/2013 | Hiranuma et al. |
| 8,374,748 B2 | 2/2013 | Jolly |
| 8,376,373 B2 | 2/2013 | Conradie |
| 8,376,441 B2 * | 2/2013 | Nakamura ............ B62D 23/005 296/65.09 |
| 8,381,855 B2 | 2/2013 | Suzuki et al. |
| 8,382,125 B2 | 2/2013 | Sunsdahl et al. |
| 8,386,109 B2 | 2/2013 | Nicholls |

(56) References Cited

U.S. PATENT DOCUMENTS

| | | |
|---|---|---|
| 8,396,627 B2 | 3/2013 | Jung et al. |
| D679,627 S | 4/2013 | Li et al. |
| 8,417,417 B2 | 4/2013 | Chen et al. |
| 8,424,832 B2 | 4/2013 | Robbins et al. |
| D682,737 S | 5/2013 | Li et al. |
| D682,739 S | 5/2013 | Patterson et al. |
| 8,434,774 B2 | 5/2013 | Leclerc et al. |
| 8,439,019 B1 | 5/2013 | Carlson et al. |
| 8,442,720 B2 | 5/2013 | Lu et al. |
| 8,444,161 B2 | 5/2013 | Leclerc et al. |
| 8,447,489 B2 | 5/2013 | Murata et al. |
| 8,457,841 B2 | 6/2013 | Knoll et al. |
| 8,473,157 B2 | 6/2013 | Savaresi et al. |
| 8,479,854 B1 | 7/2013 | Gagnon |
| 8,485,303 B2 | 7/2013 | Yamamoto et al. |
| 8,496,079 B2 | 7/2013 | Wenger et al. |
| 8,517,395 B2 | 8/2013 | Knox et al. |
| D689,396 S | 9/2013 | Wang |
| 8,538,628 B2 | 9/2013 | Backman |
| D691,924 S | 10/2013 | Smith |
| 8,548,678 B2 | 10/2013 | Ummethala et al. |
| 8,550,221 B2 | 10/2013 | Paulides et al. |
| 8,561,403 B2 | 10/2013 | Vandyne et al. |
| 8,567,847 B1 | 10/2013 | King et al. |
| D693,370 S | 11/2013 | Randhawa |
| 8,573,348 B2 | 11/2013 | Cantemir et al. |
| 8,573,605 B2 | 11/2013 | Di Maria |
| 8,579,060 B2 | 11/2013 | George et al. |
| 8,590,651 B2 | 11/2013 | Shigematsu et al. |
| D694,668 S | 12/2013 | Li et al. |
| 8,596,405 B2 | 12/2013 | Sunsdahl et al. |
| 8,613,335 B2 | 12/2013 | Deckard |
| 8,613,337 B2 | 12/2013 | Kinsman et al. |
| 8,626,388 B2 | 1/2014 | Oikawa |
| 8,626,389 B2 | 1/2014 | Sidlosky |
| D699,627 S | 2/2014 | Tang |
| 8,640,814 B2 | 2/2014 | Deckard |
| 8,641,052 B2 | 2/2014 | Kondo et al. |
| 8,645,024 B2 | 2/2014 | Daniels |
| 8,646,555 B2 | 2/2014 | Reed |
| 8,651,557 B2 | 2/2014 | Suzuki |
| 8,657,050 B2 | 2/2014 | Yamaguchi |
| D700,869 S | 3/2014 | Sato et al. |
| D701,469 S | 3/2014 | Lai et al. |
| 8,668,623 B2 | 3/2014 | Vuksa et al. |
| 8,671,919 B2 | 3/2014 | Nakasugi et al. |
| 8,672,106 B2 | 3/2014 | Laird et al. |
| 8,672,337 B2 | 3/2014 | Van et al. |
| D703,102 S | 4/2014 | Eck |
| 8,700,260 B2 | 4/2014 | Jolly et al. |
| 8,708,359 B2 | 4/2014 | Murray |
| 8,712,599 B1 | 4/2014 | Westpfahl |
| 8,712,639 B2 | 4/2014 | Lu et al. |
| D705,127 S | 5/2014 | Patterson et al. |
| 8,718,872 B2 | 5/2014 | Hirao et al. |
| 8,725,351 B1 | 5/2014 | Selden et al. |
| 8,731,774 B2 | 5/2014 | Yang |
| 8,746,719 B2 | 6/2014 | Safranski |
| 8,763,739 B2 | 7/2014 | Belzile et al. |
| 8,783,396 B2 | 7/2014 | Bowman |
| 8,783,400 B2 | 7/2014 | Hirukawa |
| D711,778 S | 8/2014 | Chun |
| D712,311 S | 9/2014 | Morgan et al. |
| 8,827,019 B2 | 9/2014 | Deckard et al. |
| 8,827,856 B1 | 9/2014 | Younggren et al. |
| 8,834,307 B2 | 9/2014 | Too et al. |
| 8,840,076 B2 | 9/2014 | Zuber et al. |
| 8,864,174 B2 | 10/2014 | Minami et al. |
| 8,869,525 B2 | 10/2014 | Lingenauber et al. |
| D717,695 S | 11/2014 | Matsumura |
| D719,061 S | 12/2014 | Tandrup et al. |
| 8,899,602 B2 | 12/2014 | Takanashi et al. |
| 8,899,620 B1 | 12/2014 | Bhardwaj et al. |
| D722,538 S | 2/2015 | Song |
| 8,960,348 B2 | 2/2015 | Shomura et al. |
| 8,973,693 B2 | 3/2015 | Kinsman |
| D727,794 S | 4/2015 | Tandrup et al. |
| 8,997,908 B2 | 4/2015 | Kinsman |
| 9,016,760 B2 | 4/2015 | Kuroda et al. |
| 9,027,937 B2 | 5/2015 | Ryan et al. |
| D735,077 S | 7/2015 | Sato et al. |
| 9,091,468 B2 | 7/2015 | Colpan et al. |
| D737,724 S | 9/2015 | Schroeder et al. |
| D739,304 S | 9/2015 | Brown |
| 9,133,730 B2 | 9/2015 | Joergl et al. |
| 9,146,061 B2 | 9/2015 | Farlow et al. |
| 9,162,561 B2 | 10/2015 | Marois et al. |
| 9,186,952 B2 | 11/2015 | Yleva |
| 9,194,278 B2 | 11/2015 | Fronk et al. |
| 9,194,282 B2 | 11/2015 | Serres et al. |
| 9,221,508 B1 | 12/2015 | De Haan |
| 9,228,644 B2 | 1/2016 | Tsukamoto et al. |
| 9,266,417 B2 | 2/2016 | Nadeau et al. |
| D756,845 S | 5/2016 | Flores |
| 9,327,587 B2 | 5/2016 | Spindler et al. |
| 9,328,652 B2 | 5/2016 | Bruss et al. |
| D758,281 S | 6/2016 | Galloway |
| 9,381,803 B2 | 7/2016 | Galsworthy |
| 9,382,832 B2 | 7/2016 | Bowers |
| D762,522 S | 8/2016 | Kinoshita |
| 9,421,860 B2 | 8/2016 | Schuhmacher |
| 9,428,031 B2 | 8/2016 | Kuwabara et al. |
| 9,440,671 B2 | 9/2016 | Schlangen et al. |
| 9,469,329 B1 | 10/2016 | Leanza |
| D772,755 S | 11/2016 | Tandrup et al. |
| 9,499,044 B2 | 11/2016 | Hayato |
| 9,500,264 B2 | 11/2016 | Aitcin et al. |
| 9,512,809 B2 | 12/2016 | Tsumiyama et al. |
| 9,566,858 B2 | 2/2017 | Hicke |
| 9,592,713 B2 | 3/2017 | Kinsman et al. |
| D784,199 S | 4/2017 | Dunshee et al. |
| D785,502 S | 5/2017 | Dunshee et al. |
| 9,638,070 B2 | 5/2017 | Kaeser |
| 9,644,717 B2 | 5/2017 | Aitcin |
| 9,650,078 B2 | 5/2017 | Kinsman |
| 9,713,976 B2 | 7/2017 | Miller |
| 9,718,351 B2 | 8/2017 | Ripley |
| 9,719,463 B2 | 8/2017 | Oltmans et al. |
| 9,725,023 B2 | 8/2017 | Miller |
| 9,752,489 B2 | 9/2017 | Chu |
| 9,776,481 B2 | 10/2017 | Deckard |
| D804,993 S | 12/2017 | Eck et al. |
| D805,009 S | 12/2017 | Eck et al. |
| D805,015 S | 12/2017 | Eck et al. |
| 9,856,817 B2 | 1/2018 | Nicosia et al. |
| 9,884,647 B2 | 2/2018 | Peterson et al. |
| 9,895,946 B2 | 2/2018 | Schlangen et al. |
| 9,908,577 B2 | 3/2018 | Novak |
| 10,017,090 B2 | 7/2018 | Franker |
| 10,036,311 B2 | 7/2018 | Kaeser et al. |
| 10,066,729 B2 | 9/2018 | Aitcin et al. |
| 10,099,547 B2 | 10/2018 | Bessho et al. |
| 10,124,709 B2 | 11/2018 | Bohnsack |
| D835,545 S | 12/2018 | Hanten |
| 10,183,605 B2 | 1/2019 | Weber |
| 10,207,555 B2 | 2/2019 | Mailhot et al. |
| 10,221,727 B1 | 3/2019 | Walter et al. |
| 10,239,571 B2 | 3/2019 | Kennedy et al. |
| 10,246,153 B2 | 4/2019 | Deckard |
| 10,300,786 B2 * | 5/2019 | Nugteren ......... F02M 35/10157 |
| 10,323,568 B2 | 6/2019 | Kaeser et al. |
| D852,674 S | 7/2019 | Wilcox |
| 10,369,861 B2 | 8/2019 | Deckard |
| 10,371,249 B1 | 8/2019 | Bluhm et al. |
| 10,399,401 B2 | 9/2019 | Schlangen et al. |
| 10,479,422 B2 | 11/2019 | Hollman |
| 10,486,748 B2 | 11/2019 | Deckard et al. |
| 10,589,621 B1 | 3/2020 | McKoskey et al. |
| 10,655,536 B1 | 5/2020 | Mueller et al. |
| 10,723,190 B2 | 7/2020 | Hu et al. |
| D896,125 S | 9/2020 | Hashimoto et al. |
| D896,702 S | 9/2020 | Dunshee et al. |
| D896,703 S | 9/2020 | Dunshee et al. |
| 10,766,533 B2 | 9/2020 | Houkom et al. |

(56) References Cited

U.S. PATENT DOCUMENTS

| | | |
|---|---|---|
| 10,767,745 B2 | 9/2020 | Zauner et al. |
| 10,800,250 B2 | 10/2020 | Nugteren et al. |
| 10,876,462 B1 | 12/2020 | Draisey et al. |
| 10,926,799 B2 | 2/2021 | Houkom et al. |
| D913,847 S | 3/2021 | Hashimoto et al. |
| 10,933,932 B2 | 3/2021 | Spindler et al. |
| 10,946,736 B2 * | 3/2021 | Fischer ................. B60K 17/34 |
| 11,104,194 B2 | 8/2021 | Schlangen et al. |
| 11,220,147 B2 | 1/2022 | Hu et al. |
| 11,235,814 B2 | 2/2022 | Schlangen et al. |
| 11,293,540 B2 | 4/2022 | Leclair et al. |
| 11,306,809 B2 | 4/2022 | Aitcin |
| 11,391,361 B2 | 7/2022 | Leclair et al. |
| 11,607,920 B2 | 3/2023 | Schlangen et al. |
| 11,624,427 B2 | 4/2023 | Itoo et al. |
| 11,628,722 B2 | 4/2023 | Rasa et al. |
| 11,680,635 B2 | 6/2023 | Olason |
| 11,691,674 B2 | 7/2023 | Schleif et al. |
| 11,752,860 B2 | 9/2023 | Fields et al. |
| 11,780,326 B2 | 10/2023 | Schlangen et al. |
| 11,787,251 B2 | 10/2023 | Schlangen et al. |
| 11,884,148 B2 | 1/2024 | Nelson et al. |
| 11,926,190 B2 | 3/2024 | Schlangen et al. |
| 2001/0005803 A1 | 6/2001 | Cochofel et al. |
| 2001/0007396 A1 | 7/2001 | Mizuta |
| 2001/0013433 A1 | 8/2001 | Szymkowiak |
| 2001/0020554 A1 | 9/2001 | Yanase et al. |
| 2001/0021887 A1 | 9/2001 | Obradovich et al. |
| 2001/0031185 A1 | 10/2001 | Swensen |
| 2001/0035642 A1 | 11/2001 | Gotz et al. |
| 2001/0043808 A1 | 11/2001 | Matsunaga et al. |
| 2002/0023792 A1 | 2/2002 | Bouffard et al. |
| 2002/0032088 A1 | 3/2002 | Korenjak et al. |
| 2002/0033295 A1 | 3/2002 | Korenjak et al. |
| 2002/0042313 A1 | 4/2002 | Aitcin |
| 2002/0056969 A1 | 5/2002 | Sawai et al. |
| 2002/0063440 A1 | 5/2002 | Spurr et al. |
| 2002/0074760 A1 | 6/2002 | Eshelman |
| 2002/0082752 A1 | 6/2002 | Obradovich |
| 2002/0088661 A1 | 7/2002 | Gagnon et al. |
| 2002/0119846 A1 | 8/2002 | Kitai et al. |
| 2002/0121795 A1 | 9/2002 | Murray |
| 2002/0123400 A1 | 9/2002 | Younggren et al. |
| 2002/0147072 A1 | 10/2002 | Goodell et al. |
| 2002/0178968 A1 | 12/2002 | Christensen |
| 2002/0179354 A1 | 12/2002 | White |
| 2003/0001409 A1 | 1/2003 | Semple et al. |
| 2003/0029413 A1 | 2/2003 | Sachdev et al. |
| 2003/0034187 A1 | 2/2003 | Hisada et al. |
| 2003/0066696 A1 | 4/2003 | Nakamura |
| 2003/0070849 A1 | 4/2003 | Whittaker |
| 2003/0104900 A1 | 6/2003 | Takahashi et al. |
| 2003/0125857 A1 | 7/2003 | Madau et al. |
| 2003/0132075 A1 | 7/2003 | Drivers |
| 2003/0153426 A1 | 8/2003 | Brown |
| 2003/0168267 A1 | 9/2003 | Borroni-Bird et al. |
| 2003/0173754 A1 | 9/2003 | Bryant |
| 2003/0200016 A1 | 10/2003 | Spillane et al. |
| 2003/0205867 A1 | 11/2003 | Coelingh et al. |
| 2003/0213628 A1 | 11/2003 | Rioux et al. |
| 2004/0010383 A1 | 1/2004 | Lu et al. |
| 2004/0018903 A1 | 1/2004 | Takagi |
| 2004/0031451 A1 | 2/2004 | Atschreiter et al. |
| 2004/0041358 A1 | 3/2004 | Rovat et al. |
| 2004/0063535 A1 | 4/2004 | Shigeru |
| 2004/0079561 A1 | 4/2004 | Ozawa et al. |
| 2004/0083730 A1 | 5/2004 | Wizgall et al. |
| 2004/0090020 A1 | 5/2004 | Braswell |
| 2004/0094912 A1 | 5/2004 | Niwa et al. |
| 2004/0107591 A1 | 6/2004 | Cuddy |
| 2004/0108159 A1 | 6/2004 | Rondeau et al. |
| 2004/0129489 A1 | 7/2004 | Brasseal et al. |
| 2004/0130224 A1 | 7/2004 | Mogi et al. |
| 2004/0153782 A1 | 8/2004 | Fukui et al. |
| 2004/0168455 A1 | 9/2004 | Nakamura |
| 2004/0169347 A1 | 9/2004 | Seki |
| 2004/0177827 A1 | 9/2004 | Hoyte et al. |
| 2004/0188159 A1 | 9/2004 | Yatagai et al. |
| 2004/0195018 A1 | 10/2004 | Inui et al. |
| 2004/0195019 A1 | 10/2004 | Kato et al. |
| 2004/0195034 A1 | 10/2004 | Kato et al. |
| 2004/0195797 A1 | 10/2004 | Nash et al. |
| 2004/0206567 A1 | 10/2004 | Kato et al. |
| 2004/0207190 A1 | 10/2004 | Nakagawa et al. |
| 2004/0214668 A1 | 10/2004 | Takano |
| 2004/0221669 A1 | 11/2004 | Shimizu et al. |
| 2004/0224806 A1 | 11/2004 | Chonan |
| 2004/0226384 A1 | 11/2004 | Shimizu et al. |
| 2004/0226761 A1 | 11/2004 | Takenaka et al. |
| 2004/0231630 A1 | 11/2004 | Liebert |
| 2004/0231900 A1 | 11/2004 | Tanaka et al. |
| 2005/0012421 A1 | 1/2005 | Fukuda et al. |
| 2005/0014582 A1 | 1/2005 | Whiting et al. |
| 2005/0045414 A1 | 3/2005 | Takagi et al. |
| 2005/0052080 A1 | 3/2005 | Maslov et al. |
| 2005/0055140 A1 | 3/2005 | Brigham et al. |
| 2005/0077098 A1 | 4/2005 | Takayanagi et al. |
| 2005/0098964 A1 | 5/2005 | Brown |
| 2005/0103558 A1 | 5/2005 | Davis et al. |
| 2005/0131604 A1 | 6/2005 | Lu |
| 2005/0173177 A1 | 8/2005 | Smith et al. |
| 2005/0173180 A1 | 8/2005 | Hypes et al. |
| 2005/0205319 A1 | 9/2005 | Yatagai et al. |
| 2005/0231145 A1 | 10/2005 | Mukai et al. |
| 2005/0235767 A1 | 10/2005 | Shimizu et al. |
| 2005/0235768 A1 | 10/2005 | Shimizu et al. |
| 2005/0242677 A1 | 11/2005 | Akutsu et al. |
| 2005/0246052 A1 | 11/2005 | Coleman et al. |
| 2005/0248116 A1 | 11/2005 | Fanson |
| 2005/0257989 A1 | 11/2005 | Wami et al. |
| 2005/0257990 A1 | 11/2005 | Shimizu |
| 2005/0267660 A1 | 12/2005 | Fujiwara et al. |
| 2005/0269141 A1 | 12/2005 | Davis et al. |
| 2005/0279244 A1 | 12/2005 | Bose |
| 2005/0279330 A1 | 12/2005 | Okazaki et al. |
| 2005/0280219 A1 | 12/2005 | Brown |
| 2006/0006010 A1 | 1/2006 | Nakamura et al. |
| 2006/0006623 A1 | 1/2006 | Leclair |
| 2006/0006696 A1 | 1/2006 | Umemoto et al. |
| 2006/0017240 A1 | 1/2006 | Laurent et al. |
| 2006/0022619 A1 | 2/2006 | Koike et al. |
| 2006/0042862 A1 | 3/2006 | Saito et al. |
| 2006/0055139 A1 | 3/2006 | Furumi et al. |
| 2006/0065472 A1 | 3/2006 | Ogawa et al. |
| 2006/0075840 A1 | 4/2006 | Saito et al. |
| 2006/0076180 A1 | 4/2006 | Saito et al. |
| 2006/0108174 A1 | 5/2006 | Saito et al. |
| 2006/0112695 A1 | 6/2006 | Neubauer et al. |
| 2006/0130888 A1 | 6/2006 | Yamaguchi et al. |
| 2006/0131088 A1 | 6/2006 | Pawusch et al. |
| 2006/0151970 A1 | 7/2006 | Kaminski et al. |
| 2006/0162990 A1 | 7/2006 | Saito et al. |
| 2006/0169525 A1 | 8/2006 | Saito et al. |
| 2006/0175124 A1 | 8/2006 | Saito et al. |
| 2006/0180383 A1 | 8/2006 | Bataille et al. |
| 2006/0180385 A1 | 8/2006 | Yanai et al. |
| 2006/0185741 A1 | 8/2006 | Mckee |
| 2006/0185927 A1 | 8/2006 | Sakamoto et al. |
| 2006/0191734 A1 | 8/2006 | Kobayashi |
| 2006/0191735 A1 | 8/2006 | Kobayashi |
| 2006/0191737 A1 | 8/2006 | Kobayashi |
| 2006/0191739 A1 | 8/2006 | Koga |
| 2006/0196721 A1 | 9/2006 | Saito et al. |
| 2006/0196722 A1 | 9/2006 | Makabe et al. |
| 2006/0197331 A1 | 9/2006 | Davis et al. |
| 2006/0201270 A1 | 9/2006 | Kobayashi |
| 2006/0207823 A1 | 9/2006 | Okada et al. |
| 2006/0207824 A1 | 9/2006 | Saito et al. |
| 2006/0207825 A1 | 9/2006 | Okada et al. |
| 2006/0208564 A1 | 9/2006 | Yuda et al. |
| 2006/0212200 A1 | 9/2006 | Yanai et al. |
| 2006/0219452 A1 | 10/2006 | Okada et al. |
| 2006/0219469 A1 | 10/2006 | Okada et al. |
| 2006/0219470 A1 | 10/2006 | Magawa et al. |

(56) References Cited

U.S. PATENT DOCUMENTS

| | | |
|---|---|---|
| 2006/0220330 A1 | 10/2006 | Urquidi et al. |
| 2006/0220341 A1 | 10/2006 | Seki et al. |
| 2006/0270503 A1 | 11/2006 | Suzuki et al. |
| 2006/0278197 A1 | 12/2006 | Takamatsu et al. |
| 2006/0278451 A1 | 12/2006 | Takahashi et al. |
| 2006/0288800 A1 | 12/2006 | Mukai et al. |
| 2007/0000715 A1 | 1/2007 | Denney |
| 2007/0013181 A1 | 1/2007 | Heck |
| 2007/0018419 A1 | 1/2007 | Kinouchi et al. |
| 2007/0023566 A1 | 2/2007 | Howard |
| 2007/0068726 A1 | 3/2007 | Shimizu |
| 2007/0073461 A1 | 3/2007 | Fielder |
| 2007/0074588 A1 | 4/2007 | Harata et al. |
| 2007/0074589 A1 | 4/2007 | Harata et al. |
| 2007/0074927 A1 | 4/2007 | Okada et al. |
| 2007/0074928 A1 | 4/2007 | Okada et al. |
| 2007/0080006 A1 | 4/2007 | Yamaguchi |
| 2007/0095601 A1 | 5/2007 | Okada et al. |
| 2007/0096449 A1 | 5/2007 | Okada et al. |
| 2007/0120332 A1 | 5/2007 | Bushko et al. |
| 2007/0144800 A1 | 6/2007 | Stone |
| 2007/0158920 A1 | 7/2007 | Delaney |
| 2007/0169989 A1 | 7/2007 | Eavenson et al. |
| 2007/0175696 A1 | 8/2007 | Saito et al. |
| 2007/0209613 A1 | 9/2007 | Pantow |
| 2007/0214818 A1 | 9/2007 | Nakamura |
| 2007/0215404 A1 | 9/2007 | Lan et al. |
| 2007/0227793 A1 | 10/2007 | Nozaki et al. |
| 2007/0242398 A1 | 10/2007 | Ogawa |
| 2007/0251744 A1 | 11/2007 | Matsuzawa |
| 2007/0255466 A1 | 11/2007 | Chiao |
| 2007/0257479 A1 | 11/2007 | Davis et al. |
| 2007/0261904 A1 | 11/2007 | Fecteau et al. |
| 2008/0022981 A1 | 1/2008 | Keyaki et al. |
| 2008/0023240 A1 | 1/2008 | Sunsdahl et al. |
| 2008/0023249 A1 | 1/2008 | Sunsdahl et al. |
| 2008/0028603 A1 | 2/2008 | Takegawa et al. |
| 2008/0041335 A1 | 2/2008 | Buchwitz et al. |
| 2008/0048423 A1 | 2/2008 | Eriksson et al. |
| 2008/0053738 A1 | 3/2008 | Kosuge et al. |
| 2008/0053743 A1 | 3/2008 | Tomita |
| 2008/0059034 A1 | 3/2008 | Lu |
| 2008/0083392 A1 | 4/2008 | Kurihara et al. |
| 2008/0084091 A1 | 4/2008 | Nakamura et al. |
| 2008/0093883 A1 | 4/2008 | Shibata et al. |
| 2008/0125256 A1 | 5/2008 | Murayama et al. |
| 2008/0143505 A1 | 6/2008 | Maruyama et al. |
| 2008/0157592 A1 | 7/2008 | Bax et al. |
| 2008/0172155 A1 | 7/2008 | Takamatsu et al. |
| 2008/0178830 A1 | 7/2008 | Sposato |
| 2008/0183353 A1 | 7/2008 | Post et al. |
| 2008/0199253 A1 | 8/2008 | Okada et al. |
| 2008/0202483 A1 | 8/2008 | Procknow |
| 2008/0240847 A1 | 10/2008 | Crouse |
| 2008/0243336 A1 | 10/2008 | Fitzgibbons |
| 2008/0256738 A1 | 10/2008 | Malone |
| 2008/0257625 A1 | 10/2008 | Stranges |
| 2008/0257630 A1 | 10/2008 | Takeshima et al. |
| 2008/0271937 A1 | 11/2008 | King et al. |
| 2008/0275606 A1 | 11/2008 | Tarasinski et al. |
| 2008/0284124 A1 | 11/2008 | Brady et al. |
| 2008/0289796 A1 | 11/2008 | Sasano et al. |
| 2008/0289896 A1 | 11/2008 | Kosuge et al. |
| 2008/0296076 A1 | 12/2008 | Murayama et al. |
| 2008/0299448 A1 | 12/2008 | Buck et al. |
| 2008/0303234 A1 | 12/2008 | Mc Cann |
| 2008/0308334 A1 | 12/2008 | Leonard et al. |
| 2008/0308337 A1 | 12/2008 | Ishida |
| 2009/0000849 A1 | 1/2009 | Leonard et al. |
| 2009/0014246 A1 | 1/2009 | Lin |
| 2009/0014977 A1 | 1/2009 | Molenaar |
| 2009/0015023 A1 | 1/2009 | Fleckner |
| 2009/0037051 A1 | 2/2009 | Shimizu et al. |
| 2009/0064642 A1 | 3/2009 | Sato et al. |
| 2009/0065285 A1 | 3/2009 | Maeda et al. |
| 2009/0071737 A1 | 3/2009 | Leonard et al. |
| 2009/0071739 A1 | 3/2009 | Leonard et al. |
| 2009/0078082 A1 | 3/2009 | Poskie et al. |
| 2009/0078491 A1 | 3/2009 | Tsutsumikoshi et al. |
| 2009/0091101 A1 | 4/2009 | Leonard et al. |
| 2009/0091137 A1 | 4/2009 | Nishida et al. |
| 2009/0093928 A1 | 4/2009 | Getman et al. |
| 2009/0108546 A1 | 4/2009 | Ohletz et al. |
| 2009/0108617 A1 | 4/2009 | Songwe |
| 2009/0121518 A1 | 5/2009 | Leonard et al. |
| 2009/0146119 A1 | 6/2009 | Bailey et al. |
| 2009/0152035 A1 | 6/2009 | Okada et al. |
| 2009/0152036 A1 | 6/2009 | Okada et al. |
| 2009/0177345 A1 | 7/2009 | Severinsky et al. |
| 2009/0179509 A1 | 7/2009 | Gerundt et al. |
| 2009/0183939 A1 | 7/2009 | Smith et al. |
| 2009/0189373 A1 | 7/2009 | Schramm et al. |
| 2009/0227404 A1 | 9/2009 | Beyer |
| 2009/0240427 A1 | 9/2009 | Siereveld et al. |
| 2009/0261542 A1 | 10/2009 | Mcintyre |
| 2009/0286643 A1 | 11/2009 | Brown |
| 2009/0301830 A1 | 12/2009 | Kinsman et al. |
| 2009/0302590 A1 | 12/2009 | Van et al. |
| 2009/0314462 A1 | 12/2009 | Yahia et al. |
| 2010/0012412 A1 | 1/2010 | Deckard et al. |
| 2010/0017059 A1 | 1/2010 | Lu et al. |
| 2010/0019539 A1 | 1/2010 | Nakamura et al. |
| 2010/0019722 A1 | 1/2010 | Sanchez |
| 2010/0019729 A1 | 1/2010 | Kaita et al. |
| 2010/0031935 A1 | 2/2010 | Vandyne et al. |
| 2010/0057297 A1 | 3/2010 | Tagaki et al. |
| 2010/0078240 A1 | 4/2010 | Miura |
| 2010/0120565 A1 | 5/2010 | Kochidomari et al. |
| 2010/0121512 A1 | 5/2010 | Takahashi et al. |
| 2010/0121529 A1 | 5/2010 | Savaresi et al. |
| 2010/0152969 A1 | 6/2010 | Li et al. |
| 2010/0155170 A1 | 6/2010 | Melvin et al. |
| 2010/0162989 A1 | 7/2010 | Aamand et al. |
| 2010/0163324 A1 | 7/2010 | Jyoutaki et al. |
| 2010/0181134 A1 | 7/2010 | Sugiura |
| 2010/0187032 A1 | 7/2010 | Yamamura et al. |
| 2010/0194086 A1 | 8/2010 | Yamamura et al. |
| 2010/0211242 A1 | 8/2010 | Kelty et al. |
| 2010/0211261 A1 | 8/2010 | Sasaki et al. |
| 2010/0230876 A1 | 9/2010 | Noue et al. |
| 2010/0252972 A1 | 10/2010 | Cox et al. |
| 2010/0253018 A1 | 10/2010 | Peterson |
| 2010/0301571 A1 | 12/2010 | Van et al. |
| 2010/0311529 A1 | 12/2010 | Ochab et al. |
| 2010/0314184 A1 | 12/2010 | Stenberg et al. |
| 2011/0012334 A1 | 1/2011 | Malmberg |
| 2011/0035089 A1 | 2/2011 | Hirao et al. |
| 2011/0035105 A1 | 2/2011 | Jolly |
| 2011/0062748 A1 | 3/2011 | Kaita et al. |
| 2011/0074123 A1 | 3/2011 | Fought et al. |
| 2011/0092325 A1 | 4/2011 | Vuksa et al. |
| 2011/0094225 A1 | 4/2011 | Kistner et al. |
| 2011/0094813 A1 | 4/2011 | Suzuki et al. |
| 2011/0094816 A1 | 4/2011 | Suzuki et al. |
| 2011/0133438 A1 | 6/2011 | Haines et al. |
| 2011/0147106 A1 | 6/2011 | Wenger et al. |
| 2011/0153158 A1 | 6/2011 | Acocella |
| 2011/0155082 A1 | 6/2011 | Takano |
| 2011/0155087 A1 | 6/2011 | Wenger et al. |
| 2011/0155497 A1 | 6/2011 | Kobayashi et al. |
| 2011/0168126 A1 | 7/2011 | Fujikawa |
| 2011/0240393 A1 | 10/2011 | Hurd et al. |
| 2011/0298189 A1 | 12/2011 | Schneider et al. |
| 2012/0029770 A1 | 2/2012 | Hirao et al. |
| 2012/0031688 A1 | 2/2012 | Safranski et al. |
| 2012/0031693 A1 | 2/2012 | Deckard et al. |
| 2012/0031694 A1 | 2/2012 | Deckard et al. |
| 2012/0053790 A1 | 3/2012 | Oikawa |
| 2012/0053791 A1 | 3/2012 | Harada |
| 2012/0055728 A1 | 3/2012 | Bessho et al. |
| 2012/0055729 A1 | 3/2012 | Bessho et al. |
| 2012/0073527 A1 | 3/2012 | Oltmans et al. |
| 2012/0073537 A1 | 3/2012 | Oltmans et al. |
| 2012/0078470 A1 | 3/2012 | Hirao et al. |

(56) References Cited

U.S. PATENT DOCUMENTS

| | | |
|---|---|---|
| 2012/0085588 A1 | 4/2012 | Kinsman et al. |
| 2012/0119454 A1 | 5/2012 | Di Maria |
| 2012/0125022 A1 | 5/2012 | Maybury et al. |
| 2012/0152632 A1 | 6/2012 | Azuma |
| 2012/0161468 A1 | 6/2012 | Tsumiyama et al. |
| 2012/0168268 A1 | 7/2012 | Bruno et al. |
| 2012/0193163 A1 | 8/2012 | Wimpfheimer et al. |
| 2012/0212013 A1 | 8/2012 | Ripley et al. |
| 2012/0214626 A1 | 8/2012 | Cook |
| 2012/0217078 A1 | 8/2012 | Kinsman et al. |
| 2012/0217116 A1 | 8/2012 | Nishimoto |
| 2012/0223500 A1 | 9/2012 | Kinsman et al. |
| 2012/0247888 A1 | 10/2012 | Chikuma et al. |
| 2012/0265402 A1 | 10/2012 | Post et al. |
| 2012/0277953 A1 | 11/2012 | Savaresi et al. |
| 2012/0283930 A1 | 11/2012 | Venton-Walters et al. |
| 2012/0297765 A1 | 11/2012 | Mgild et al. |
| 2013/0009350 A1 | 1/2013 | Wolf-Monheim |
| 2013/0018559 A1 | 1/2013 | Epple et al. |
| 2013/0030650 A1 | 1/2013 | Norris et al. |
| 2013/0033070 A1 | 2/2013 | Kinsman et al. |
| 2013/0041545 A1 | 2/2013 | Baer et al. |
| 2013/0060423 A1 | 3/2013 | Jolly |
| 2013/0060444 A1 | 3/2013 | Matsunaga et al. |
| 2013/0062909 A1 | 3/2013 | Harris et al. |
| 2013/0074487 A1 | 3/2013 | Herold et al. |
| 2013/0075183 A1 | 3/2013 | Kochidomari et al. |
| 2013/0079988 A1 | 3/2013 | Hirao et al. |
| 2013/0087396 A1 | 4/2013 | Too et al. |
| 2013/0103259 A1 | 4/2013 | Eng et al. |
| 2013/0157794 A1 | 6/2013 | Stegelmann et al. |
| 2013/0158799 A1 | 6/2013 | Kamimura |
| 2013/0161921 A1 | 6/2013 | Cheng et al. |
| 2013/0175779 A1 | 7/2013 | Kvien et al. |
| 2013/0190980 A1 | 7/2013 | Ramirez Ruiz |
| 2013/0197732 A1 | 8/2013 | Pearlman et al. |
| 2013/0197756 A1 | 8/2013 | Ramirez Ruiz |
| 2013/0218414 A1 | 8/2013 | Meitinger et al. |
| 2013/0226405 A1 | 8/2013 | Koumura et al. |
| 2013/0261893 A1 | 10/2013 | Yang |
| 2013/0304319 A1 | 11/2013 | Daniels |
| 2013/0307243 A1 | 11/2013 | Ham |
| 2013/0319784 A1 | 12/2013 | Kennedy et al. |
| 2013/0319785 A1 | 12/2013 | Spindler et al. |
| 2013/0328277 A1 | 12/2013 | Ryan et al. |
| 2013/0334394 A1 | 12/2013 | Parison et al. |
| 2013/0338869 A1 | 12/2013 | Tsumano |
| 2013/0341143 A1 | 12/2013 | Brown |
| 2013/0345933 A1 | 12/2013 | Norton et al. |
| 2014/0001717 A1 | 1/2014 | Giovanardi et al. |
| 2014/0004984 A1 | 1/2014 | Aitcin |
| 2014/0005888 A1 | 1/2014 | Bose et al. |
| 2014/0008136 A1 | 1/2014 | Bennett |
| 2014/0012467 A1 | 1/2014 | Knox et al. |
| 2014/0046539 A1 | 2/2014 | Wijffels et al. |
| 2014/0058606 A1 | 2/2014 | Hilton |
| 2014/0060954 A1 | 3/2014 | Smith et al. |
| 2014/0062048 A1 | 3/2014 | Schlangen et al. |
| 2014/0065936 A1 | 3/2014 | Smith et al. |
| 2014/0067215 A1 | 3/2014 | Wetterlund et al. |
| 2014/0090935 A1 | 4/2014 | Pongo et al. |
| 2014/0095022 A1 | 4/2014 | Cashman et al. |
| 2014/0102820 A1 | 4/2014 | Deckard et al. |
| 2014/0103627 A1 | 4/2014 | Deckard et al. |
| 2014/0109627 A1 | 4/2014 | Lee et al. |
| 2014/0113766 A1 | 4/2014 | Yagyu et al. |
| 2014/0124279 A1 | 5/2014 | Schlangen et al. |
| 2014/0125018 A1 | 5/2014 | Brady et al. |
| 2014/0129083 A1 | 5/2014 | O'Connor et al. |
| 2014/0131971 A1 | 5/2014 | Hou |
| 2014/0136048 A1 | 5/2014 | Ummethala et al. |
| 2014/0156143 A1 | 6/2014 | Evangelou et al. |
| 2014/0167372 A1 | 6/2014 | Kim et al. |
| 2014/0203533 A1 | 7/2014 | Safranski et al. |
| 2014/0217774 A1 | 8/2014 | Peterson et al. |
| 2014/0224561 A1 | 8/2014 | Shinbori et al. |
| 2014/0230797 A1 | 8/2014 | Meshenky et al. |
| 2014/0235382 A1 | 8/2014 | Tsukamoto et al. |
| 2014/0244110 A1 | 8/2014 | Tharaldson et al. |
| 2014/0288763 A1 | 9/2014 | Bennett et al. |
| 2014/0311143 A1 | 10/2014 | Speidel et al. |
| 2014/0349792 A1 | 11/2014 | Aitcin |
| 2014/0353956 A1 | 12/2014 | Bjerketvedt et al. |
| 2014/0358373 A1 | 12/2014 | Kikuchi et al. |
| 2014/0360794 A1 | 12/2014 | Tallman |
| 2015/0002404 A1 | 1/2015 | Hooton |
| 2015/0029018 A1 | 1/2015 | Bowden et al. |
| 2015/0039199 A1 | 2/2015 | Kikuchi |
| 2015/0041237 A1 | 2/2015 | Nadeau et al. |
| 2015/0047917 A1 | 2/2015 | Burt et al. |
| 2015/0057885 A1 | 2/2015 | Brady et al. |
| 2015/0061275 A1 | 3/2015 | Deckard et al. |
| 2015/0071759 A1 | 3/2015 | Bidner et al. |
| 2015/0210137 A1 | 7/2015 | Kinsman et al. |
| 2015/0210319 A1 | 7/2015 | Tiramani |
| 2015/0259011 A1 | 9/2015 | Deckard et al. |
| 2015/0260123 A1 | 9/2015 | Knollmayr |
| 2015/0267792 A1 | 9/2015 | Hochmayr et al. |
| 2015/0275742 A1 | 10/2015 | Chekaiban et al. |
| 2015/0375614 A1 | 12/2015 | Osaki |
| 2015/0377341 A1 | 12/2015 | Renner et al. |
| 2016/0059660 A1 | 3/2016 | Brady et al. |
| 2016/0061314 A1 | 3/2016 | Kuhl et al. |
| 2016/0108866 A1 | 4/2016 | Dewit et al. |
| 2016/0160989 A1 | 6/2016 | Millard et al. |
| 2016/0167715 A1 | 6/2016 | Kosuge et al. |
| 2016/0176283 A1 | 6/2016 | Hicke et al. |
| 2016/0176284 A1 | 6/2016 | Nugteren et al. |
| 2016/0332533 A1 | 11/2016 | Tistle et al. |
| 2016/0341148 A1 | 11/2016 | Maki et al. |
| 2017/0029036 A1* | 2/2017 | Proulx .................. B60N 2/305 |
| 2017/0120946 A1 | 5/2017 | Gong et al. |
| 2017/0131095 A1 | 5/2017 | Kim |
| 2017/0152810 A1 | 6/2017 | Wicks |
| 2017/0166255 A1 | 6/2017 | Peterson et al. |
| 2017/0175621 A1 | 6/2017 | Schenkel |
| 2017/0199094 A1 | 7/2017 | Duff et al. |
| 2017/0233022 A1 | 8/2017 | Marko |
| 2017/0248087 A1 | 8/2017 | Reisenberger et al. |
| 2017/0268200 A1 | 9/2017 | Todokoro |
| 2018/0065465 A1* | 3/2018 | Ward ...................... B60G 7/02 |
| 2018/0118053 A1 | 5/2018 | Sunsdahl et al. |
| 2018/0142609 A1 | 5/2018 | Seo et al. |
| 2018/0178677 A1 | 6/2018 | Swain |
| 2018/0312025 A1 | 11/2018 | Danielson et al. |
| 2018/0326843 A1 | 11/2018 | Danielson et al. |
| 2019/0078679 A1 | 3/2019 | Leclair et al. |
| 2019/0118883 A1 | 4/2019 | Spindler et al. |
| 2019/0118884 A1 | 4/2019 | Spindler et al. |
| 2019/0143871 A1 | 5/2019 | Weber et al. |
| 2019/0210457 A1 | 7/2019 | Galsworthy |
| 2019/0210668 A1 | 7/2019 | Endrizzi |
| 2019/0248227 A1 | 8/2019 | Nugteren et al. |
| 2019/0264635 A1 | 8/2019 | Oltmans et al. |
| 2020/0010120 A1 | 1/2020 | Kinsman et al. |
| 2020/0010125 A1 | 1/2020 | Peterson |
| 2021/0023936 A1 | 1/2021 | Marietta |
| 2021/0024007 A1 | 1/2021 | Fredrickson |
| 2021/0088138 A1 | 3/2021 | Yoshino |
| 2021/0206219 A1 | 7/2021 | Stieglitz et al. |
| 2021/0300472 A1 | 9/2021 | Thomas et al. |
| 2021/0331543 A1 | 10/2021 | Zock et al. |
| 2021/0370737 A1 | 12/2021 | Zock et al. |
| 2022/0105795 A1 | 4/2022 | Nelson et al. |
| 2022/0120340 A1 | 4/2022 | Nichols et al. |
| 2022/0266645 A1 | 8/2022 | Badino et al. |
| 2022/0339984 A1 | 10/2022 | Starik et al. |
| 2023/0191904 A1 | 6/2023 | Rasa et al. |
| 2023/0322305 A1 | 10/2023 | Schleif et al. |
| 2023/0331081 A1 | 10/2023 | Weber et al. |

(56) References Cited

U.S. PATENT DOCUMENTS

| | | |
|---|---|---|
| 2023/0399975 A1 | 12/2023 | Tittl et al. |
| 2023/0415558 A1 | 12/2023 | Schleif et al. |

FOREIGN PATENT DOCUMENTS

| | | |
|---|---|---|
| CA | 2746655 A1 | 7/2010 |
| CN | 2255379 Y | 6/1997 |
| CN | 1268997 | 10/2000 |
| CN | 2544987 Y | 4/2003 |
| CN | 1654239 A | 8/2005 |
| CN | 1660615 A | 8/2005 |
| CN | 1749048 A | 3/2006 |
| CN | 1792661 A | 6/2006 |
| CN | 1810530 A | 8/2006 |
| CN | 1982110 A | 6/2007 |
| CN | 101424200 A | 5/2009 |
| CN | 101511664 A | 8/2009 |
| CN | 101549626 A | 10/2009 |
| CN | 101701547 A | 5/2010 |
| CN | 101708694 A | 5/2010 |
| CN | 201723635 U | 1/2011 |
| CN | 102069813 A | 5/2011 |
| CN | 102121415 A | 7/2011 |
| CN | 102168732 A | 8/2011 |
| CN | 201914049 U | 8/2011 |
| CN | 102226464 A | 10/2011 |
| CN | 102256825 A | 11/2011 |
| CN | 202040257 U | 11/2011 |
| CN | 102616104 A | 8/2012 |
| CN | 102627063 A | 8/2012 |
| CN | 102678808 A | 9/2012 |
| CN | 102729760 A | 10/2012 |
| CN | 202468817 U | 10/2012 |
| CN | 102840265 A | 12/2012 |
| CN | 202879243 U | 4/2013 |
| CN | 103075278 A | 5/2013 |
| CN | 202986930 U | 6/2013 |
| CN | 103370221 A | 10/2013 |
| CN | 203702310 U | 7/2014 |
| CN | 104321241 A | 1/2015 |
| CN | 104608825 A | 5/2015 |
| CN | 105555558 A | 5/2016 |
| CN | 106515851 A | 3/2017 |
| CN | 106740079 A | 5/2017 |
| CN | 212690200 U | 3/2021 |
| CN | 215292711 U | 12/2021 |
| DE | 0037435 | 10/1886 |
| DE | 0116605 | 2/1900 |
| DE | 1755101 | 4/1971 |
| DE | 2210070 | 9/1973 |
| DE | 3033707 | 4/1982 |
| DE | 3825349 A1 | 2/1989 |
| DE | 4427322 A1 | 2/1996 |
| DE | 19508302 A1 | 9/1996 |
| DE | 4447138 | 12/1997 |
| DE | 19735021 A1 | 2/1999 |
| DE | 19949787 A1 | 4/2000 |
| DE | 19922745 A1 | 12/2000 |
| DE | 202005017990 U1 | 3/2006 |
| DE | 102005003077 A1 | 8/2006 |
| DE | 202005005999 U1 | 8/2006 |
| DE | 102007024126 | 12/2008 |
| DE | 102010020544 A1 | 1/2011 |
| DE | 102014000450 A1 | 8/2014 |
| DE | 102016012781 A1 | 4/2017 |
| EP | 0047128 | 3/1982 |
| EP | 0237085 | 9/1987 |
| EP | 0238077 A2 | 9/1987 |
| EP | 0398804 A1 | 11/1990 |
| EP | 0403803 A1 | 12/1990 |
| EP | 0471128 A1 | 2/1992 |
| EP | 0511654 A2 | 11/1992 |
| EP | 0544108 A1 | 6/1993 |
| EP | 0546295 A1 | 6/1993 |
| EP | 0405123 | 10/1993 |
| EP | 0568251 A1 | 11/1993 |
| EP | 0575962 A1 | 12/1993 |
| EP | 0473766 | 2/1994 |
| EP | 0691226 A1 | 1/1996 |
| EP | 0709247 A2 | 5/1996 |
| EP | 0794096 A2 | 9/1997 |
| EP | 0856427 A1 | 8/1998 |
| EP | 0893618 A2 | 1/1999 |
| EP | 0898352 A1 | 2/1999 |
| EP | 0908373 A1 | 4/1999 |
| EP | 0908375 A1 | 4/1999 |
| EP | 1013310 A1 | 6/2000 |
| EP | 1172239 A2 | 1/2002 |
| EP | 1215107 A1 | 6/2002 |
| EP | 1219475 A1 | 7/2002 |
| EP | 1382475 A1 | 1/2004 |
| EP | 1433645 A2 | 6/2004 |
| EP | 1449688 A2 | 8/2004 |
| EP | 1481834 A2 | 12/2004 |
| EP | 1493624 A1 | 1/2005 |
| EP | 1164897 | 2/2005 |
| EP | 1557345 A2 | 7/2005 |
| EP | 1564123 A2 | 8/2005 |
| EP | 1697646 | 9/2006 |
| EP | 2033878 A1 | 3/2009 |
| EP | 2055520 A2 | 5/2009 |
| EP | 2057060 A2 | 5/2009 |
| EP | 2123933 A2 | 11/2009 |
| EP | 2145808 A1 | 1/2010 |
| EP | 1520978 B1 | 4/2010 |
| EP | 2236395 A1 | 10/2010 |
| EP | 1980741 B1 | 9/2011 |
| EP | 2517904 A1 | 10/2012 |
| EP | 2589785 A1 | 5/2013 |
| EP | 2923926 A2 | 9/2015 |
| FR | 2460797 A1 | 1/1981 |
| FR | 2914597 A1 | 10/2008 |
| FR | 2935642 | 3/2010 |
| FR | 2936028 A1 | 3/2010 |
| FR | 2941424 A1 | 7/2010 |
| GB | 2036659 A | 7/1980 |
| GB | 2081191 A | 2/1982 |
| GB | 2316923 A | 3/1998 |
| GB | 2349483 A | 11/2000 |
| GB | 2423066 A | 8/2006 |
| GB | 2431704 A | 5/2007 |
| GB | 2454349 A | 5/2009 |
| GB | 2505767 A | 3/2014 |
| IN | 1746803 A | 3/2006 |
| JP | 58-126434 | 7/1983 |
| JP | 59-039933 | 3/1984 |
| JP | 60-209616 A | 10/1985 |
| JP | 61-135910 | 6/1986 |
| JP | 62-007925 A | 1/1987 |
| JP | 02-155815 A | 6/1990 |
| JP | 04-368211 A | 12/1992 |
| JP | 05-149443 A | 6/1993 |
| JP | 05-178055 A | 7/1993 |
| JP | 06-156036 A | 6/1994 |
| JP | 06-325977 A | 11/1994 |
| JP | 07-040783 | 2/1995 |
| JP | 07-117433 | 5/1995 |
| JP | 10-280968 A | 10/1998 |
| JP | 2898949 B2 | 6/1999 |
| JP | 11-334447 A | 12/1999 |
| JP | 2000-177434 A | 6/2000 |
| JP | 2001-018623 A | 1/2001 |
| JP | 3137209 B2 | 2/2001 |
| JP | 2001-097255 A | 4/2001 |
| JP | 2001-121939 A | 5/2001 |
| JP | 2001-130304 A | 5/2001 |
| JP | 2002-219921 A | 8/2002 |
| JP | 2003-237530 A | 8/2003 |
| JP | 2004-243992 A | 9/2004 |
| JP | 2004-308453 A | 11/2004 |
| JP | 2005-130629 A | 5/2005 |
| JP | 2005-186911 A | 7/2005 |
| JP | 2005-193788 A | 7/2005 |
| JP | 2005-299469 A | 10/2005 |

(56) References Cited

FOREIGN PATENT DOCUMENTS

| | | | |
|---|---|---|---|
| JP | 2006-232058 A | 9/2006 | |
| JP | 2006-232061 A | 9/2006 | |
| JP | 2006-256579 A | 9/2006 | |
| JP | 2006-256580 A | 9/2006 | |
| JP | 2006-281839 A | 10/2006 | |
| JP | 2007-064080 A | 3/2007 | |
| JP | 2007-106319 A | 4/2007 | |
| JP | 2007083864 A * | 4/2007 | |
| JP | 2007-278228 A | 10/2007 | |
| JP | 2007-532814 | 11/2007 | |
| JP | 2008-013149 A | 1/2008 | |
| JP | 2009-035220 A | 2/2009 | |
| JP | 2009-160964 A | 7/2009 | |
| JP | 2009-173147 A | 8/2009 | |
| JP | 2009-220765 A | 10/2009 | |
| JP | 2009-241872 A | 10/2009 | |
| JP | 2009-281330 A | 12/2009 | |
| JP | 2010-064744 A | 3/2010 | |
| JP | 2010-095106 A | 4/2010 | |
| JP | 2011-126405 A | 6/2011 | |
| JP | 2017043130 A * | 3/2017 | |
| KR | 10-2008-0028174 A | 3/2008 | |
| WO | 92/10693 A1 | 6/1992 | |
| WO | 98/30430 A1 | 7/1998 | |
| WO | 00/53057 A1 | 9/2000 | |
| WO | 2004/085194 A1 | 10/2004 | |
| WO | 2005/059382 A1 | 6/2005 | |
| WO | 2007/103197 A2 | 9/2007 | |
| WO | 2008/013564 A1 | 1/2008 | |
| WO | 2008/016377 A2 | 2/2008 | |
| WO | 2008/115459 A1 | 9/2008 | |
| WO | 2009/059407 A1 | 5/2009 | |
| WO | 2009/096998 A1 | 8/2009 | |
| WO | 2010/081979 A1 | 7/2010 | |
| WO | 2010/148014 A1 | 12/2010 | |
| WO | 2012/018896 A2 | 2/2012 | |
| WO | 2012/040553 A2 | 3/2012 | |
| WO | 2012/109546 A1 | 8/2012 | |
| WO | 2012/174793 A1 | 12/2012 | |
| WO | 2013/166310 | 11/2013 | |
| WO | 2013/174662 A1 | 11/2013 | |
| WO | 2014/039432 A2 | 3/2014 | |
| WO | 2014/039433 A2 | 3/2014 | |
| WO | 2014/047488 A1 | 3/2014 | |
| WO | 2014/059258 A1 | 4/2014 | |
| WO | 2014/143953 A2 | 9/2014 | |
| WO | 2014/193975 A1 | 12/2014 | |
| WO | 2015/036984 A1 | 3/2015 | |
| WO | 2015/036985 A1 | 3/2015 | |
| WO | 2015/159571 A1 | 10/2015 | |
| WO | WO-2016038591 A1 * | 3/2016 | ............. F02B 29/04 |
| WO | 2016/099770 | 6/2016 | |
| WO | 2016/186942 | 11/2016 | |
| WO | 2018/118176 | 6/2018 | |
| WO | 2018/118508 | 6/2018 | |
| WO | 2019/140026 | 7/2019 | |
| WO | 2020/223379 | 11/2020 | |

OTHER PUBLICATIONS

2017 Can-Am Maverick X3 Walk Around https://youtu.be/5I0sIScF-y4?si=xBV9LzjGUNORi9A9 (Year: 2016).*

International Search Report and Written Opinion received for PCT Patent Application No. PCT/US21/31782, dated Aug. 5, 2021, 11 pages.

International Search Report and Written Opinion received for PCT Patent Application No. PCT/US21/31804, dated Aug. 9, 2021, 6 pages.

Ridenow Powersports. 2017 Can-Am Maverick X3 Walk Around. YouTube. Sep. 14, 2016 (Sep. 14, 2016). [retrieved on Jul. 6, 2021]. Retrieved from internet: <URL: https://www.youtube.com/watch?v=5I0sIScF-y4> entire video. See pp. 6-8 of the ISA/237.

Suzuki; 1991 Suzuki GSX1100G Cylinder OEM Parts Diagram; retrieved Mar. 17, 2022 https://www.revzilla.com/oem/suzuki/1991-suzuki-gsx1100g/cylinder?submodel=gsx1100gp (Year: 2017).

International Preliminary Report on Patentability issued by The International Bureau of WIPO, dated Nov. 9, 2010, for International Patent Application No. PCT/US2009/042985; 13 pages.

International Preliminary Report on Patentability issued by the International Searching Authority, dated May 6, 2021, for International Patent Application No. PCT/US2020/030518; 27 pages.

International Preliminary Report on Patentability received for PCT Patent Application No. PCT/US10/49167, mailed on Oct. 18, 2012, 30 pages.

International Preliminary Report on Patentability received for PCT Patent Application No. PCT/US2015/061272, mailed on May 12, 2017, 22 pages.

International Preliminary Report on Patentability received for PCT Patent Application No. PCT/US2016/031992, mailed on Nov. 30, 2017, 15 pages.

International Preliminary Report on Patentability received for PCT Patent Application No. PCT/US2017/065724, mailed on Jan. 7, 2019, 16 pages.

International Preliminary Report on Patentability, dated May 28, 2013, for related International Patent Application No. PCT/US2011/046395, 31 pages.

International Search Report and Written Opinion issued by the European Patent Office, dated Aug. 27, 2008, in related International Patent Application No. PCT/US2008/003485; 15 pages.

International Search Report and Written Opinion issued by the European Patent Office, dated Feb. 18, 2014, for International Application No. PCT/US2013/068937; 11 pages.

International Search Report and Written Opinion issued by the European Patent Office, dated Jan. 14, 2014, for International Patent Application No. PCT/US2013/064516; 24 pages.

International Search Report and Written Opinion issued by the European Patent Office, dated Jul. 31, 2013, for International Patent Application No. PCT/US2013/039304; 11 pages.

International Search Report and Written Opinion issued by the European Patent Office, dated Jun. 28, 2012, for International PCT Application No. PCT/US2012/024664; 19 pages.

International Search Report and Written Opinion issued by the European Patent Office, dated Oct. 2, 2008, in related International Patent Application No. PCT/US2008/003483; 18 pages.

International Search Report and Written Opinion issued by the European Patent Office, dated Oct. 9, 2014, for International Patent Application No. PCT/US2014/028152; 20 pages.

International Search Report and Written Opinion issued by the European Patent Office, mailed Dec. 18, 2009, for International Patent Application No. PCT/US2009/042986; 15 pages.

International Search Report and Written Opinion issued by the European Patent Office, mailed Sep. 4, 2009, for International Patent Application No. PCT/US2009/042985; 18 pages.

International Search Report and Written Opinion issued by the International Searching Authority, dated Oct. 21, 2020, for International Patent Application No. PCT/US2020/42787; 18 pages.

International Search Report and Written Opinion received for PCT Patent Application No. PCT/US10/49167, mailed on Jul. 6, 2011, 9 pages.

International Search Report and Written Opinion received for PCT Patent Application No. PCT/US14/39824, mailed on Sep. 19, 2014, 9 pages.

International Search Report and Written Opinion received for PCT Patent Application No. PCT/US2015/061272, mailed on Aug. 12, 2016, 13 pages.

International Search Report and Written Opinion received for PCT Patent Application No. PCT/US2016/031992, mailed on Sep. 19, 2016, 20 pages.

International Search Report and Written Opinion received for PCT Patent Application No. PCT/US2017/065724, mailed on Jun. 18, 2018, 14 pages.

International Search Report and Written Opinion received for PCT Patent Application No. PCT/US2019/012958, mailed on Jul. 3, 2019, 27 pages.

(56) References Cited

OTHER PUBLICATIONS

International Search Report and Written Opinion received for PCT Patent Application No. PCT/US2020/030518, mailed on Sep. 11, 2020, 14 pages.
International Search Report issued by the European Patent Office, dated Jun. 3, 2008, in related International Patent Application No. PCT/US2008/003480; 5 pages.
International Search Report issued by the International Searching Authority, dated Jun. 18, 2018, for related International Patent Application No. PCT/US2017/065724; 7 pages.
International Search Report of the International Searching Authority, dated Sep. 4, 2012, for related International Patent Application No. PCT/US2011/046395; 6 pages.
Invitation to Pay Additional Fees received for PCT Patent Application No. PCT/US2017/065724, mailed on Apr. 10, 2018, 10 pages.
Kawasaki Mule The Off-Road Capable 610 4 .times. 4 XC Brochure 2011, .COPYRGT. 2010, 6 pages.
Kawasaki Mule Utility Vehicle Brochure 2009, .COPYRGT. 2008; 10 pages.
Kawasaki Teryx 750 F1 4 x 4 Sport Brochure 2011, (Copyrights) 2010; 6 pages.
Kawasaki Teryx Recreation Utility Vehicle Brochure 2009, .COPYRGT. 2008; 8 pages.
Letter Exam Report issued by the State Intellectual Property Office (SIPO), dated Mar. 18, 2015, for related Chinese Application No. 201080046628.5; 20 pages.
Mtx (Imtx Audio Thunder Sports RZRPod65-owners-manual, 2016); 8 pages.
New Arctic Cat Side by Side, youtube.com, https://www.youtube.com/watch?-gQGAYSz1bME&fs=1&hl=en_US, posted Mar. 9, 2011; 1 page.
Office Action issued by the Canadian Intellectual Property Office, dated Apr. 1, 2021, for Canadian Patent Application to. 2,985,632; 4 pages.
Office Action issued by the Canadian Intellectual Property Office, dated Oct. 27, 2020, for Canadian Patent Application No. 3,044,002; 4 pages.
Office Action issued by the U.S. Patent and Trademark Office, dated Oct. 1, 2018, for U.S. Appl. No. 15/751,403; 7 pages.
Outlander X mr 850, available at https://can-am.brp.com/off-road/atv/outlander/outlander-x-mr-850.html; COPYRGT. 2003-2017; 3 pages.
Patent Examination Report issued by the Australian Government IP Australia, dated Apr. 7, 2016, for Australian Patent Application No. 2013329090; 3 pages.
Photo, Facebook.com, Jake Brattain, https://www.facebook.com/photo.php?fbid=412473845198&set=pb.512920198.-2207520000.1541691407. &type=3&theater, post dated Mar. 30, 2010;1 page.
Photo, Facebook.com, Jake Brattain, https://www.facebook.com/photo.php?fbid=412473865198&set=pb.512920198.-2207520000.1541691407. &type=3&theater, post dated Mar. 30, 2010;1 page.
Photo, Facebook.com, Jake Brattain, https://www.facebook.com/photo.php?fbid=412474325198&set=pb.512920198.-2207520000.1541691407. &type=3&theater, post dated Mar. 30, 2010; 1 page.
Photo, Facebook.com, Jake Brattain, https://www.facebook.com/photo.php?fbid=412474575198&set=pb.512920198.-2207520000.1541691407. &type=3&theater, post dated Mar. 30, 2010; 1 page.
Photo, Facebook.com, Jake Brattain, https://www.facebook.com/photo.php?fbid=412474695198&set=pb.512920198.-2207520000.1541691407. &type=3&theater, post dated Mar. 30, 2010; 1 page.
Photo, Facebook.com, Jake Brattain, https://www.facebook.com/photo.php?fbid=412474765198&set=pb.512920198.-2207520000.1541691407. &type=3&theater, post dated Mar. 30, 2010; 1 page.
Photo, Facebook.com, Jake Brattain, https://www.facebook.com/photo.php?fbid=412475960198&set=pb.512920198.-2207520000.1541691407. &tye=3&theater, post dated Mar. 30, 2010; 1 page.
Polaris Ranger Brochure 2009, copyright 2008; 32 pages.
Polaris Ranger Brochure ATVs and Side .times. Sides Brochure 2010, .COPYRGT. 2009, 26 pages.
Polaris Ranger Off-Road Utility Vehicles Brochure 2004, .COPYRGT. 2003; 20 pages.
Polaris Ranger RZR Brochure 2011, .COPYRGT. 2010; 16 pages.
Polaris Ranger Welcome to Ranger Country Brochure 2006, .COPYRGT. 2005, 24 pages.
Polaris Ranger Work/Play Only Brochure 2008, .COPYRGT. 2007, 28 pages.
Polaris Rzr Xp 1000 Radiator Relocation Kit, https://abffabrication.com/shop/polaris-rzr-xp-1000-radiator-relocation-kit/.
Polaris RZR XP 900 Review, retrieved from www.world-of-atvs.com/polaris-rzr-xp-900.html on Jan. 10, 2019, Internet Wayback Machine capture dated Mar. 12, 2012 (Year: 2012).
Radiator Relocation Kit for Polaris Scrambler, High Lifter, http://www.highlifter.com/p-4598-radiator-relocation-kit-for-polaris-scra-mbler-8501000-see-apps.aspx, last accessed Nov. 4, 2015, 1 page.
Radiator Relocation Kit-Polaris Sportsman 550/850, High Lifter, http://www.highlifter.com/p-2686-radiator-relocation-kit-polaris-sportsma-n-550850-see-apps.aspx, last accessed Nov. 4, 2015, 2 pages.
Ranger Xp 900 High Lifter Ground Clearance Demo-Polaris RANGER, Youtube.com, https://www.youtube.com/watch?v=jfGho4ESvyY, published Jul. 27, 2015; 1 page.
Ray Sedorchuk, New for 2004, Yamaha Rhino 660 4 x 4, ATV Connection Magazine, (Copyrights) 2006; 3 pages.
Redline Specs, copyright 2008, available at www.RedlinePerforms.com., 2 pages.
Renegade X MR 1000R, Can-Am, http://can-am.brp.com/off-road/atv/renegade/renegade-x-mr-1000R.html, copyright 2003-2015, 12 pages.
Response to Office Action filed with the U.S. Patent and Trademark Office, filed Dec. 19, 2018, for U.S. Appl. No. 15/751,403; 9 pages.
RZR Pro XP Sport, Published date unavailable [online], [retrieved on 2021-07-25], Retrieved from the Internet: https://rzr.polaris.com/en-US/rzr-pro-xp-sport-rockford-fosgate-le/build-color/ (Year: 2021), 1 page.
RZR XP (Registered) 1000 High Lifter Edition Stealth Black, https://rzr.polaris.com/en-US/2015/high-performance/rzr-xp-1000-eps-high-lifter-edition-stealth-black-2015-rzr/; 4 pages.
RZR XP 100 EPS, High Lifter Velocity Blue, http://www.polaris.com/en-US/rzr-side-by-side/rzr-xp-1000-eps-high-lifter-edition.
RZR XP 1000 High Lifter Edition-Polaris RZR Sport Side by Side ATV, Youtube.com, https://www.youtube.com/watch?—RKRVulGlzuo, published Jul. 27, 2014; 1 page.
Sal & Barbara at S&B's, Particle Separator for 2014-16 Polaris RZR 100, http://www.sbfilters.com/particle-separator-2014-17-polaris-rzr-1000.
Second Office Action issued by the China National Intellectual Property Administration, dated Jul. 3, 2020, for Chinese Patent Application No. 201680028024.5; 7 pages.
Select Increments 2007-2018 Compatible With Jeep Wrangler JK and Unlimited With Infinity or Alpine Premium Factory Systems Pillar Pods with Kicker speakers PP0718-IA-K (Select), Dec. 14, 2018; 6 pages.
Shock Owner's Manual: Float ATV Front Applications-Fox Racing Shox, 2004, 21 pgs.
Shock Owner's Manual: Float ATV+Snowmobile--Fox Racing Shox, 2006, 18 pgs.
Shock Owner's Manual: Float MXR-Fox Racing Shox, 2006, 16 pgs.
Shock Owner's Manual: Float X Evol-Snowmobile Applications, 2006, 32 pgs.
The International Bureau of WIPO, International Preliminary Report on Patentability for PCT/US2009/042985, Nov. 9, 2010, 11 pgs.
Troy Merrifield, Redline's Rockin' Riot, UTV Off-Road Magazine, published in vol. 4, Issue 1, Feb./Mar. 2009, available at http://www.1redline.com/news.sub.- events/PDF/Redline.sub.-Riot.sub.-Article.sub.-01.sub.-2009.pdf., last accessed on Feb. 15, 2012, pp. 16-19.
Welcome to Ranger Country brochure, COPYRGT. 2005, Polaris Industries Inc., 24 pgs.

(56) References Cited

OTHER PUBLICATIONS

Wild Boar ATV Parts, Airaid Intake XP 900 Polaris, Snorkel Kit, https://www.wildboaratvparts.com/airaid-intake-xp-900-polaris-snorkel-kit-free-shipping-529-00/.
Work/Play Only Ranger brochure, .COPYRGT. 2007, Polaris Industries Inc., 28 pgs.
Written Opinion of the International Searching Authority, dated Feb. 3, 2013, for related International Patent Application No. PCT/US2011/046395; 7 pages.
XR Bull Spaider 500 MOD 2011, anuncios ya, https://mexicali.anunciosya.com.mx/xr-bull-spaider-500-mod-2011-en-mexicali-SWqi, May 24, 2011; 4 pages.
XR Bull Spider 500CC 4x4 360°.AVI, youtube.com, https://www.youtube.com/watch?v =—jSzDvute8Q, posted Feb. 8, 2010; 1 page.
Yamaha, Company Website, 2006 Rhino 450 Auto 4 .times. 4, .COPYRGT. 2005, 3 pages.
Yamaha, Company Website, 2006 Rhino 660 Auto 4 x 4, (Copyrights) 2006; 4 pages.
Yamaha, company website, 2006 Rhino 660 Auto 4.times.4 Special Edition, Copyright 2006, 4 pgs.
Yamaha, Company Website, Rhino 660 Auto 4 x 4 Exploring Edition Specifications, (Copyrights) 2006; 3 pages.
"2012 Arctic Cat Wildcat 1000i H.O. Preview," ATV.Com, https://www.atv.com/manufacturers/arctic-cat/2012-arctic-cat-wildcat-1000i-ho-preview-2014.html, dated Jul. 26, 2011; 10 pages.
"Arctic Cat Unleashes a Wild Cat at Recent Dealer Show", UTVGuide.net, https://www.utvguide.net/arctic-cat-unleashes-a-wild-cat-at-recent-dealer-show/, posted Mar. 29, 2011; 5 pages.
"Arctic Cat Unleashes a Wildcat at Recent Dealer Show", Dirt Toys, https://www.dirttoysmag.com/2011/05/arctic-cat-unleashes-a-wildcat, May 2011 Issue; 4 pages.
"Artie Cat Breaks Silence on New Side-by-Side," Lucas Cooney, https://www.atv.com/blogi2011/03/arctic-cat-breaks-silence-on-new-side-by-side.html, dated Mar. 24, 2011; 5 pages.
"Commander Performance Modifications: Radiator Relocate for Mud", commanderforums.org, https://www.commanderforums.org/forums/commander-performance-modifications/7059-radiator-relocate-mud-3.html, Aug. 28, 2012; 7 pages.
"Custom Weber Intercooler Bed Mount with Dual 5.2" Spal Fans, RZRForums.net, https://www.rzrforums.net/forced-induction/19182-custom-weber-intercooler-bed-mount-w-dual-5-2-spal-fans.html, Oct. 30, 2009; 10 pages.
"Engine firing change '13 850", PolarisATVForums.com internet forum discussion thread dated Nov. 21, 2012.
"Honda develps a powerful, fuel-efficient 700cc engine for midsize motorcycle", Honda news release from www.world.honda.com; dated Sep. 26, 2011.
"Modified RedLine Revolt," RDC Race-deZert.com, https://www.race-dezert.com/forum/threads/modified-redline-revolt.92038/, dated Mar. 10, 2011; 5 pages.
"National Guard/Coastal Racing Polaris RZR XP 900 UTV Race Test," JeffM. Vanasdal, ATVriders.com, http://www.atvriders.com/atvreviews/polaris-2012-coastal-racing-rzr-xp-900-sxs-utv-worcs-race-review-p4.html; Feb. 25, 2012; 8 pages.
"Rad Relocation Kit", RZRFarums.net, https://www.rzrforums.net/engine-drivetrain/93153-rad-relocation-kit.html, Nov. 9, 2012; 8 pages.
"Radiator in the back", RZRForums.net, https://www.rzrforums.net/rzr-xp-900/63047-radiator-back.html, Nov. 14, 2011; 4 pages.
"Radiator Relocate", RZRForums.net, https://www.rzrforums.net/muddin/14716-radiator-relocate.html, Jul. 23, 2009; 7 pages.
"Radiator relocation", RZRForums.net, https://www.rzrforums.net/general-rzr-discussion/8440-radiator-relocation.html, Feb. 4, 2009; 7 pages.
"Relocated Radiator?", RZRForums.net, https://www.rzrforums.net/muddin/75562-relocated-radiator.html, Apr. 6, 2012; 7 pages.
"Rhino Radiator Relocation", HighLifter Forum, http://forum.highlifter.com/Rhino-Radiator-Relocation-m2180231.aspx, Aug. 30, 2007; 5 pages.

"RZR Radiator Relocation?", RZRForums.net, https://www.rzrforums.net/general-rzr-discussion/13963-rzr-radiator-relocation.html, Jul. 3, 2009; 5 pages.
"Sporty New Artie Cat Side-by-Side," Lucas Cooney, https://www.atv.com/blog/2011/03/sporty-new-arctic-cat-side-by-side-video.html, dated Mar. 10, 2011; 4 pages.
"Straight-twin engine", Wikipedia.org internet encyclopedia entry.
"Who makes the best turbo kit for the Polarsis RZR ?? ", RZRforums.net internet forum discussion thread dated Jun. 25, 2010.
1989 Honda Pilot f1400, Powersports Log, http://powersportslog.com/asp/ltem.asp?soldid=29871&makeHonda&theday=4%2F16%2F2011, posted Apr. 16, 2011; 2 page.
2009 Honda Big Red, ATV Illustrated at http://www.atvillustrated.com/?q=node/6615/20/2008, 6 pgs.
2012 Arctic Cat Wildcat with 95-hp & 16-in. Travel, ArcticInsider.com, http://www.arcticinsider.com/Article/2012-Arctic-Cat-Wildcat-with-95-hp-16-in-Travel; 4 pages.
2012 Coastal Racing Polaris XP 900 UTV, photograph, http://www.atvriders.com/images/polaris/2012-coastal-racing-polaris-xp-900-utv-race-review/2012-polaris-rzr-xp-900-utv-sxs-jeff-vanasdal.jpg; 1 page.
2015 Polaris Owner's Manual for Maintenance and Safety, RZR (Registered) XP 1000 EPS High Lifter Edition, (Copyright) 2015; 151 pages.
2016 MUDPRO 700 Limited, Artic Cat, http://www.articcat.com/dirt/atvs/model/2016-en-mudpro-700-limited/, copyright 2015, 23 pages.
53 Series Aerocharger Rzr Xp 900 Turbocharger kit, retrieved from www.sidebysidesports.com/53seaerzxp9.html on Jan. 10, 2019, Internet Wayback Machine capture dated Apr. 26, 2011 (Year: 2011).
Arctic Cat, company website, Prowler XT 650 H1, undated, 9 pgs.
Boss Plow System for RANGER, at http:www.purepolaris.com/Detail.aspx?ItemID=2876870(PolarisPGACatalog), May 14, 2008, 2 pgs.
Boss Smarthitch 2 at http:www.bossplow.com/smarthitch.html, May 14, 2008, 13 pgs.
BRP Can-Am Commander photo, undated; 1 page.
Buyer's Guide Supplement, 2006 Kart Guide, Powersports Business Magazine; 6 pages.
Can-Am Maverick Sport 60 (front deflector panel for hot radiator air, 2019.
Club Car, Company Website, product pages for XRT 1500 SE, undated; 2 pages.
Diver Down Snorkel for Polaris Scrambler 850/1000, High Lifter, last accessed Nov. 4, 2015, http://www.highlifter.com/p-4687-diver-down-snorkel-for-polaris-scrambler--8501000-see-apps.aspx; 1 page.
Duneguide.com, "Product Review 2009 Honda Big Red MUV," retrieved from http:www.duneguide.com/ProductReview.sub.--Honda.sub.--BigRed.htm, May 20, 2008, 3 pgs.
Eulenbach, Dr.Ing. Dieter, NIVOMAT: The Automatic Level Control System with Spring Function and Damping Function, Lecture given as part of the course "Springing and damping systems for road and rail vehicles" at the Technical Academy of Esslingen, Oct. 11, 2000, 18 pgs.
Excerpts from Honda Service Manual 89 FL400R Pilot, Honda Motor Co., Ltd., copyright 1988; 24 pages.
Fang et al., Research on Generator Set Control of Ranger Extender Pure Electric Vehicles, Power and Energy Conference (APPEEC), 2010 Asia-Pacific, Mar. 31, 2010.
Heitner, Range extender hybrid vehicle, Intersociety Energy Conversion Engineering Conference Proceedings, vol. 4, pp. 323-338, 1991.
High-Performance "Truck Steering" Automotive Engineering, Society of Automotive Engineers. Warrendale, US, vol. 98. No. 4, Apr. 1, 1990, pp. 56-60.
Honda Hippo 1800 New Competition for Yamaha's Rhino, Dirt Wheels Magazine, Apr. 2006, pp. 91-92.
Images for rear radiator, https://www.google.com/search?q=rear+radiator+site%3Arzrforums.net&Ir=&hl=en&as_qdr=all&source_Int&tbs=cdr% BA1%2Ccd_min%3A%2Ccd_max%3A2012 available before Dec. 31, 2012; 2 page.
Improved Fox Shox, Motocross Action, Mar. 1977 issue, 1 pg.

(56) References Cited

OTHER PUBLICATIONS

International Preliminary Report on Patentability issued by the European Patent Office, dated Aug. 31, 2010, for International Patent Application No. PCT/US2009/042986; 14 pages.
International Preliminary Report on Patentability issued by the European Patent Office, dated Mar. 8, 2013, for International PCT Application No. PCT/US2012/024664; 24 pages.
International Preliminary Report on Patentability issued by the European Patent Office, dated May 11, 2009, in related International Patent Application No. PCT/US2008/003483; 21 pages.
International Preliminary Report on Patentability issued by The International Bureau of WIPO, dated Apr. 14, 2015, for International Patent Application No. PCT/US2013/064516; 18 pages.
International Preliminary Report on Patentability issued by The International Bureau of WIPO, dated Jul. 14, 2020, for International Patent Application No. PCT/US2019/012958; 19 pages.
International Preliminary Report on Patentability issued by the International Bureau of WIPO, dated May 12, 2015, for International Application No. PCT/US2013/068937; 7 pages.
International Preliminary Report on Patentability issued by the International Searching Authority, dated Nov. 15, 2022, for International Patent Application No. PCT/US2021/031782; 9 pages.
RideNow Powersports, "2017 Can-Am Maverick X3 Walk Around", 14 Sep. 2016, YouTube.com. https://www.youtube.com/watch?v=510slScF-y4 (Year: 2016); 1 page.
Atvondemand, "2014 Polaris Sportsman Ace First Test", Youtube, Retereived from the link: "https://www.youtube.com/watch?v=5pv55buyge8", Jan. 26, 2014.
http://revistamoto.com/inicio/rm/prueba-xrbull-xr500-spider.html.
https://drive.google.com/file/d/0B851Fdu_42hLaE5MdDBLWHFReU9zQjhlWIB1bkU1QQ/view (service manual).
Lijun, P., "Differential steering six A review of the current status of wheel vehicle suspension systems.", A Mechanical Engineer, Issue No. 04, Apr. 10, 2016, pp. 1-70.
Office Action issued by the Canadian Intellectual Property Office, dated May 2, 2023, for Canadian Patent Application No. 3152773, 5 pages.
http://photobucket.com/gallery/user/ben8225/media/cGF0aDovRFNDRjE0ODkuanBn/?ref=1.
RideNow Powersports, "2017 Can-Am Maverick X3 Walk Around", 14 Sep. 2016, YouTube.com. https://www.youtube.com/watch?v=510slScF-y4 (Year: 2016).

\* cited by examiner

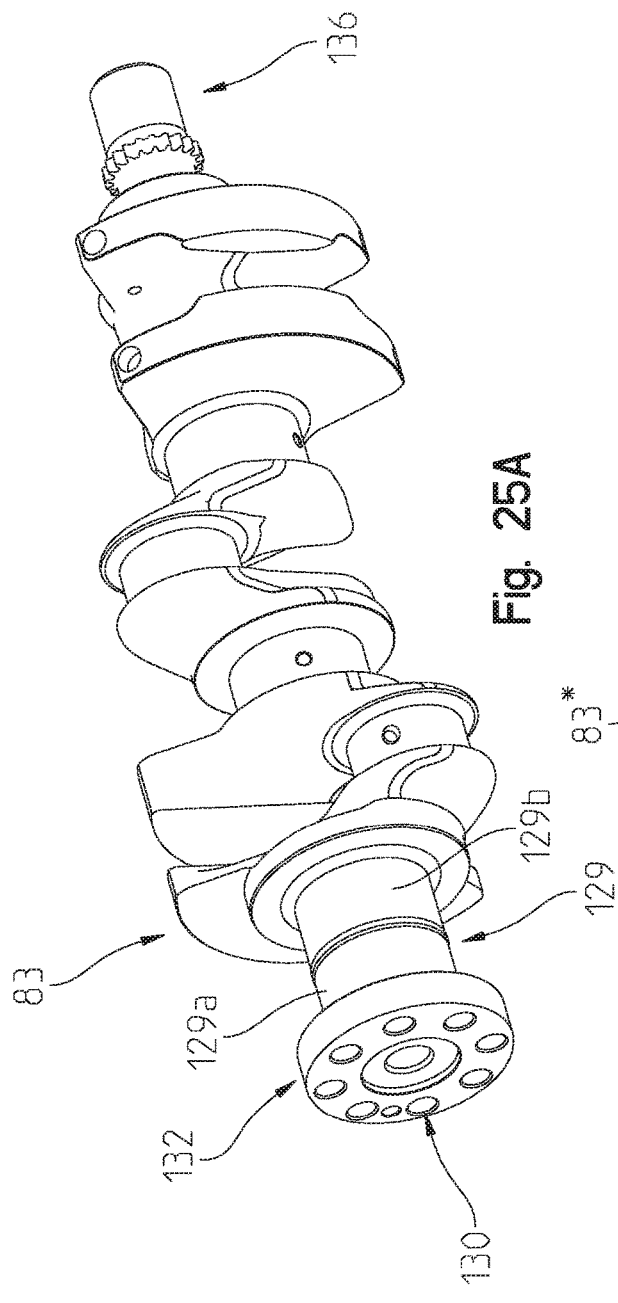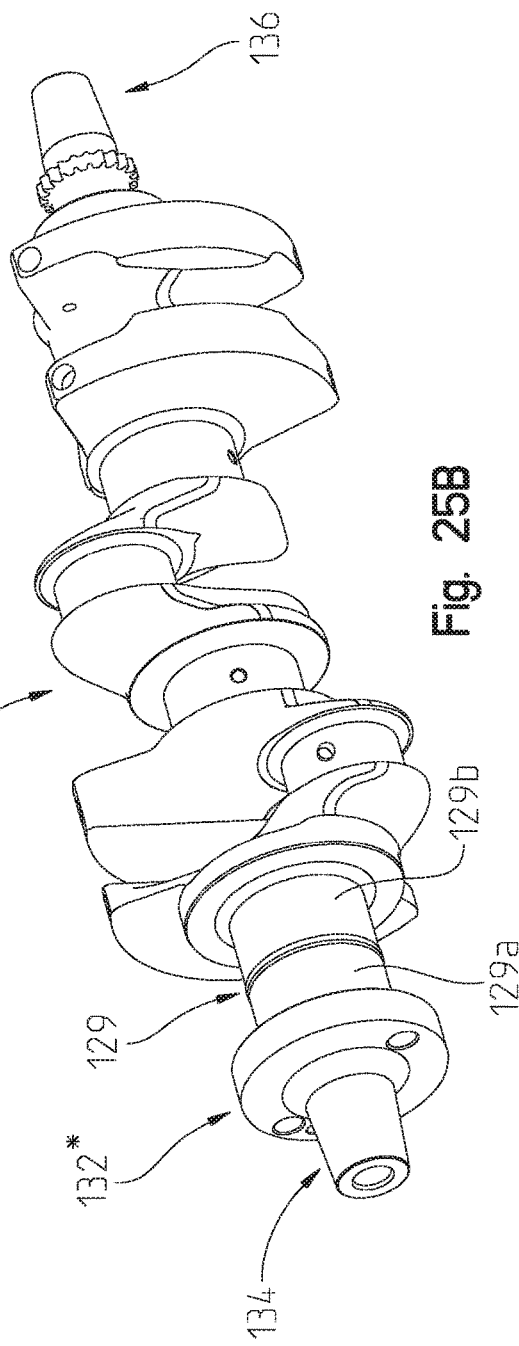

OFF-ROAD VEHICLE

CROSS-REFERENCE TO RELATED APPLICATIONS

The present application is co-filed with U.S. patent application Ser. No. 16/875,494, filed May 15, 2020, the complete disclosure of which is incorporated herein by reference.

FIELD OF THE INVENTION

The present invention relates to off-road vehicles including all-terrain vehicles ("ATVs") or utility vehicles ("UTVs").

BACKGROUND OF THE INVENTION

Generally, UTVs or ATVs are used to carry one or more passengers and a small amount of cargo over a variety of terrains. Due to different terrains and user preferences, however, a variety of engine power requirements and vehicle sizes may be desired. Current UTVs and ATVs typically provide two- or four-cylinder engines. However, two-cylinder engine UTVs and ATVs may provide too little power for certain operating or terrain conditions, while four-cylinder engine UTVs and ATVs may be oversized or too large for various users, conditions, etc. Thus, a need exists for a UTV or ATV that is configured for enhanced power while also remaining compact and trail compatible.

In addition, current UTVs and ATVs typically require a different engine block for each different transmission and/or configurations. Thus, a need exists for an engine block that is capable of supporting different transmission and/or powertrain configurations without alteration of the engine block itself.

SUMMARY OF THE INVENTION

In one embodiment of the disclosure, a utility vehicle comprises a frame, a body supported by the frame, a seating area supported by the frame, front and rear ground engaging members supporting the frame and the body, and a powertrain drivingly coupled to the front and rear ground engaging members. The powertrain comprises a transmission and an engine having at least three cylinders, an intake, and an exhaust. The intake is positioned longitudinally forward of the engine and the exhaust is positioned longitudinally rearward of the engine, In another embodiment of the disclosure, a utility vehicle comprises a frame, a body supported by the frame, a seating area supported by the frame, front and rear ground engaging members supporting the frame and the body, and a powertrain drivingly coupled to the front and rear ground engaging members. The powertrain comprises a transmission and an engine having at least three cylinders, an intake, and an exhaust. The intake is positioned between the seating area and the engine. The engine is positioned between the intake and the exhaust, and the exhaust is positioned between the engine and a rear of the utility vehicle.

In yet another embodiment, a utility vehicle comprises a frame, a body supported by the frame, front and rear ground engaging members supporting the frame and the body, and a powertrain drivingly coupled to the front and rear ground engaging members. The powertrain comprises a transmission and an engine. The engine has an engine block and a crankshaft. The transmission includes one of a first type of transmission and a second type of transmission. The engine block being configured to couple to either of the first type of transmission and the second type of transmission without alteration of the engine block.

BRIEF DESCRIPTION OF THE DRAWINGS

FIG. 25A shows a perspective view of a first embodiment of a crankshaft of the present disclosure;

FIG. 25B shows a perspective view of a second embodiment of a crankshaft of the present disclosure;

DETAILED DESCRIPTION OF THE DRAWINGS

Figure 1:
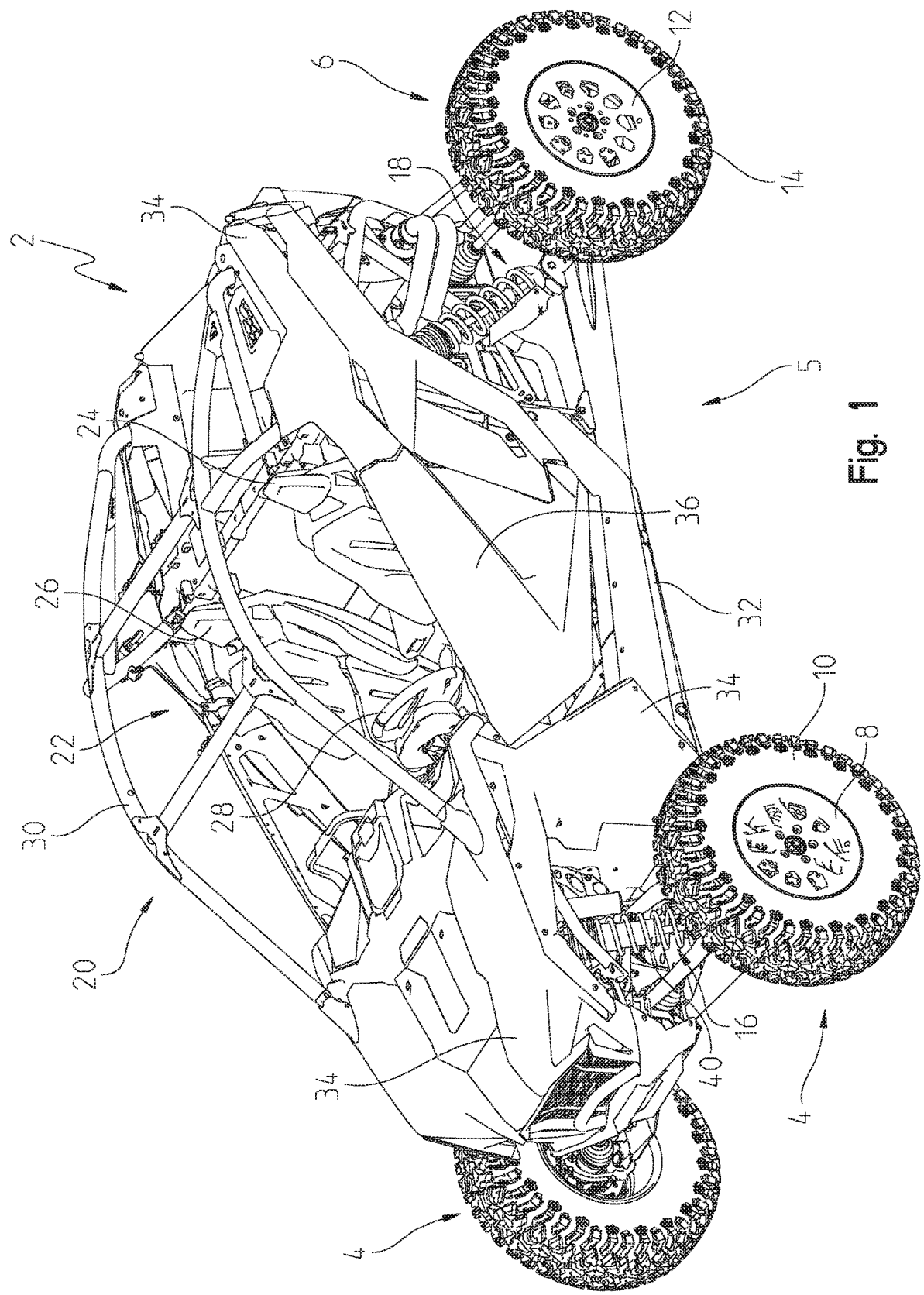
FIG. 1 shows a front left perspective view of a vehicle of the present disclosure.
Figure 2:
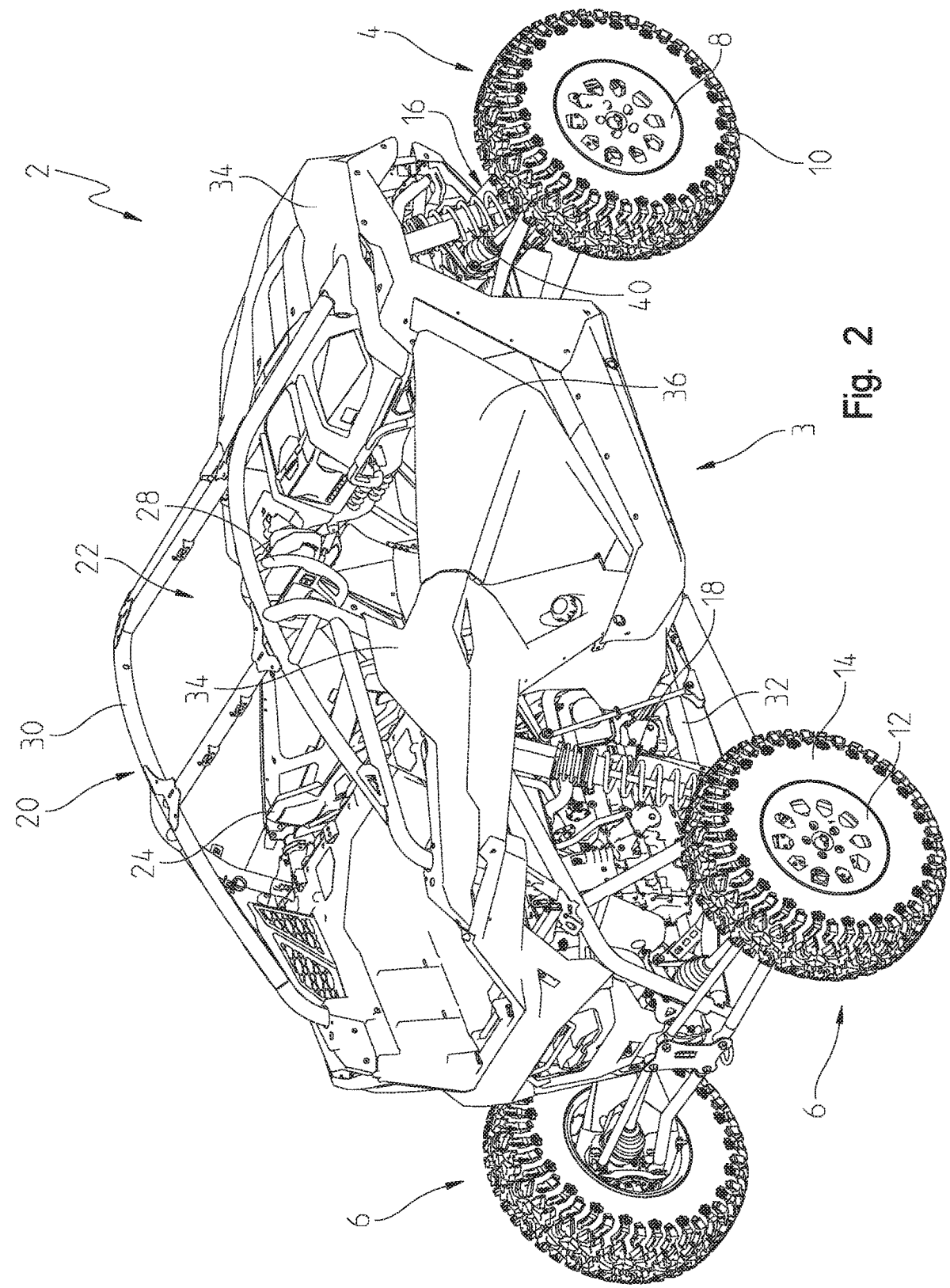
FIG. 2 shows a right rear perspective view of the vehicle of FIG. 1.
Figure 3:
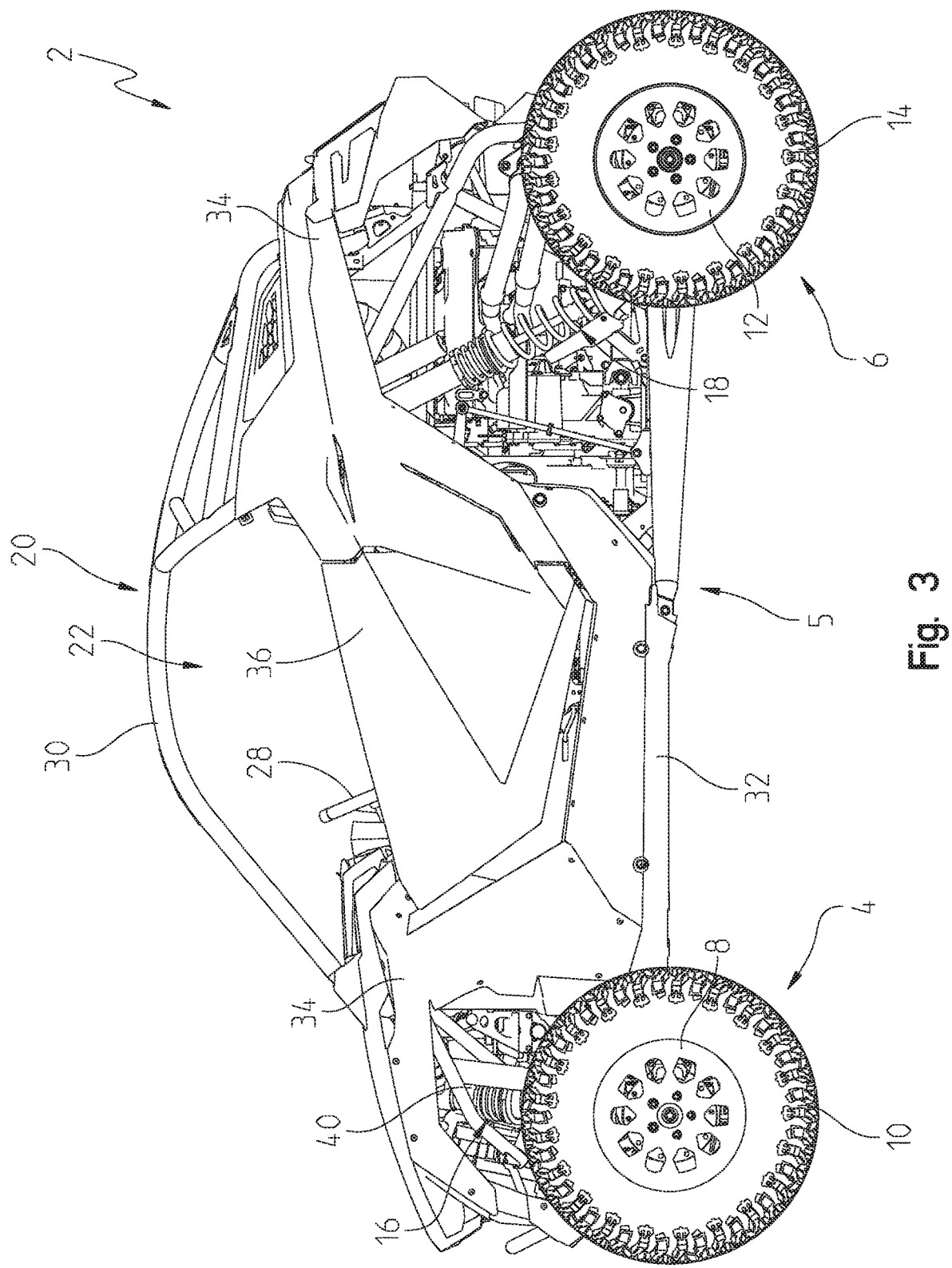
FIG. 3 shows a left elevational side view of the vehicle of FIG. 1.
Figure 4:
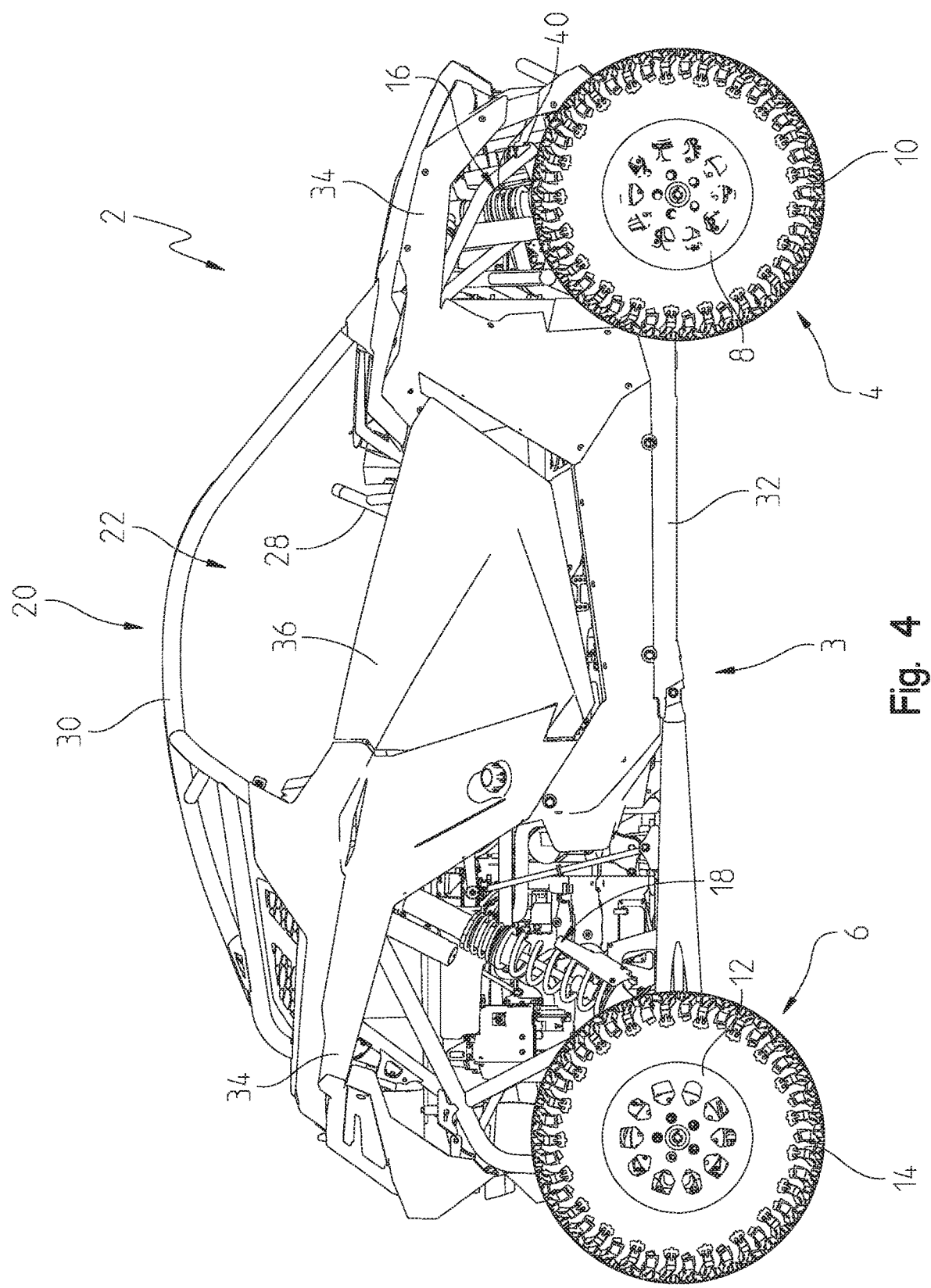
FIG. 4 shows a right elevational side view of the vehicle of FIG. 1.
Figure 5:
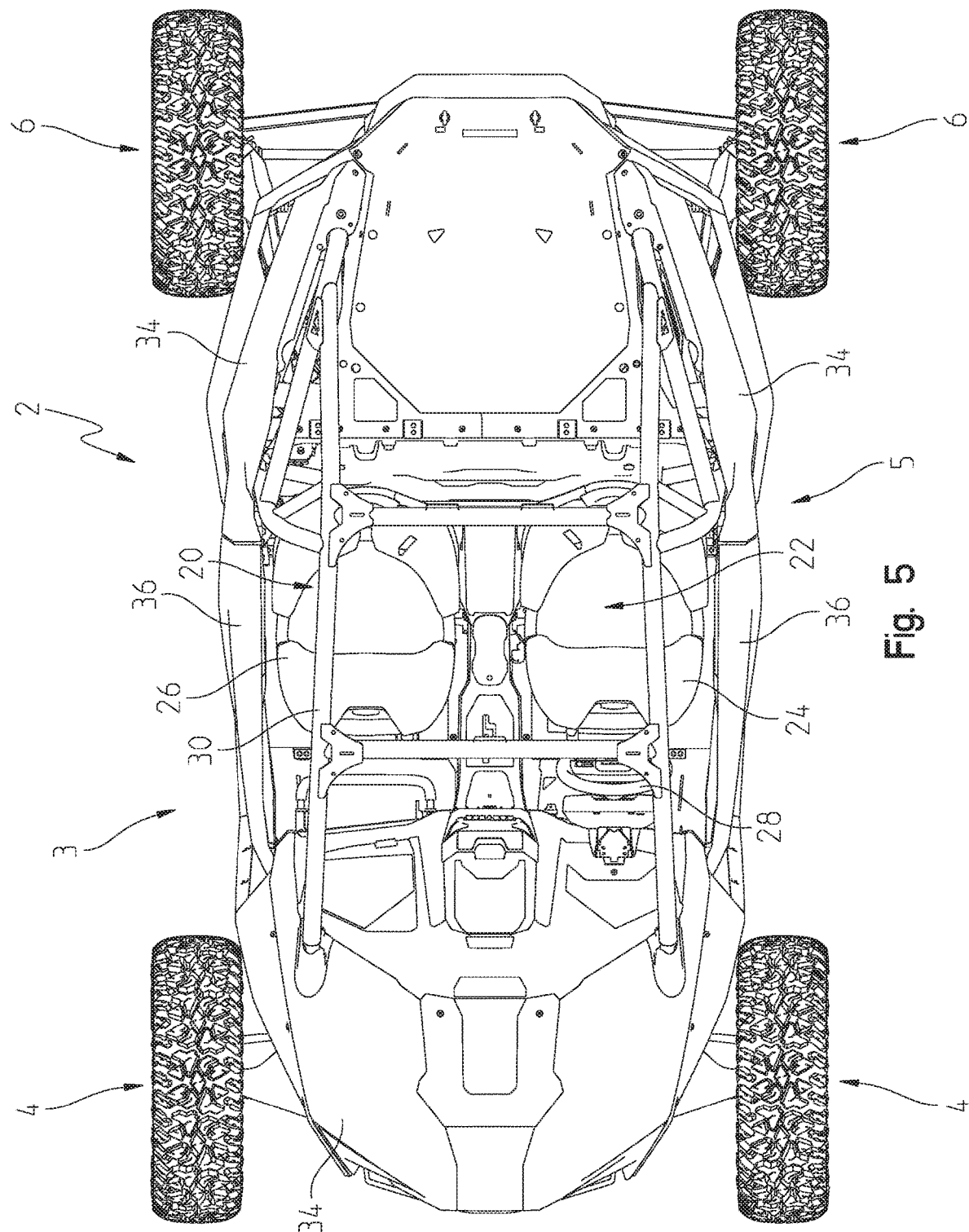
FIG. 5 shows a top plan view of the vehicle of FIG. 1.
Figure 6:
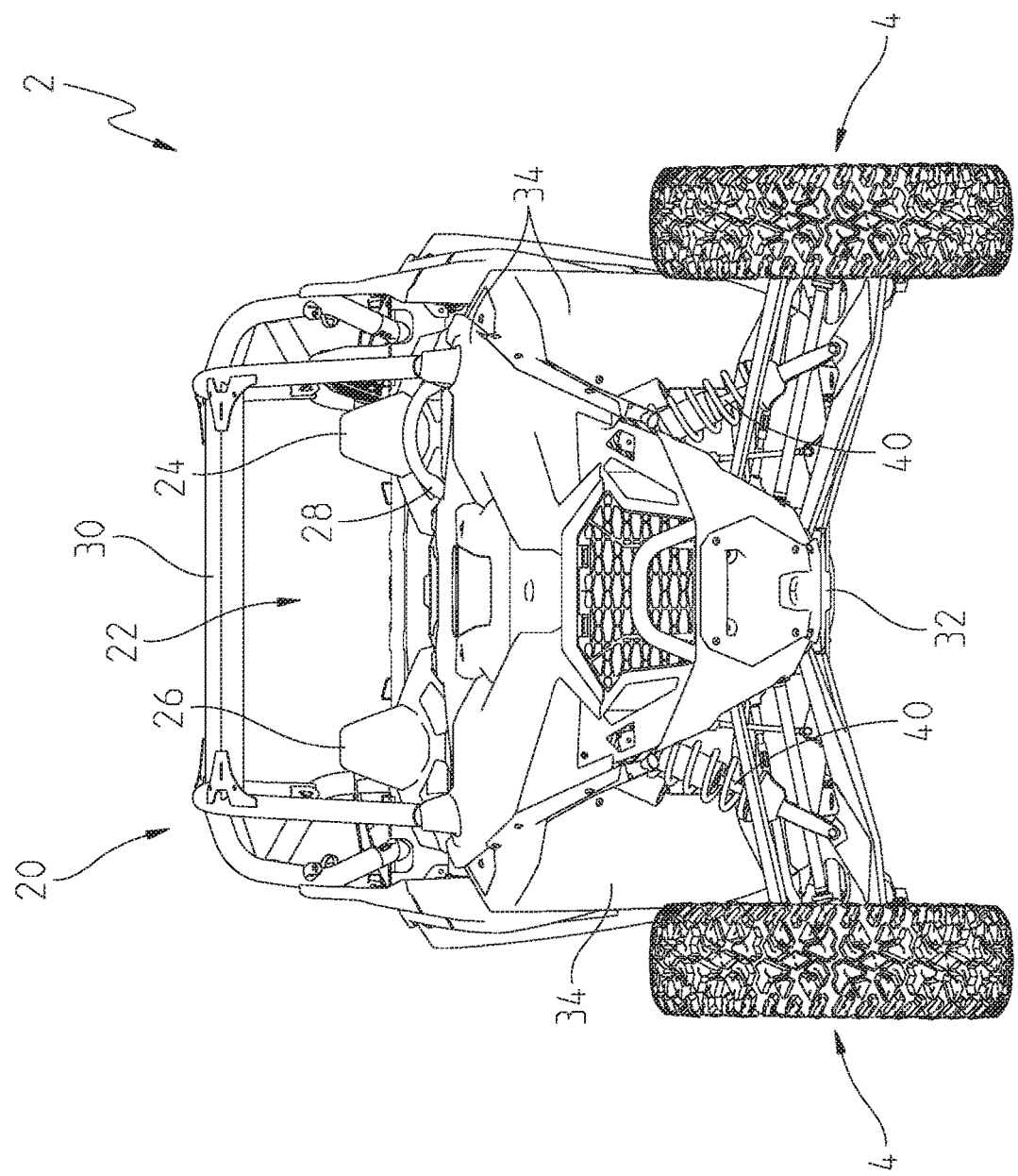
FIG. 6 shows a front elevational view of the vehicle of FIG. 1.
Figure 7:
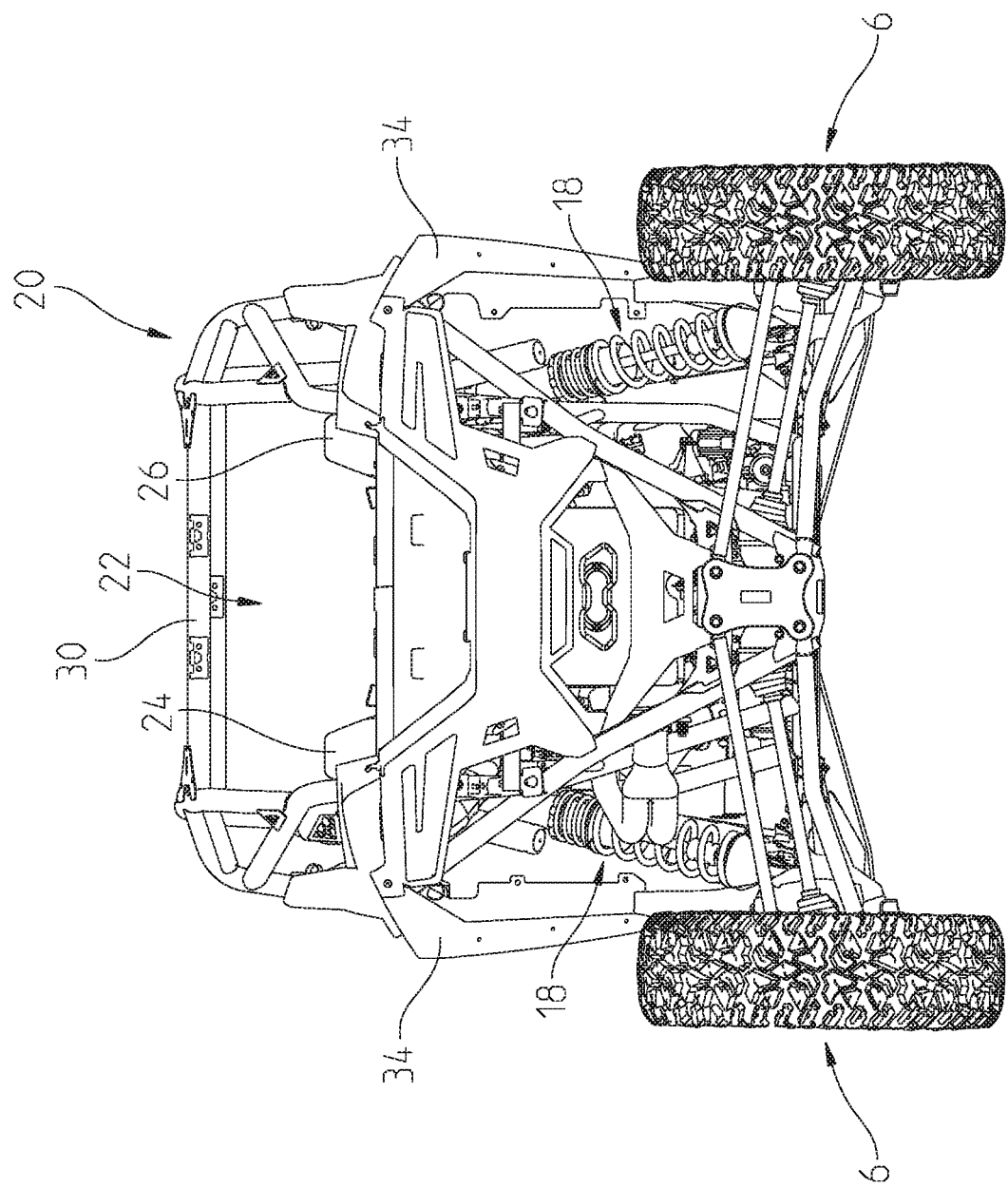
FIG. 7 shows a rear elevational view of the vehicle of FIG. 1.

With reference to FIGS. 1-7, the vehicle of the present disclosure will be described. As shown, the vehicle is generally depicted as reference number 2 which includes front ground engaging members 4 and rear ground engaging members 6. Front ground engaging members 4 are comprised of wheels 8 and tires 10, and rear ground engaging members 6 are comprised of wheels 12 and tires 14. Ground engaging members 4 and 6 support a vehicle frame, which is shown generally at 20, through front and rear suspension assemblies 16 and 18.

Vehicle frame 20 supports a seating area 22 comprised of at least a driver's seat 24 and a passenger seat 26. Vehicle 2 further includes a steering assembly for steering front ground engaging members 4 whereby the steering assembly includes a steering wheel 28. Frame 20 of vehicle 2 is comprised of a cab frame 30 that generally extends over the seating area 22, and a lower frame portion 32 positioned below and supporting cab frame 30. Frame 20 is configured to support a plurality of body panels 34 and/or doors 36.

Figure 8:
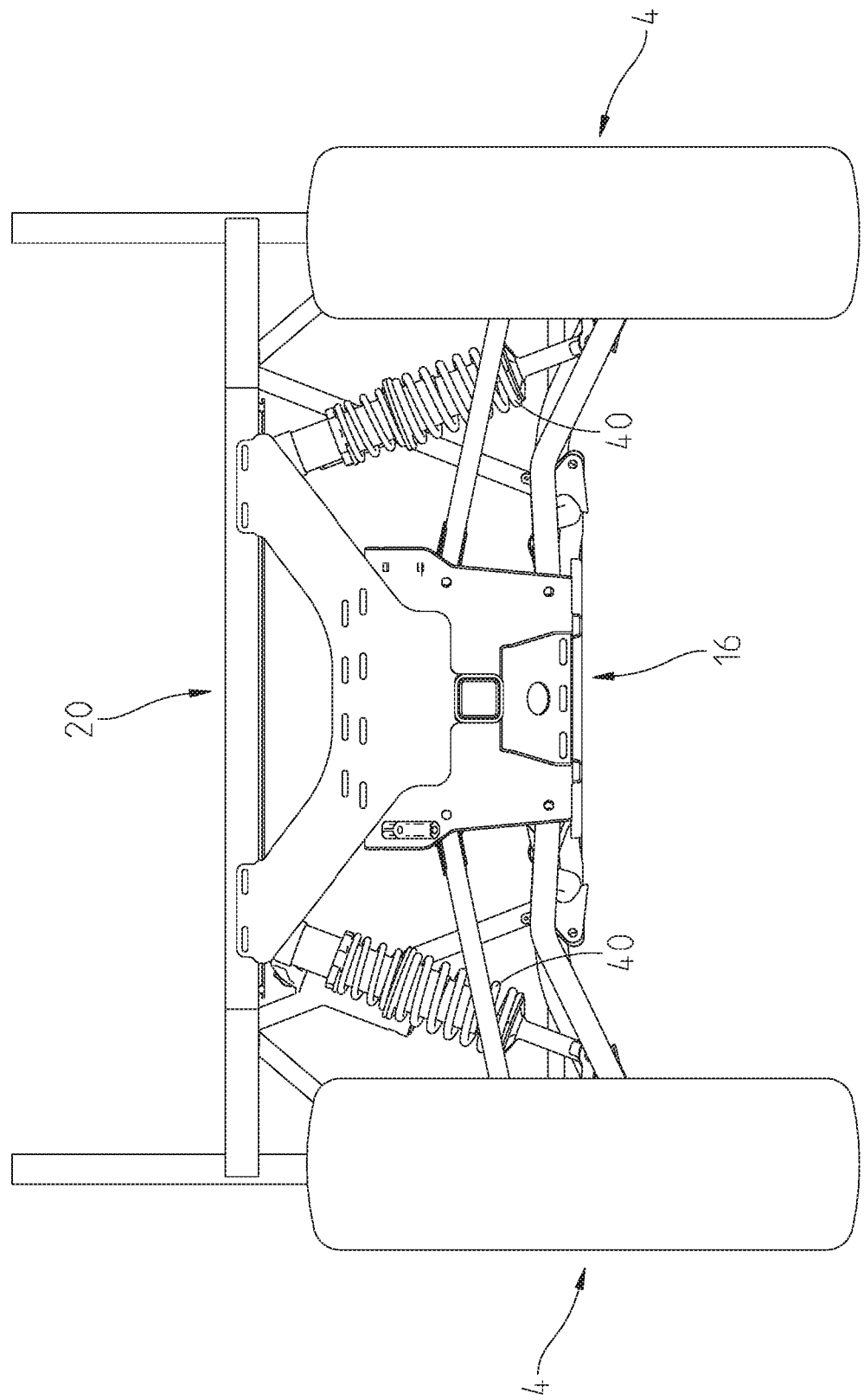
FIG. 8 shows a front elevation view of front ground engaging members, a front suspension assembly, and a portion of a frame of the vehicle of FIG. 1.
Figure 9:
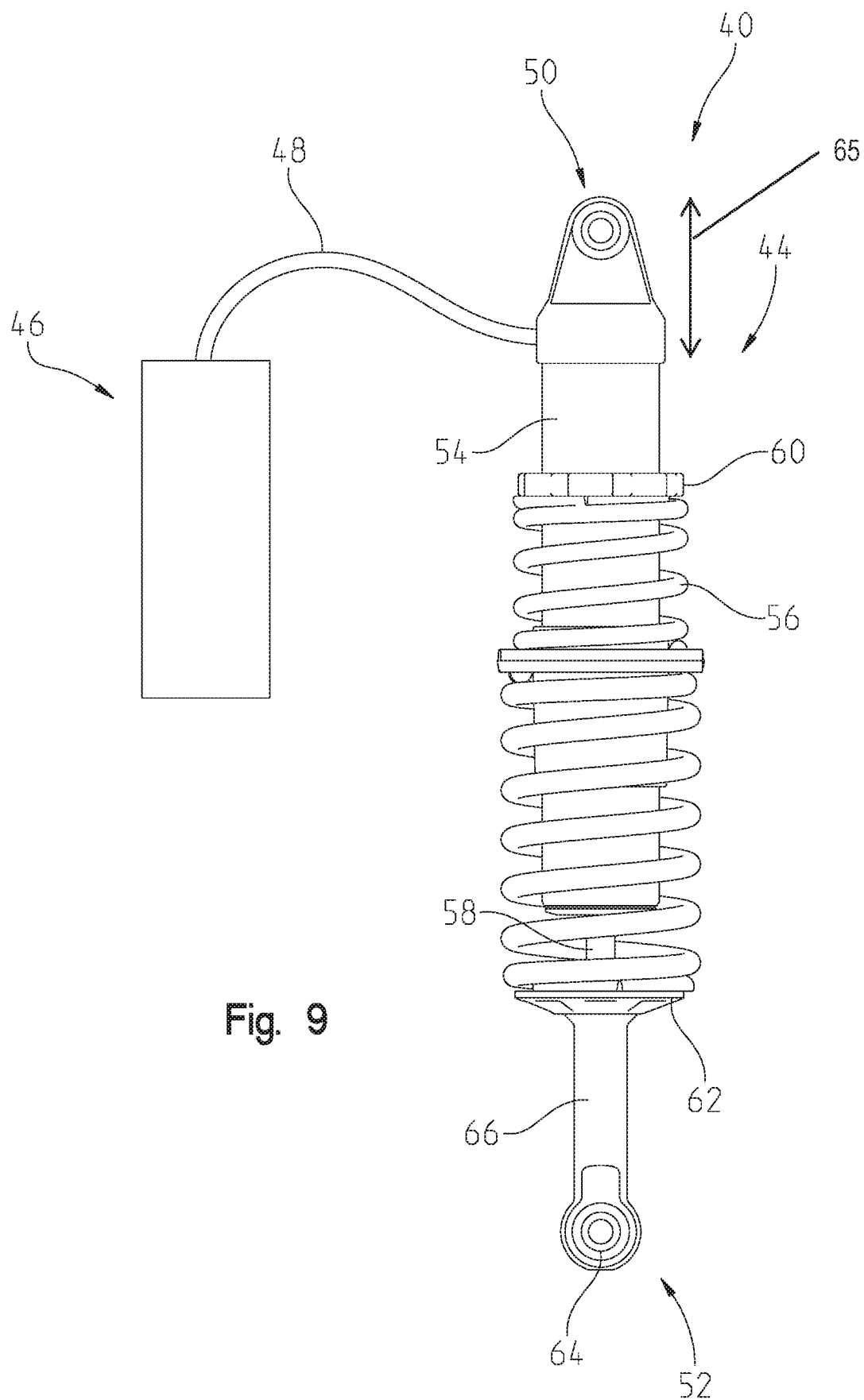
FIG. 9 shows a plan view of a linear force element of the front suspension assembly of FIG. 8 including a first embodiment of a body assembly of the linear force element and a reservoir of the linear force element.
Figure 10:
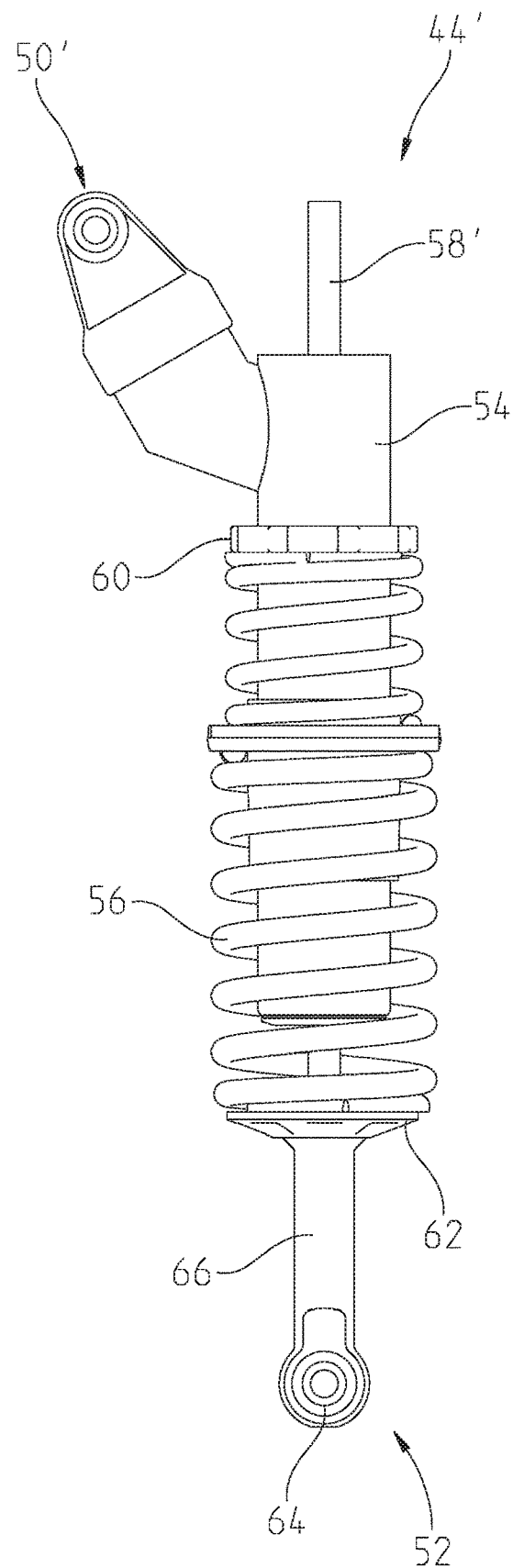
FIG. 10 shows a plan view of a second embodiment of a body assembly of the linear force element of the front suspension assembly of FIG. 8.

Referring now to FIGS. 8-10, front suspension assembly 16 generally includes a set of linear force elements 40. Linear force elements 40 each generally include a body assembly 44, 44' and a reservoir 46 fluidly coupled to body assembly 44, 44' via a conduit 48. Reservoir 46 is generally mounted to frame 20 or another component of vehicle 2 at a position spaced apart from body assembly 44, 44' to allow for proper packaging of linear force elements 40.

Body assembly 44, 44' of linear force element 40 generally includes a first mount 50, 50' coupled to frame 20, a second mount 52 operably coupled to one of front ground engaging members 4 (e.g., through an additional component(s) of front suspension assembly 16), a pressurized cylinder 54 fluidly coupled to reservoir 46, a spring 56 surrounding cylinder 54 and held between a first spring seat 60 coupled around an upper portion of cylinder 54 and a second spring seat 62 coupled to second mount 52, and a shaft 58 extending from second spring seat 62 into cylinder 54. In various embodiments, linear force elements 40 may be through-rod shocks such that shaft 58' extends through and out of both ends of cylinder 54 (FIG. 10).

Still referring to FIGS. 8-10, second mount 52 of body assembly 44, 44' generally includes an eyelet 64 operably coupled to ground engaging member 4 (e.g., through a lower control arm of front suspension assembly 16) and a rod 66, where rod 66 extends from eyelet 64 to second spring seat 62. Rod 66 is generally longer than previous rods on UTV or ATV linear force elements such that spring 56 is moved upward toward first mount 50 allowing a shock point of vehicle 2 to be closer to ground engaging members 4. In one embodiment, eyelet 64 has a length 65 of at least 2.25 inches. For example, eyelet 64 may have a length 65 of up to at least 5.10 inches. Length 65 of eyelet 64 and the overall configuration of linear force elements 40 may allow linear force elements 40 to be moved, for example outwardly, to accommodate the size or position of other components, such as engine 72.

Figure 11:
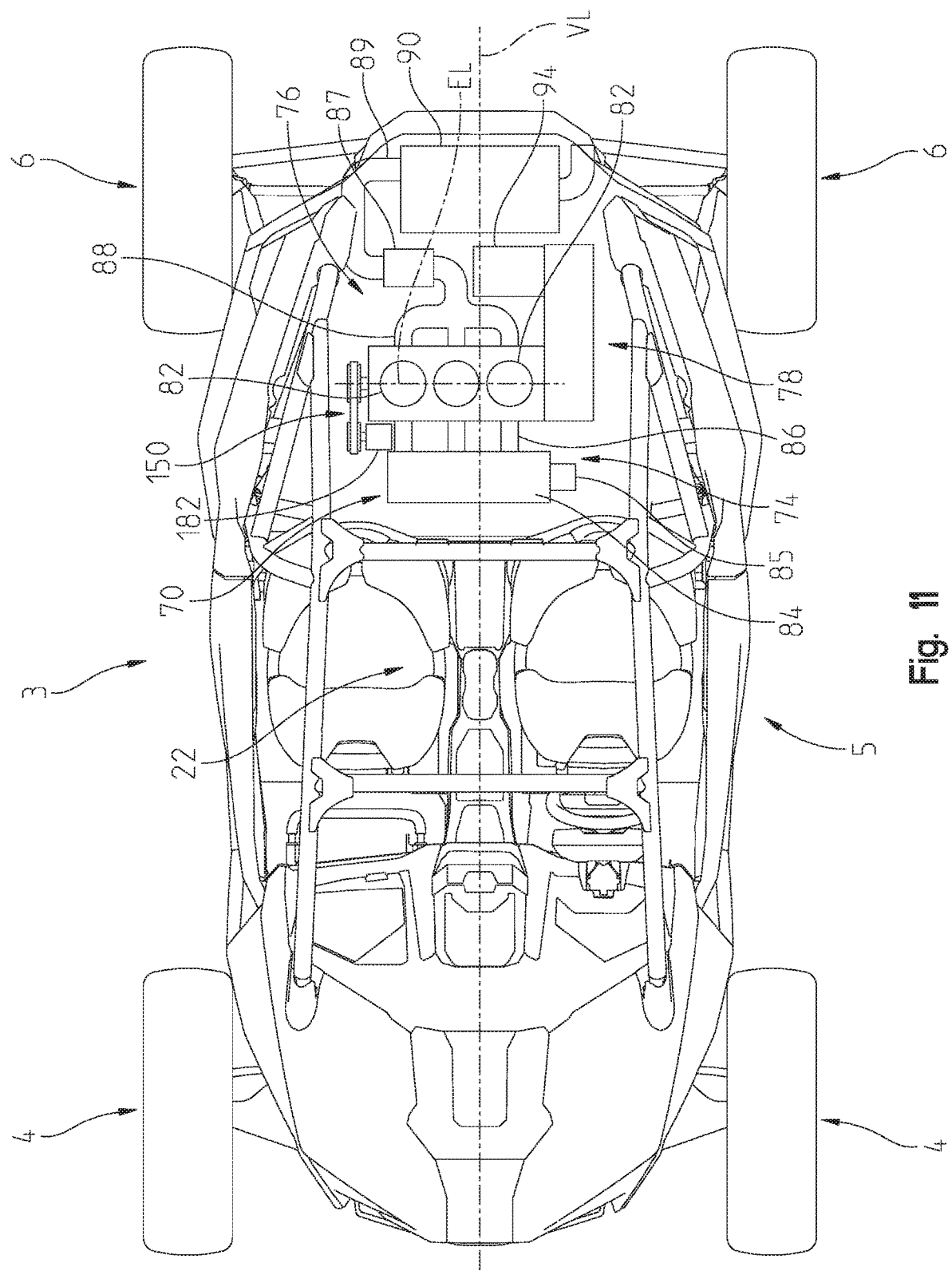
FIG. 11 shows a top plan view of the vehicle of FIG. 1 with a schematic view of a first embodiment of a powertrain of the vehicle of FIG. 1.
Figure 12:
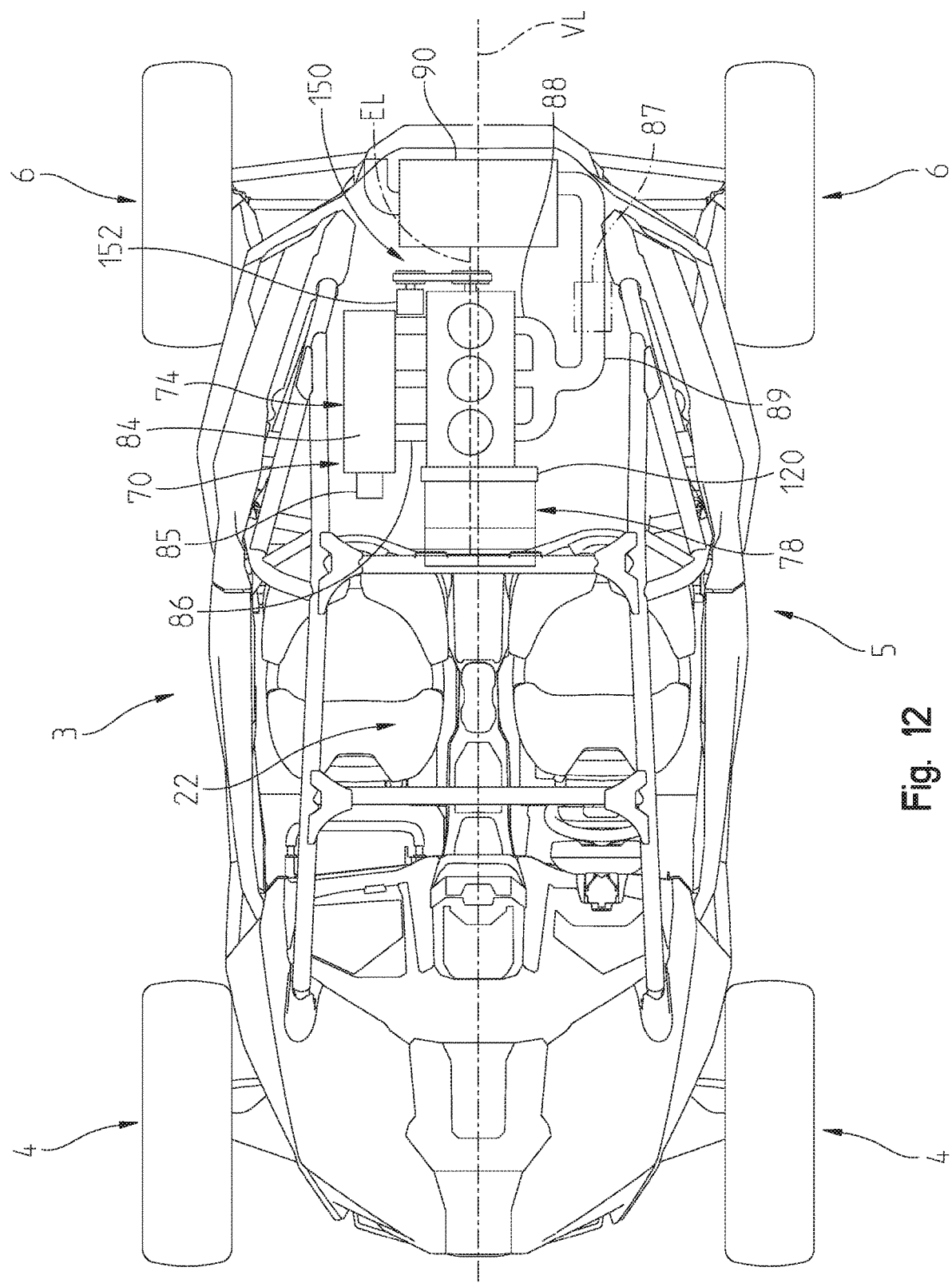
FIG. 12 shows a top plan view of the vehicle of FIG. 1 with a schematic view of a second embodiment of a powertrain of the vehicle of FIG. 1.
Figure 13:
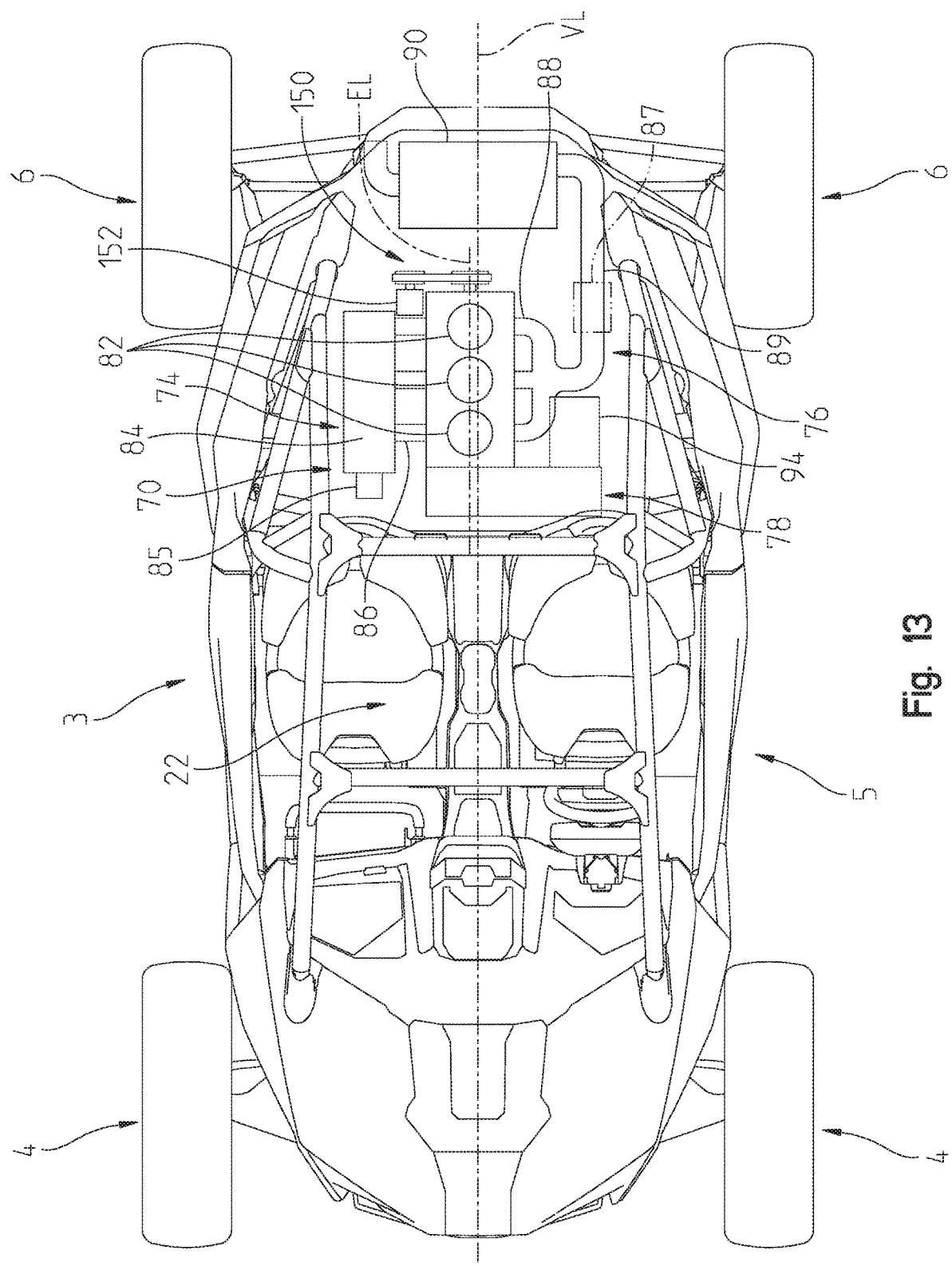
FIG. 13 shows a top plan view of the vehicle of FIG. 1 with a schematic view of a third embodiment of a powertrain of the vehicle of FIG. 1.

With reference now to FIGS. 11-13, vehicle 2 further includes a powertrain assembly 70 for providing power to ground engaging members 4 and 6 of vehicle 2. Powertrain assembly 70 generally comprises an engine 72, an engine intake manifold assembly 74 providing air to engine 72, an exhaust assembly 76 routing exhaust from engine 72 out of vehicle 2, a transmission 78 operably coupled to engine 72, and a drivetrain having a drive shaft 80 (FIGS. 34 and 35) coupled to transmission 78. Additional details relating to powertrain assembly 70 and/or engine 72 may be found in U.S. patent application Ser. No. 16/875,494, filed concurrently with the present application, the subject matter of which is incorporated herein by reference.

Engine 72 of powertrain assembly 70 generally includes up to three cylinders 82 and a crankshaft 83 (FIGS. 25A and 25B), and may be placed in vehicle 2 in a plurality of different configurations, with the present application illustrating at least two of these different configurations. In the first illustrative configuration, shown in FIG. 11, engine 72 is positioned in vehicle 2 in a transverse or East/West configuration, where cylinders 82 of engine 72 are aligned from a right side 3 of vehicle 2 to a left side 5 of vehicle 2 and crankshaft 83 extends laterally between right side 3 and left side 5 of vehicle 2 such that engine 72 is perpendicular to a longitudinal axis VL of vehicle 2. When engine 72 is in the transverse configuration, engine intake manifold assembly 74, which includes intake manifold 84, at least one throttle body 85, and/or intake manifold runners 86, is positioned generally forward of engine 72 and rearward of seating area 22 such that a majority of engine intake manifold assembly 74 is between seating area 22 and a forward-most point of engine 72 and all of engine intake manifold assembly 74 is longitudinally between seating area 22 and a centerline EL of engine 72. Centerline EL of engine 72 is defined, in the first illustrative embodiment, as the laterally-extending centerline of cylinders 82 such that centerline EL intersects the midpoint or the vertically-extending reciprocation axis (e.g., reciprocation of a piston (not shown) therein) of each cylinder 82.

Exhaust assembly 76 of the first illustrative configuration (FIG. 11), which includes an exhaust manifold 88, at least one exhaust conduit 89, and/or a muffler or silencer 90, is positioned generally rearward of engine 72 and forward of a rear of vehicle 2 such that at least exhaust manifold and muffler 90 of exhaust assembly 76 are longitudinally between engine 72 and the rearwardmost point of vehicle 2. It may be appreciated that a portion of a tail pipe of exhaust assembly 76 may extend rearwardly from the rear of vehicle 2 without departing from the description and understanding of exhaust assembly 76 disclosed herein.

Transmission 78 of the first illustrative configuration (FIG. 11) is laterally positioned between engine 72 and right side 3 or left side 5 of vehicle 2 such that transmission 78 extends along a right side or a left side of engine 72. Transmission 78 also may be positioned rearward of at least a portion of engine intake manifold assembly 74 and forward of at least a portion of exhaust assembly 76. Illustratively, transmission 78 is positioned laterally between engine 72 and left side 5 of vehicle 2.

The configuration of powertrain assembly 70 of the first illustrative configuration (FIG. 11) allows for powertrain assembly 70 to have a hot side and a cold side. More particularly, a hot side of engine 72, or the side of engine 72 which contains more heat producing components, is generally defined as the rearward portion of engine 72 (e.g., may be defined as the portion of at least engine 72 positioned rearward of engine centerline EL). The hot side of engine 72 includes heat-producing components such as exhaust manifold 88 which contains hot air exhaust from engine 72 and other such components that may experience elevated temperatures during operation of engine 72 compared to other components. Additionally, a cool/cold side of engine 72, or the side of engine 72 which generates less heat, is generally defined as the forward portion of engine 72 adjacent seating area 22 (e.g., may be defined as the portion of at least engine 72 positioned forward of engine centerline EL). The cool side of engine 72 includes components that generate no or less heat such as engine intake manifold assembly 74 which receives ambient air and other such components that do not experience elevated temperatures during operation of engine 72. Because the cool side of engine 72 does not generate heat or generate as much heat as the hot side of engine 72, various heat sensitive components of powertrain assembly 70 and/or vehicle 2 may be positioned within or adjacent to the cool side of engine 72, such as electronics like sensors, controllers, etc. In addition to the strategic positioning of a hot and cold side of engine 72, this first illustrative configuration allows for throttle body 85 to be closer to intake manifold 84 resulting in a shorter intake assembly 74.

In the second illustrative configuration, shown in FIGS. 12 and 13, engine 72 is positioned in vehicle 2 in a longitudinal or North/South configuration, where cylinders 82 of engine 72 are aligned in the fore/aft direction of vehicle 2 and crankshaft 83 extends longitudinally such that engine centerline EL of engine 72 may be at least parallel to longitudinal axis VL of vehicle 2. In other embodiments, engine centerline EL may be colinear with longitudinal axis VL. As shown in FIGS. 12 and 13, when engine 72 is in the longitudinal/second illustrative configuration, longitudinal centerline EL of engine 72 may be offset to the right of longitudinal axis VL of vehicle 2 in order to allow an output shaft (not shown) and drive shaft 80 of the drivetrain to be properly aligned. When engine 72 is in the second or longitudinal configuration, engine intake manifold assembly 74 is positioned laterally between right side 3 of vehicle 2 and engine 72, portions of exhaust assembly 76 extend along left side 5 of vehicle 2 to a position rearward of engine 72, and transmission 78 may be positioned longitudinally forward of engine 72. In various embodiments, at least a portion of transmission 78 may be positioned below seating area 22 and/or rearward of seating area 22. As such, transmission 78 may be longitudinally intermediate a portion of seating area 22 and a portion of engine 72.

In either the first or second illustrative configurations, powertrain assembly 70 may further include a turbocharger 87, which may be positioned behind engine 72 in the transverse configuration of FIG. 11 or behind or to the side of engine 72 in the longitudinal configuration of FIGS. 12 and 13. However, in various embodiments, turbocharger 87 may be positioned at any location along exhaust conduit 89 between exhaust manifold 88 and muffler 90. In some embodiments, turbocharger 87 may be integrated within a portion of exhaust manifold 88 and/or positioned immediately adjacent exhaust manifold 88.

Figure 14:
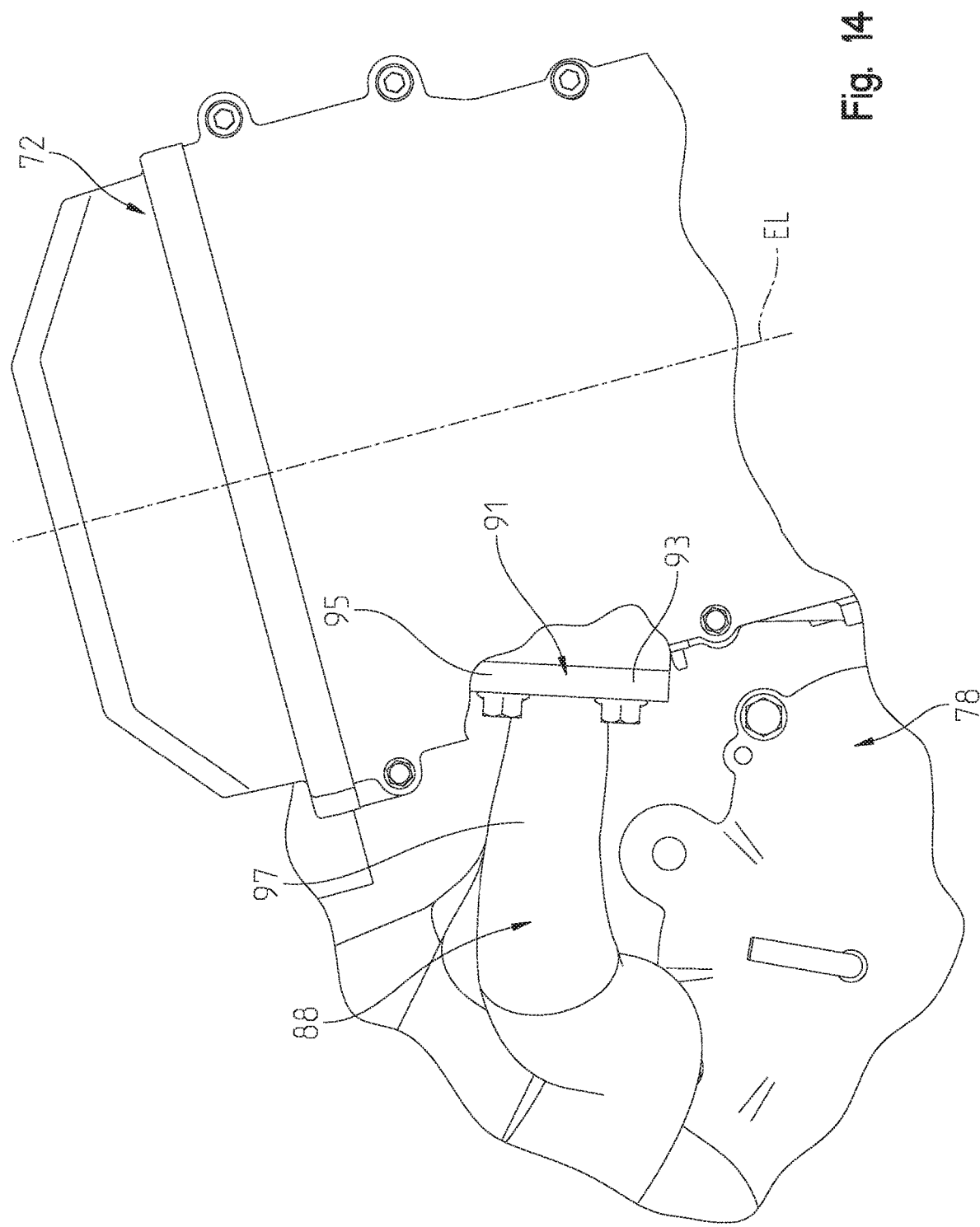
FIG. 14 shows a detailed view of exhaust ports of an engine of a powertrain of the vehicle of FIG. 1 and a portion of an exhaust assembly of the present disclosure.
Figure 15:
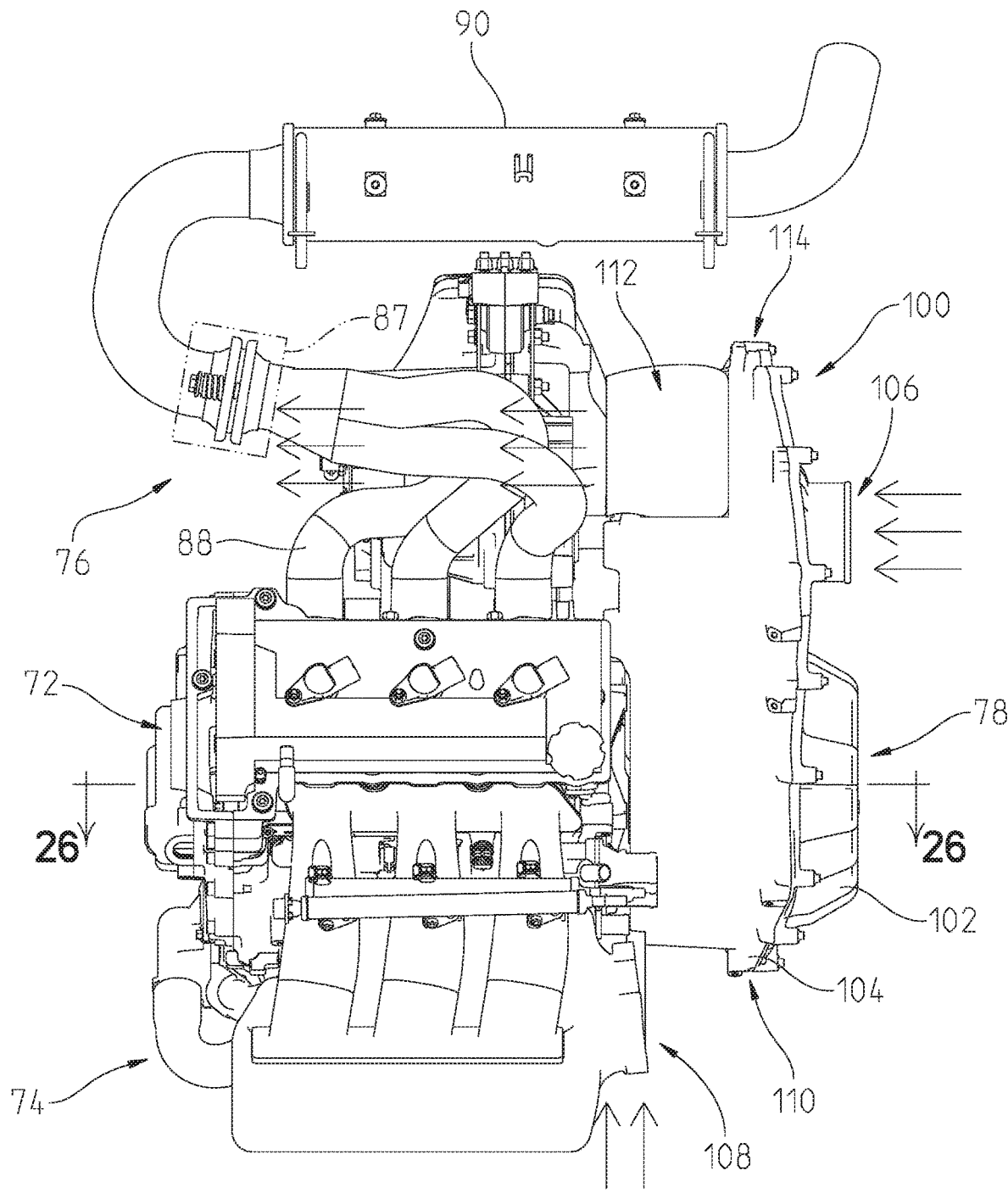
FIG. 15 shows a top plan view of the first embodiment of the powertrain of FIG. 11.
Figure 16:
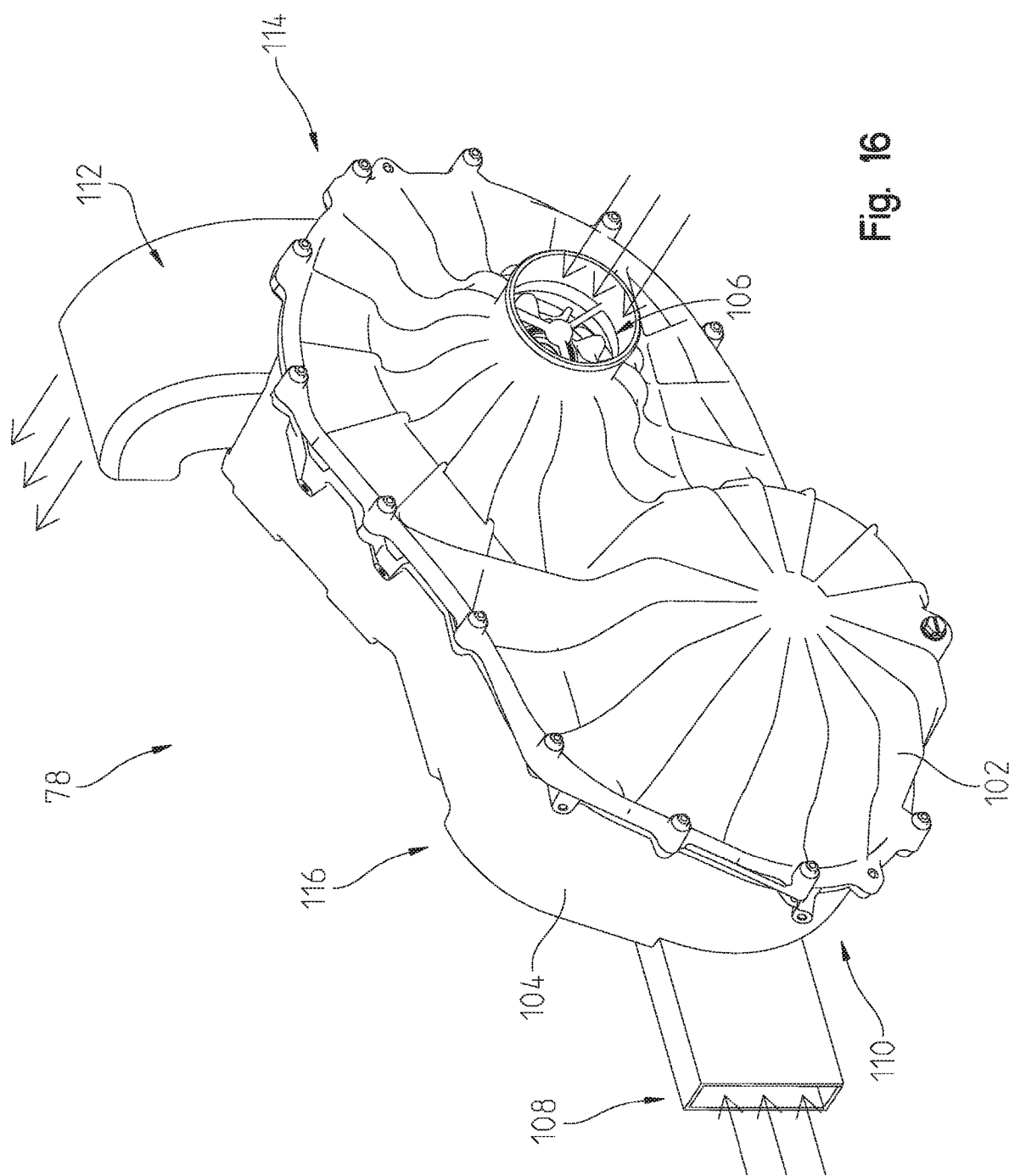
FIG. 16 shows a perspective view of a transmission of the powertrain of FIG. 15.
Figure 17:
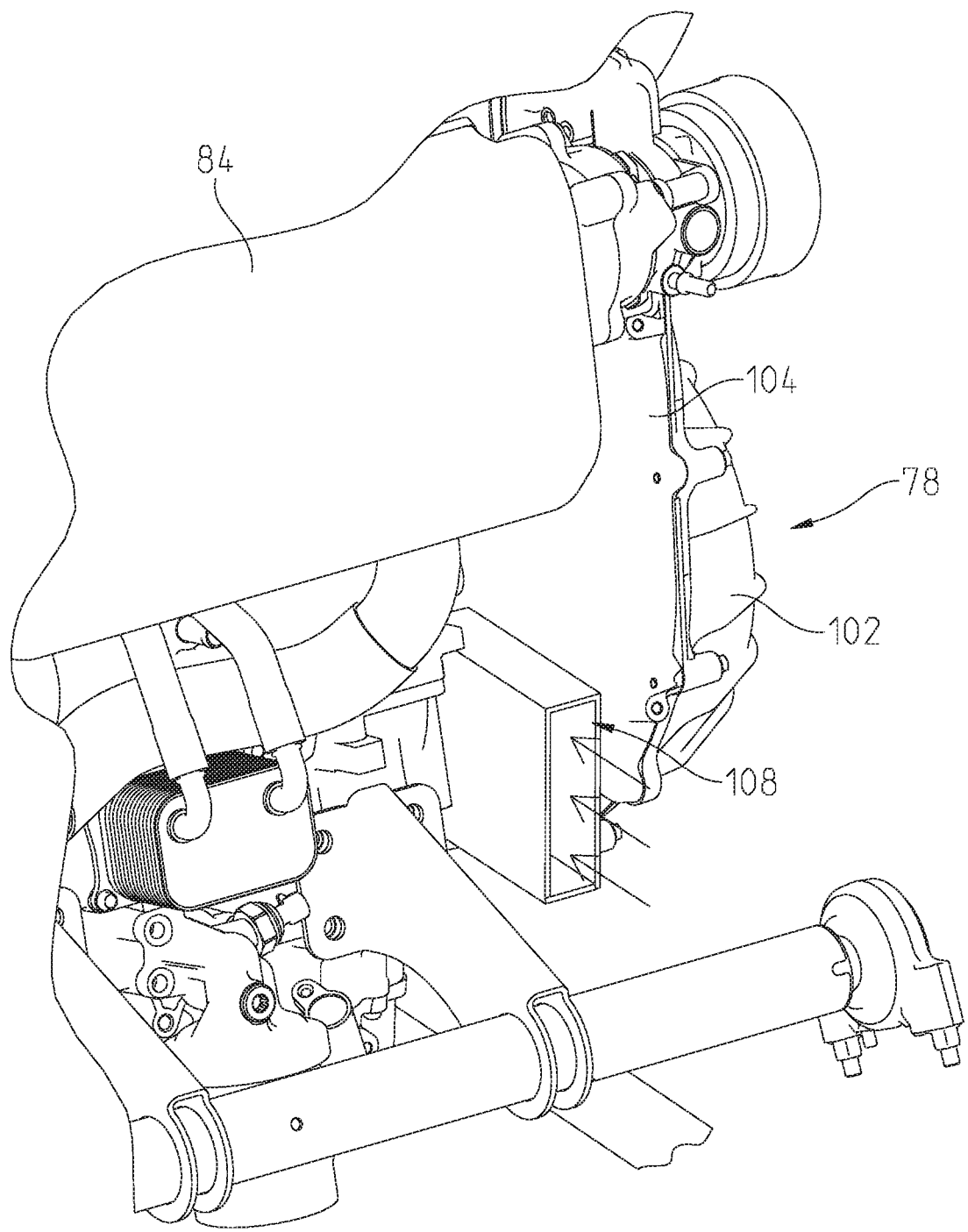
FIG. 17 shows a detailed front perspective view of the transmission of FIG. 15.
Figure 18:
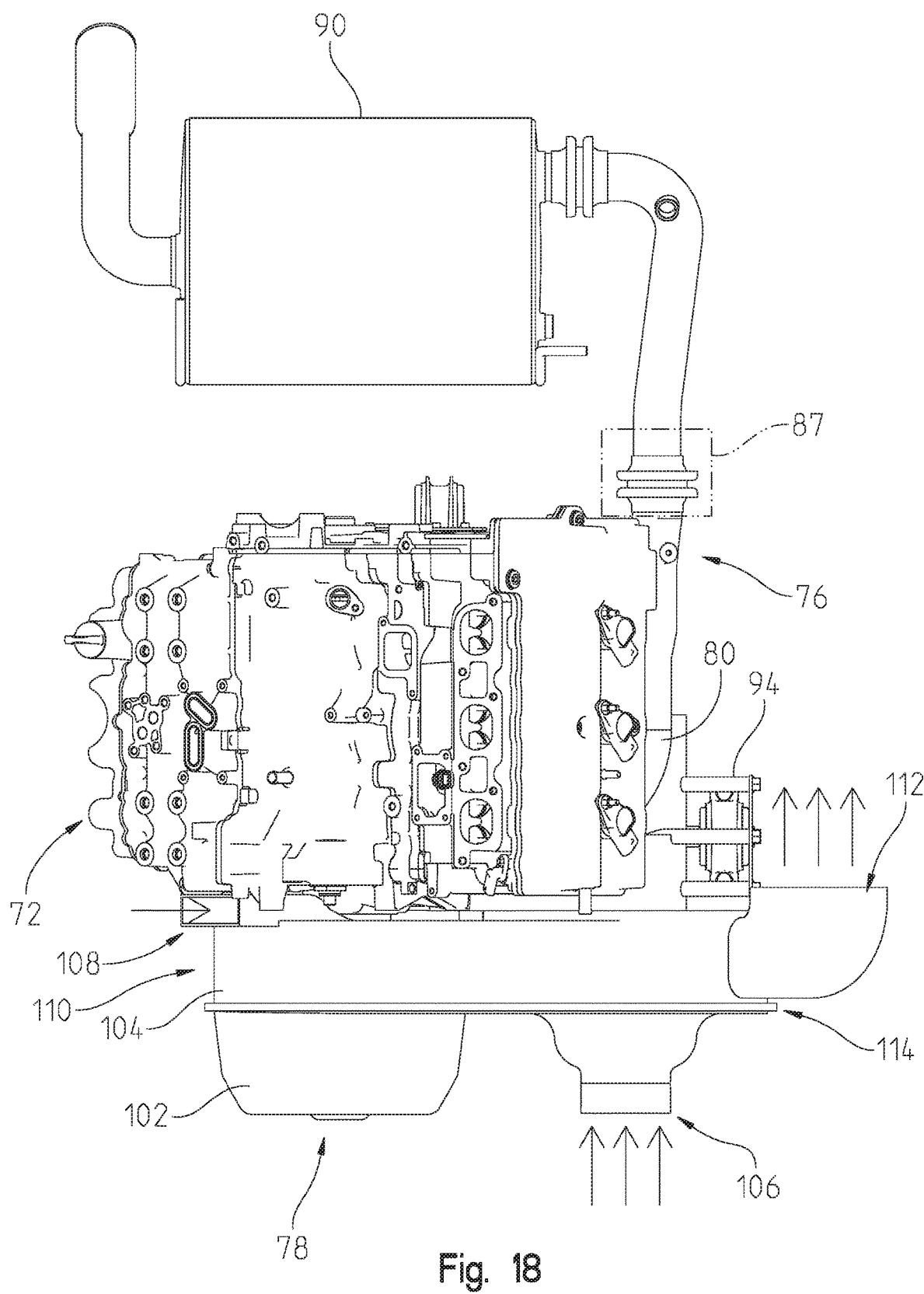
FIG. 18 shows a top plan view of the third embodiment of the powertrain of FIG. 13.
Figure 19:
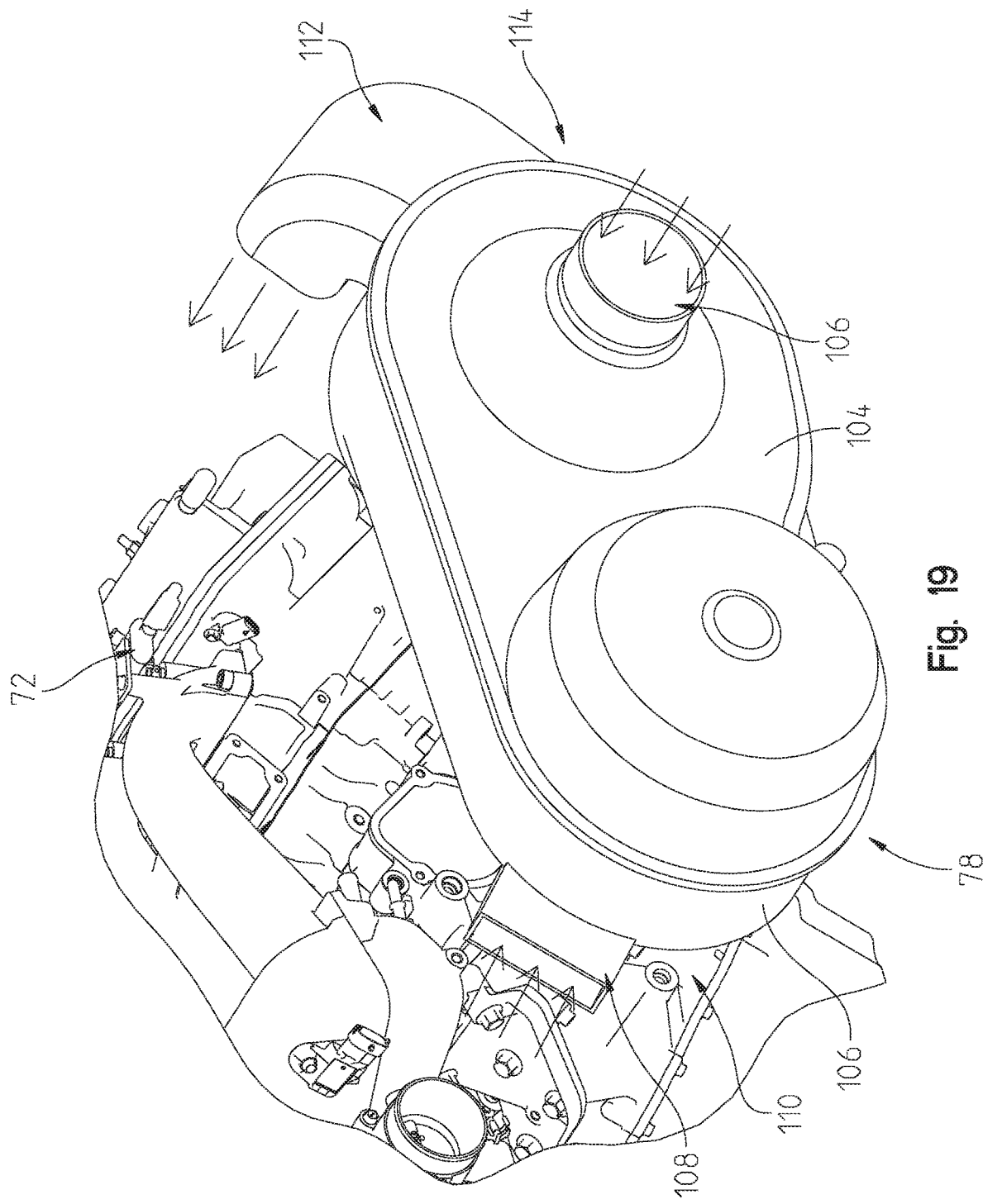
FIG. 19 shows a perspective view of a transmission of the powertrain of FIG. 18.

With reference to FIG. 14, engine 72 generally further includes exhaust ports 91. In various embodiments, exhaust ports 91 may be angled upward such that a lower surface 93 extends out further relative to centerline EL of engine 72 than an upper surface 95. Angled exhaust ports 91 allow exhaust manifold 88 and/or exhaust conduit(s) 89 to extend straight for a length 97 which may improve performance of vehicle 2 and allows transmission 78 to be packaged beneath exhaust ports 91, exhaust manifold 88, and/or exhaust conduit(s) 89, if desired.

Figure 20:
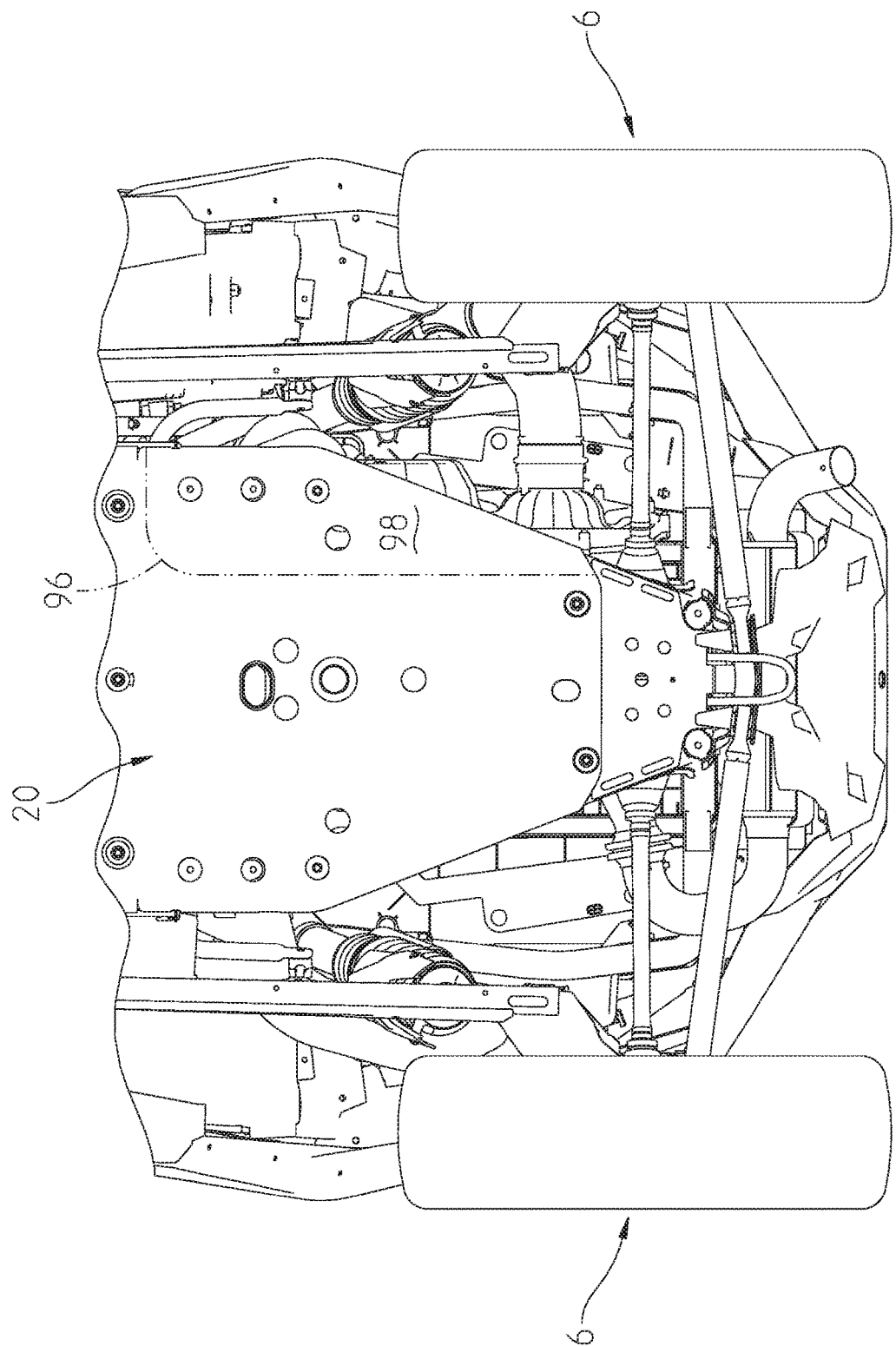
FIG. 20 shows a detailed bottom plan view of a portion of the vehicle of FIG. 1.

Referring now to FIGS. 11-13 and 15-20, transmission 78 of powertrain 70 may be a shiftable transmission or a continuously variable transmission ("CVT"), which may be an electronically controlled CVT ("eCVT"), a steel belt CVT and/or a rubber belt CVT. Further details relating to steel belt CVTs may be found in U.S. Patent Application Ser. No. 62/961,442, filed Jan. 15, 2020, the subject matter of which is incorporated herein by reference. In various embodiments, transmission 78 may also include a transmission gear set 94. Furthermore, as shown in FIG. 20, frame 20 may include a cutout 96 below transmission 78 such that portion 98 is removed or missing from frame 20, which allows access to transmission 78 for service without disassembling any portion of frame 20. Portion 98 may be a removable portion of frame 20 or may be entirely missing from frame 20.

Still referring to FIGS. 11-13 and 15-19, transmission 78 generally includes a housing 100 having a first portion 102 and a second portion 104, where second portion 104 may be directly or indirectly coupled to engine 72 and first portion 102 is coupled to second portion 104. First portion 102 generally includes a first inlet 106 adjacent a driven clutch (not shown), and second portion 104 generally includes a second inlet 108 extending from a first end 110 of second portion 104 adjacent a drive clutch (not shown) of CVT 92. Second portion 104 also includes an exhaust duct 112 extending from a second end 114 of second portion 104 adjacent the driven clutch of CVT 92. In the transverse configuration, second inlet 108 extends towards and faces the front of vehicle 2, while in the longitudinal configuration, second inlet 108 extends towards and faces right side 3 of vehicle 2. In various embodiments, second inlet 108 is positioned towards an inner surface 116 of second portion 104 adjacent engine 72 and between the drive clutch of CVT 92 and engine 72.

Exhaust duct 112 extends generally upward from second end 114 of second portion 104 such that exhaust of transmission 78 flows towards (e.g., over and around) at least a portion of exhaust assembly 76. For example, exhaust air from exhaust duct 112 of transmission 78 may flow over exhaust manifold 88, exhaust conduit(s) 89, turbocharger 87, and/or transmission gear set 94. The exhaust from transmission 78 allows heat from exhaust assembly 76 to be evacuated from behind a close off panel (not shown) behind seating area 22. More particularly, while the air from exhaust duct 112 may be elevated relative to the incoming ambient air through inlets 106, 108, the air from exhaust duct 112 may be cooler than various components of exhaust assembly 76 such that the exhausted air from transmission 78 facilitates cooling of at least a portion of exhaust assembly 76. In various embodiments, a cooler or fan (not shown) may be positioned adjacent exhaust duct 112 to allow for additional cooling of exhaust assembly 76.

Figure 21:
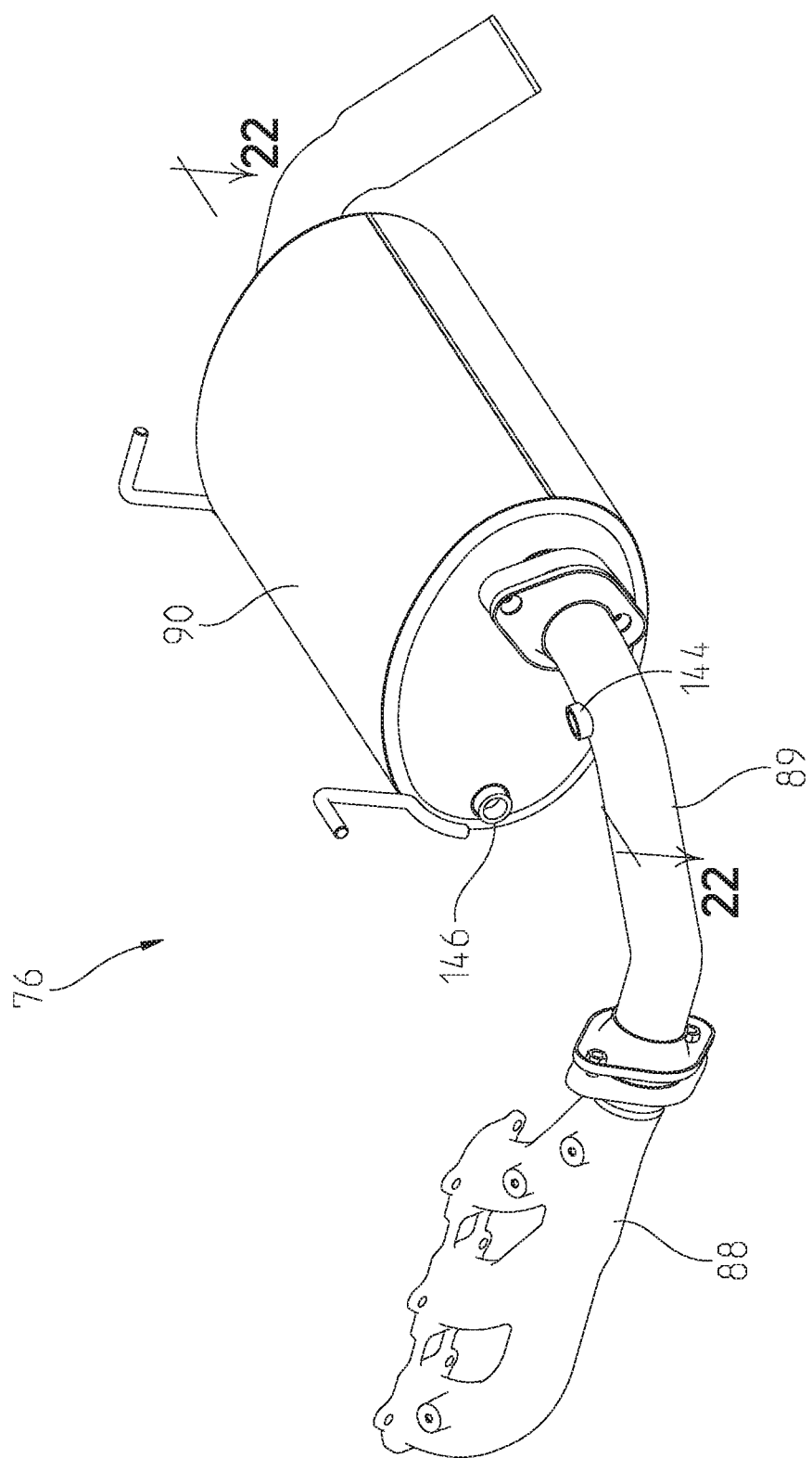
FIG. 21 shows a perspective view of an embodiment of an exhaust system of a powertrain of the vehicle of FIG. 1.
Figure 22:
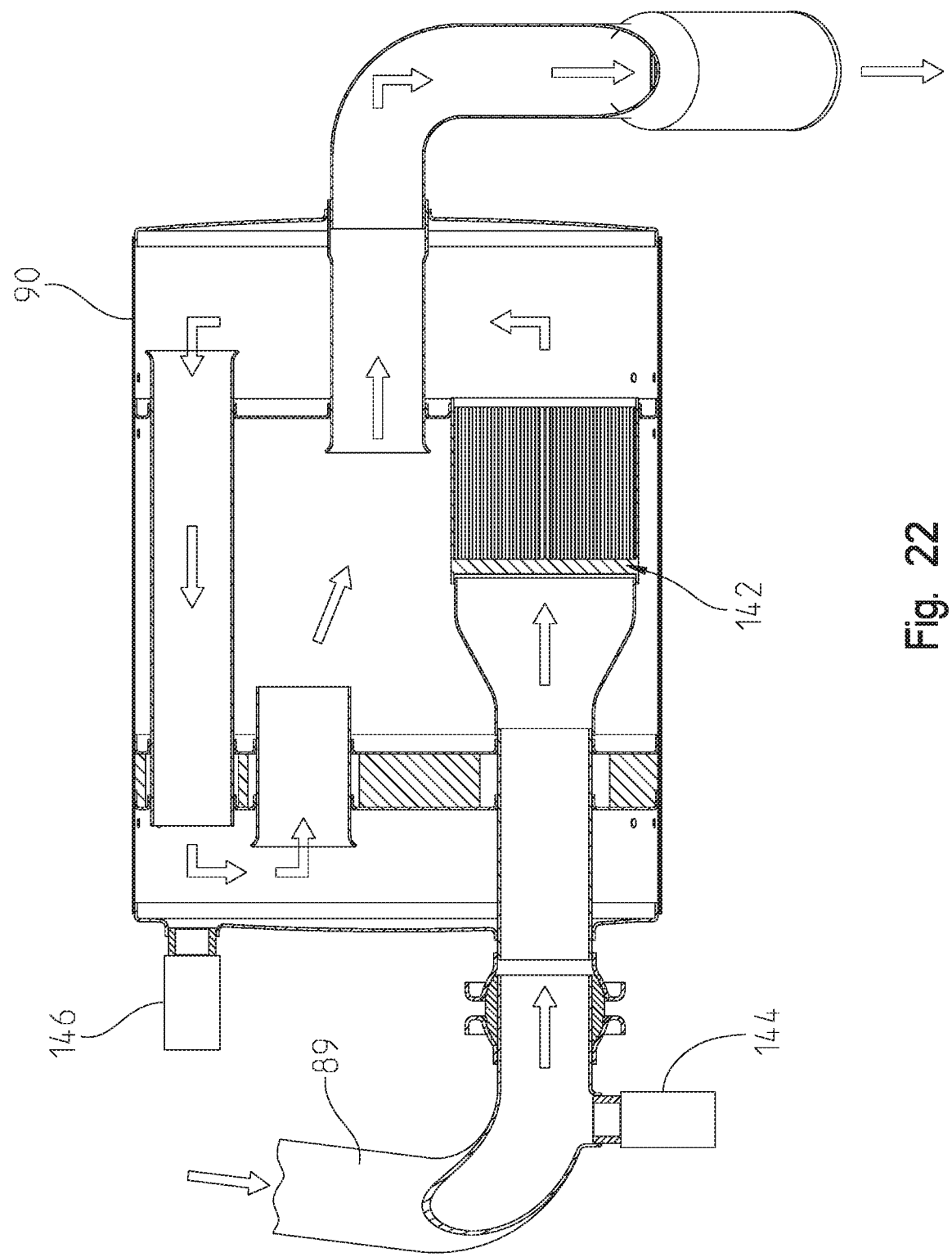
FIG. 22 shows a cross-sectional view of a muffler of the exhaust system of FIG. 21 taken along line 22-22 in FIG. 21.

With reference now to FIGS. 21 and 22, exhaust assembly 76 may further include a catalyst 142 positioned adjacent or within muffler 90. Placement of catalyst 142 within muffler 90 allows catalyst 142 to be further removed or further downstream from exhaust of engine 72 than when catalyst 142 is positioned exterior to or upstream of muffler 90. In various embodiments, exhaust assembly 76 may also include a plurality of oxygen sensors, where a first oxygen sensor 144 of the plurality of oxygen sensors is positioned upstream of catalyst 142 and a second oxygen sensor 146 of the plurality of the oxygen sensors is positioned downstream of catalyst 142. First and second oxygen sensors 144 and 146 may be positioned within an interior of muffler 90 or may be positioned externally of muffler 90. In various embodiments, first oxygen sensor 144 may be coupled to exhaust conduit 89, while second oxygen sensor 146 may be coupled to muffler 90. The plurality of oxygen sensors allows the status and/or life of catalyst 142 to be monitored, for determining emissions parameters, by sensing and monitoring the amount of oxygen before exhaust gases flow into catalyst 142 and the amount of oxygen after exhaust gases flow out of catalyst 142.

Figure 23:
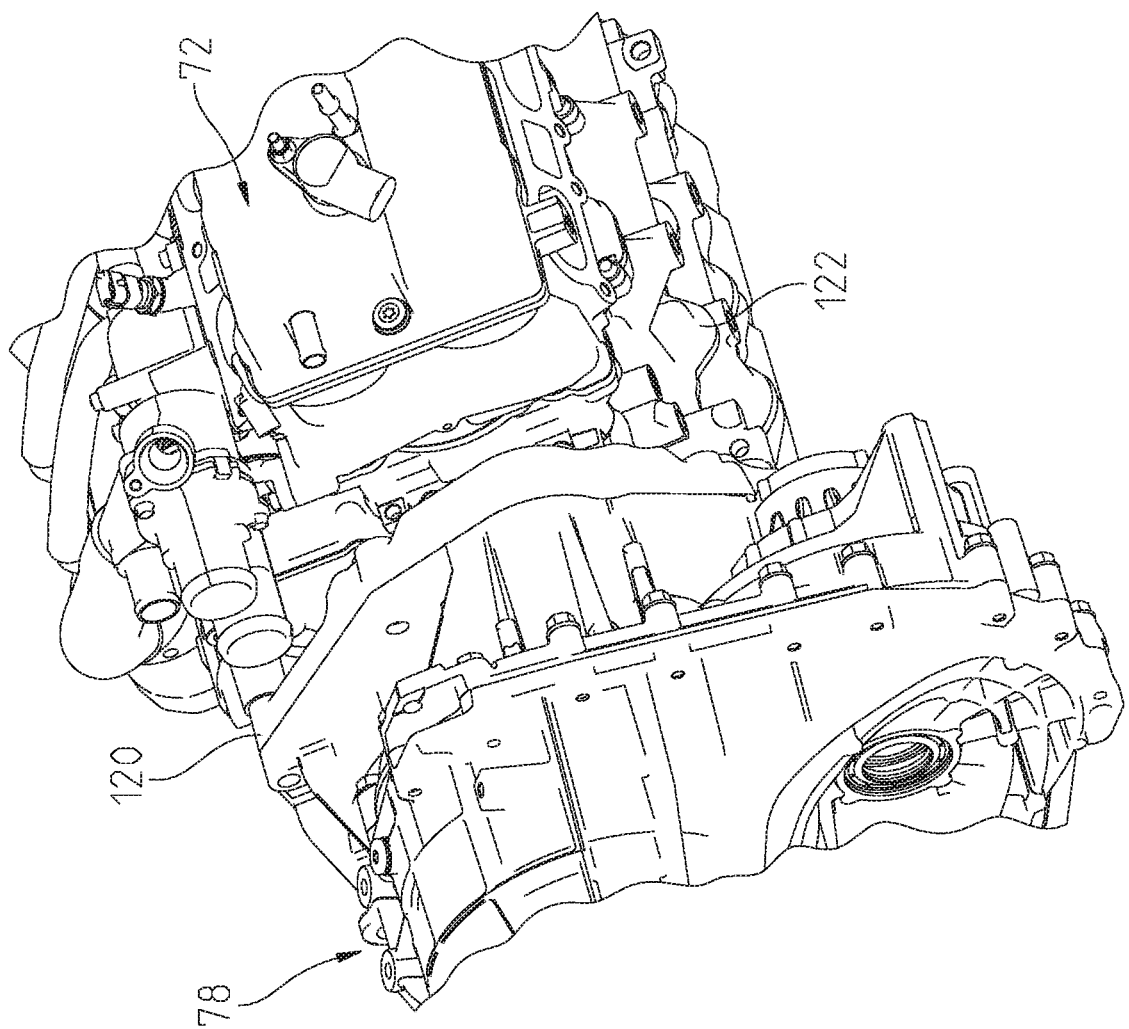
FIG. 23 shows an enlarged perspective view of an embodiment of a coupling between a transmission and an engine of the vehicle of FIG. 1.
Figure 24:
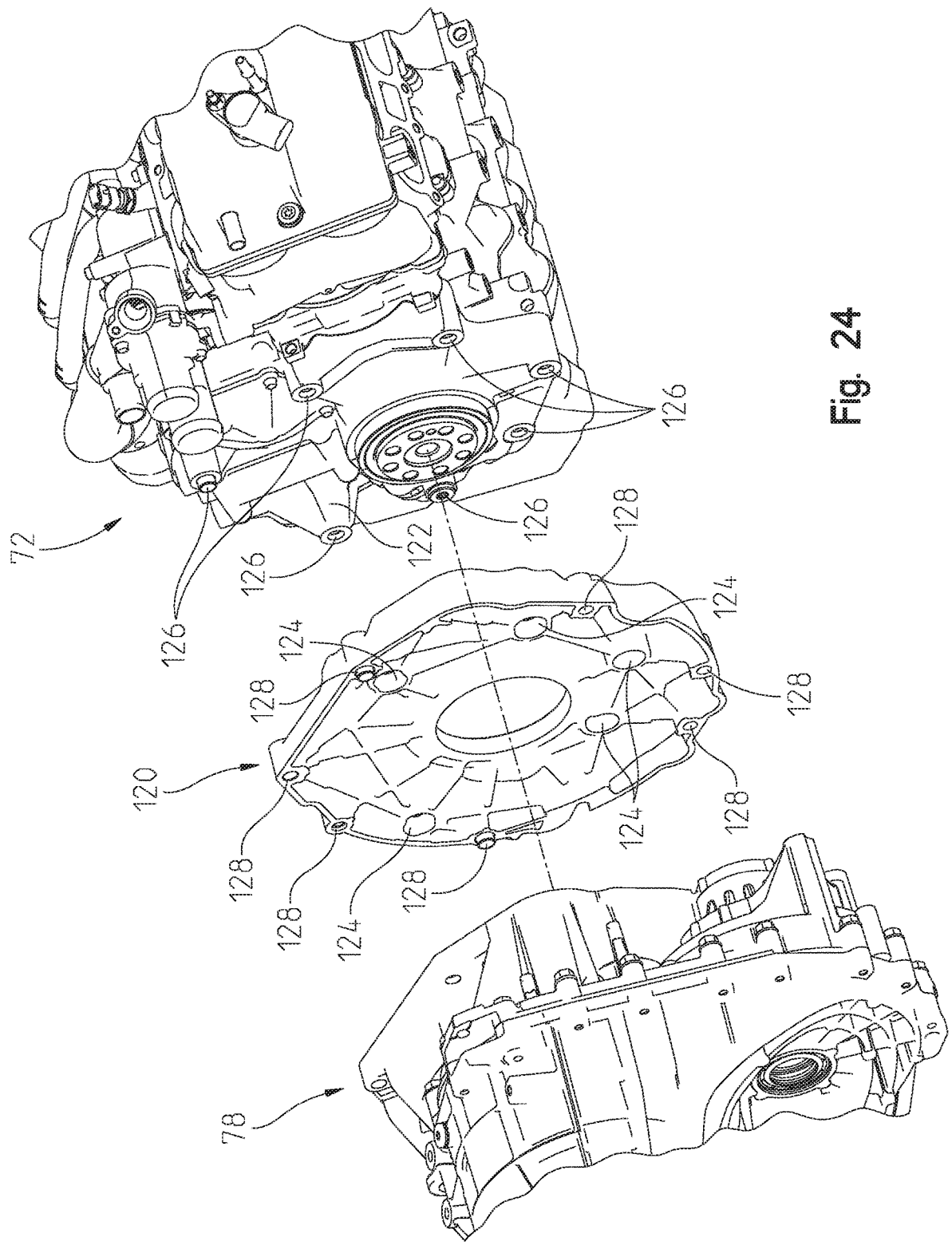
FIG. 24 shows an exploded view of the coupling between the transmission and the engine of FIG. 23.

Referring now to FIGS. 23-25B, engine 72 includes an engine block 122 configured to be coupled to the various embodiments of transmission 78 discussed above without alterations of engine block 122 itself. For example, in various embodiments, when transmission 78 is a steel belt CVT, powertrain 70 may further include an adapter plate 120 configured to couple transmission 78 to engine 72 such that adapter plate 120 is positioned between or intermediate transmission 78 and engine 72 (FIGS. 23 and 24). Adapter plate 120 allows engine block 122 of engine 72 to remain the same for coupling with each of the various embodiments of transmission 78 discussed above, and allows engine 72 to be positioned at any angle relative thereto. More particularly, adapter plate 120 generally includes a first set of openings 124 configured to align with openings 126 of engine 72 and a second set of openings 128 configured to align with openings (not shown) in transmission 78, where the openings in transmission 78 and openings 126 of engine 72 are not aligned. In this way, the unaligned openings 124, 128 allow for engine 72 and transmission 78 to be at any orientation relative to each other, which, for example, allows for compact packaging of various components of vehicle 10 relative to powertrain 70 and allows for proper output shaft and driveline orientations.

Referring to FIGS. 25A and 25B, crankshaft 83 of engine 72 may be provided in two different configurations to further allow engine block 122 to remain the same while being used for different transmission types. For example, in various embodiments and referring to FIG. 25A, crankshaft 83 may include a bolted pattern 130 at a first end 132 of crankshaft 83 for coupling to a steel belt CVT, while in other embodiments and referring to FIG. 25B, crankshaft 83* may include a tapered extension 134 at first end 132* of crankshaft 83* for coupling to a rubber belt CVT. Outside of differing first ends 132, 132*, crankshafts 83 and 83* are substantially the same. In various embodiments, such as FIG. 25B, a second end 136 of crankshaft 83, 83* may be tapered such that crankshaft 83, 83* may be coupled to an internal charging system (not shown), while in other various embodiments, such as FIG. 25A, second end 136 of crankshaft 83, 83* may be straight such that crankshaft 83, 83* may be coupled to a pulley (not shown). The internal charging system may be an internal stator configured to couple with the tapered second end 136 of crankshaft 83, 83* (FIG. 25B) or may be an externally mounted alternator driven by a crankshaft pulley and operably coupled to the straight second end 136 of crankshaft 83, 83* (FIG. 25A).

Figure 26:
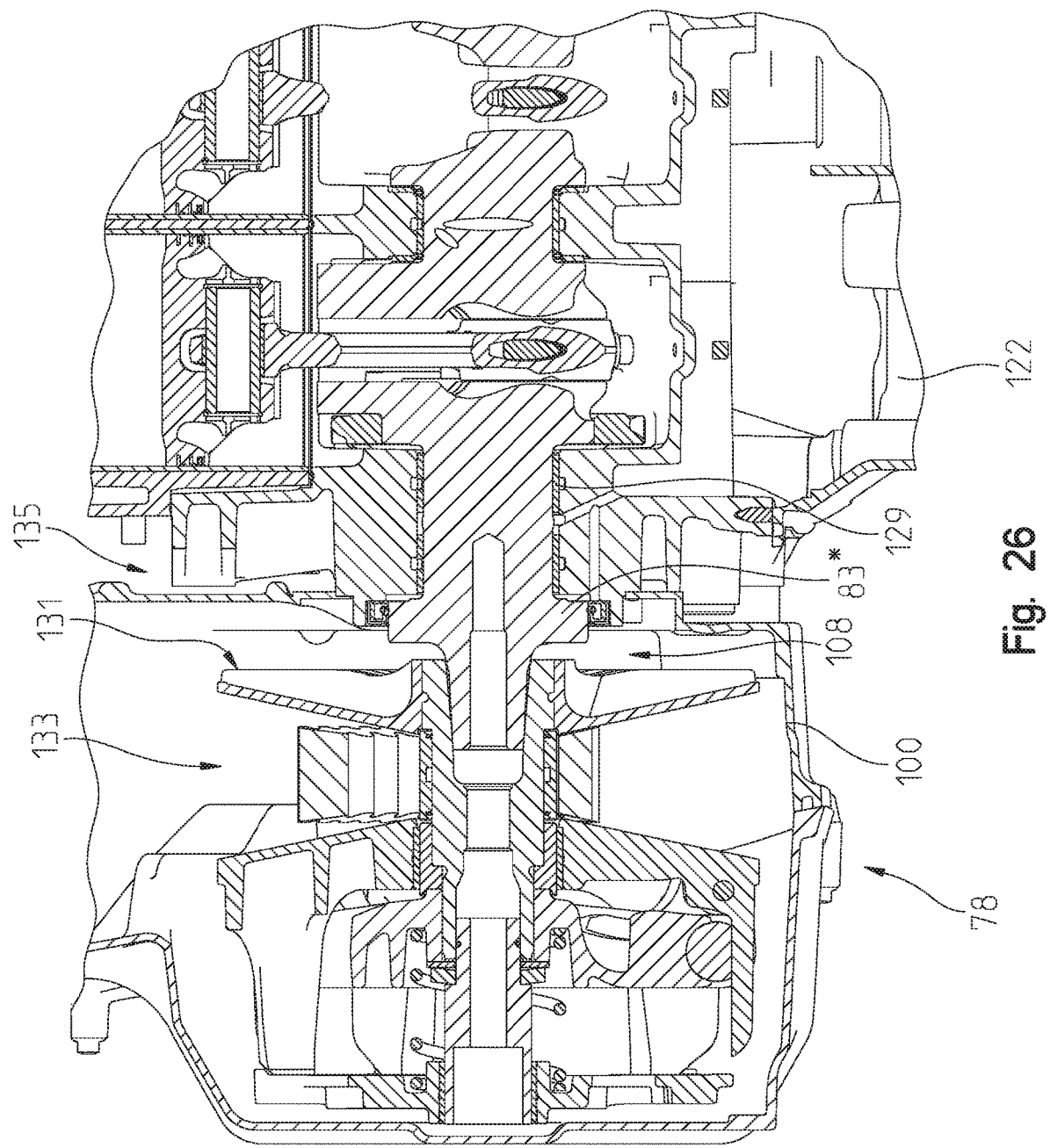
FIG. 26 shows a cross-sectional view of the powertrain of FIG. 15 taken along line 26-26 of FIG. 15.

With reference to FIGS. 25A, 25B, and 26, crankshaft 83, 83* includes two journal bearings 129, which extend along a length of crankshaft 83, 83* and allow for second inlet 108 of transmission housing 100 to provide air flow to a backside of transmission 78. For example, as shown in FIG. 26, a first journal bearing 129a, in addition to a second journal bearing 129b, allows spacing for second inlet 108 of transmission 78 to provide air to an inner surface 131 of a drive clutch 133 of transmission 78. More particularly, first journal bearing 129a in addition to second journal bearing 129b spaces apart housing 100 of transmission 78 from engine block 122 such that air may flow therebetween. Such air in the spacing between engine block 122 and housing 100 of transmission 78 cools at least inner surface 131 of the inner sheave of drive clutch 133. Spacing created by journal bearings 129 may provide additional air passages 135 between transmission housing 100 and engine block 122.

Figure 27:
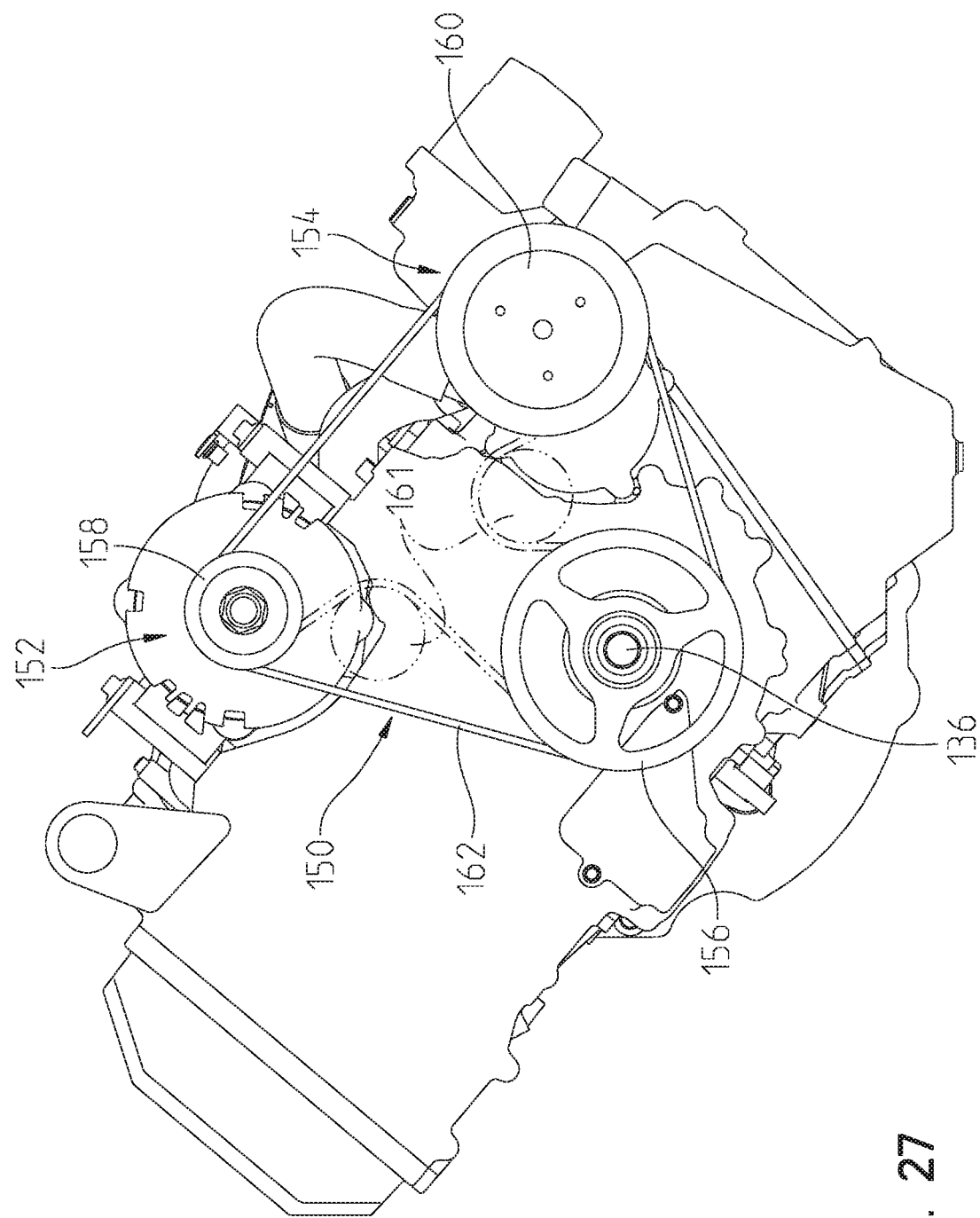
FIG. 27 shows a side plan view of a belt and pulley system of the present disclosure coupled to an engine of the vehicle of FIG. 1.
Figure 28:
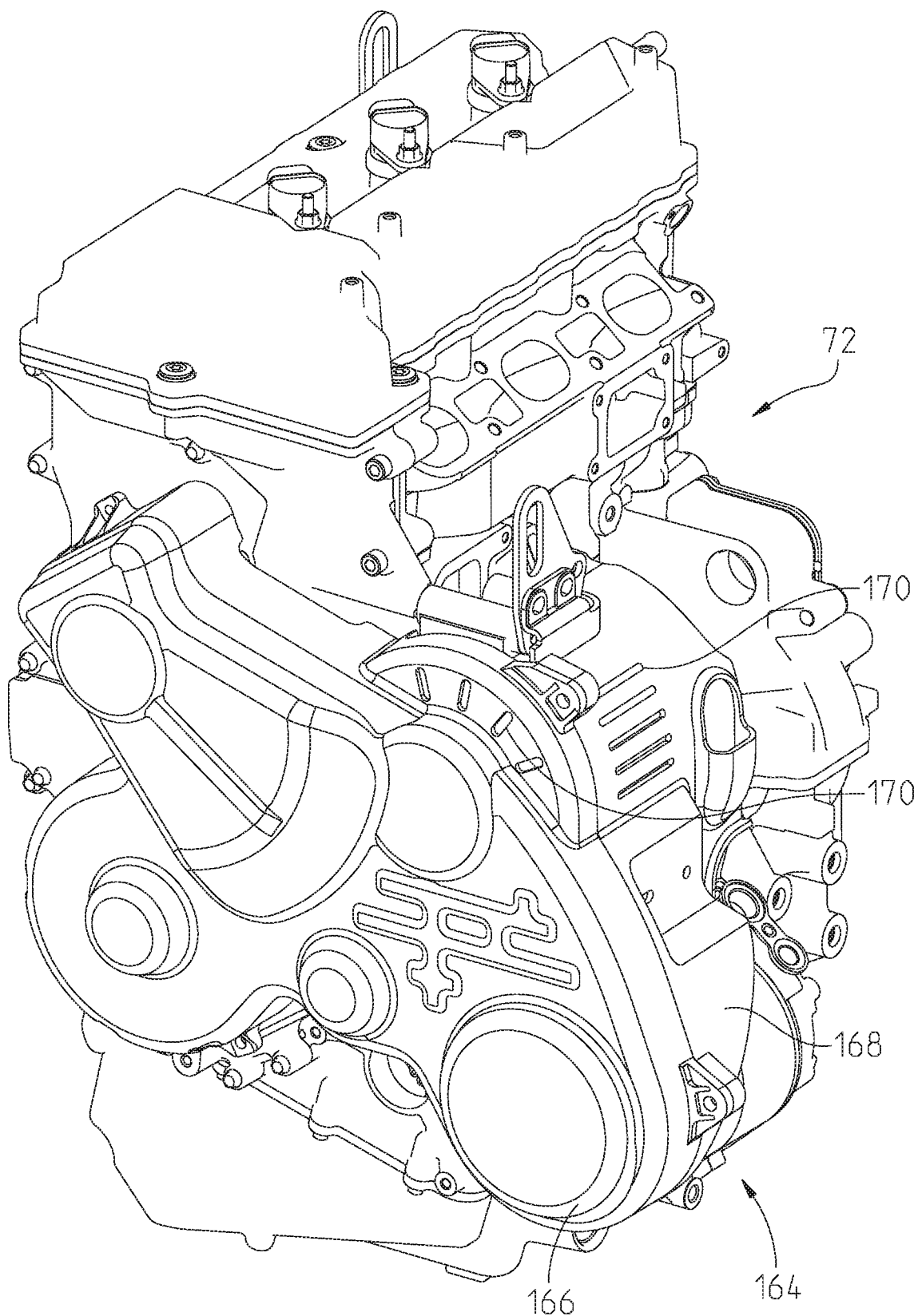
FIG. 28 shows a perspective view of the engine and the belt and pulley system of FIG. 27 with a cover positioned over the belt and pulley system.
Figure 29:
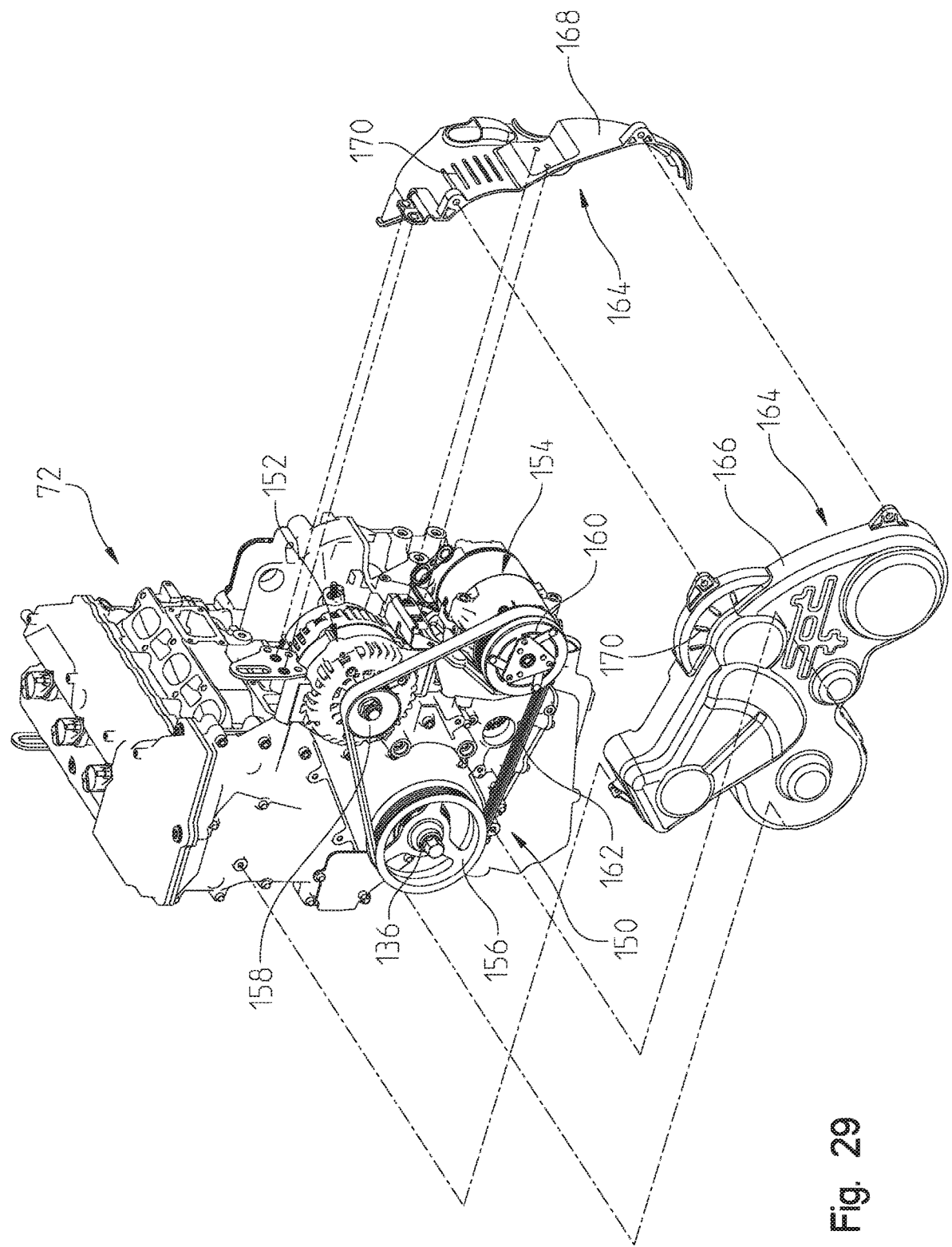
FIG. 29 shows an exploded view of the engine and the cover of FIG. 28.
Figure 30:
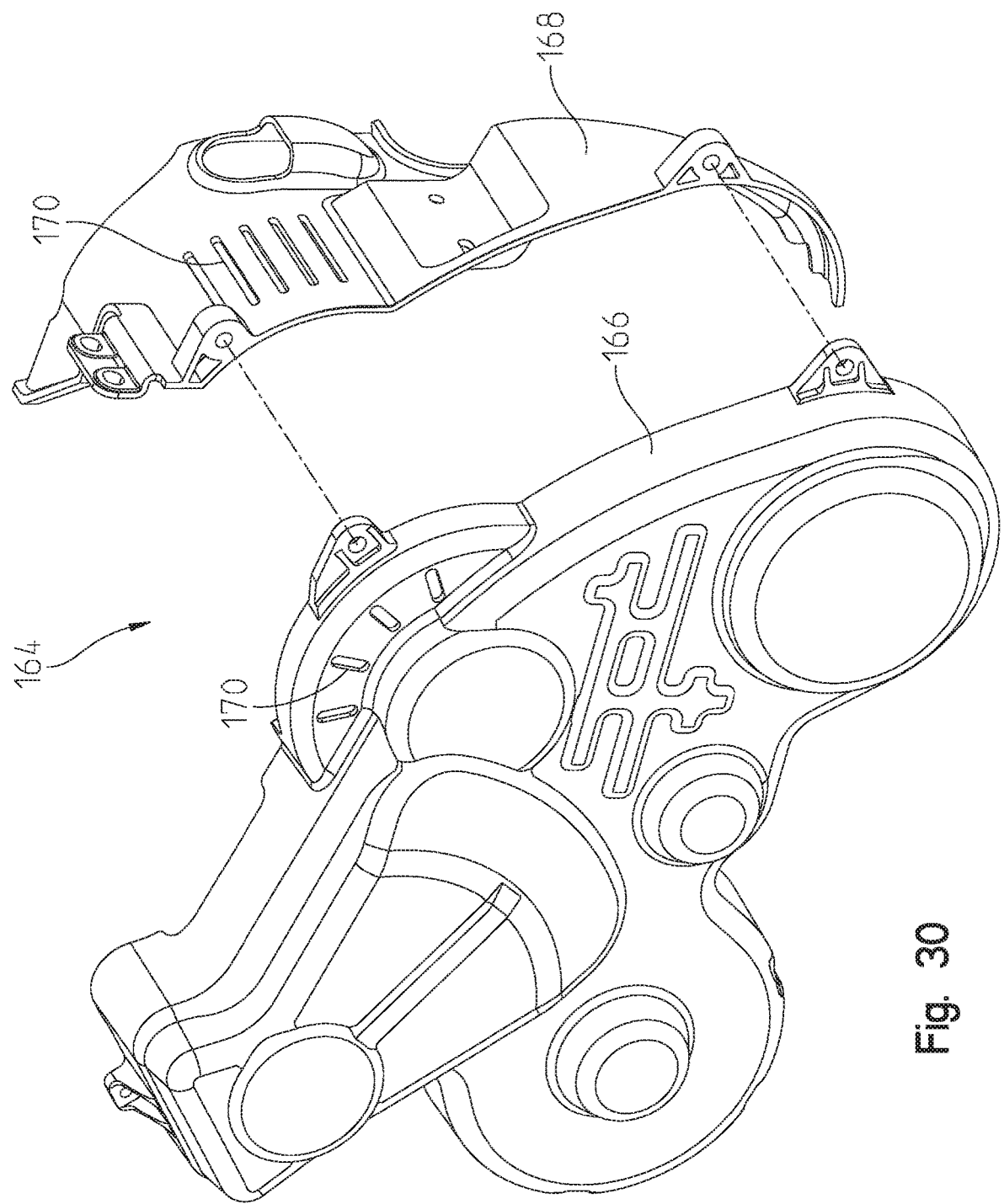
FIG. 30 shows an exploded view of the cover of FIG. 28.

Referring now to FIGS. 27-33, second end 136 of crankshaft 83 may be coupled to and drive at least one accessory component via a belt drive or belt and pulley system 150. The accessory component may include an alternator 152, a compressor 154, and/or a hydraulic pump (not shown). As shown in FIGS. 27 and 29, belt and pulley system 150 includes a first pulley 156 coupled to second end 136 of crankshaft 83, a second pulley 158 coupled to alternator 152, a third pulley 160 coupled to compressor 154, and a single stretch belt 162 coupled to each of first, second, and third pulleys 156, 158, and 160 such that rotation of first pulley 156 via crankshaft 83 drives second and third pulley 158 and 160 via belt 162. Belt and pulley system 150 may also include one, two, or more idler pulleys 161 and/or tensioners around which belt 162 may also rotate. In various embodiments, belt and pulley system 150 may be concealed by a cover 164 (FIGS. 28-30) to protect belt and pulley system 150 from debris. Cover 164 may include a first portion 166 and a second portion 168, where first portion 166 covers pulleys 156, 158, 160 and belt 162 and second portion 168 covers side portions of alternator 152 and compressor 154. First portion 166 and/or second portion 168 may include a plurality of openings 170 to allow air flow to/from belt and pulley system 150. In addition, in various embodiments, one of pulleys 156, 158, 160 may include a fan (not shown) to provide air flow to belt and pulley system 150.

Figure 31:
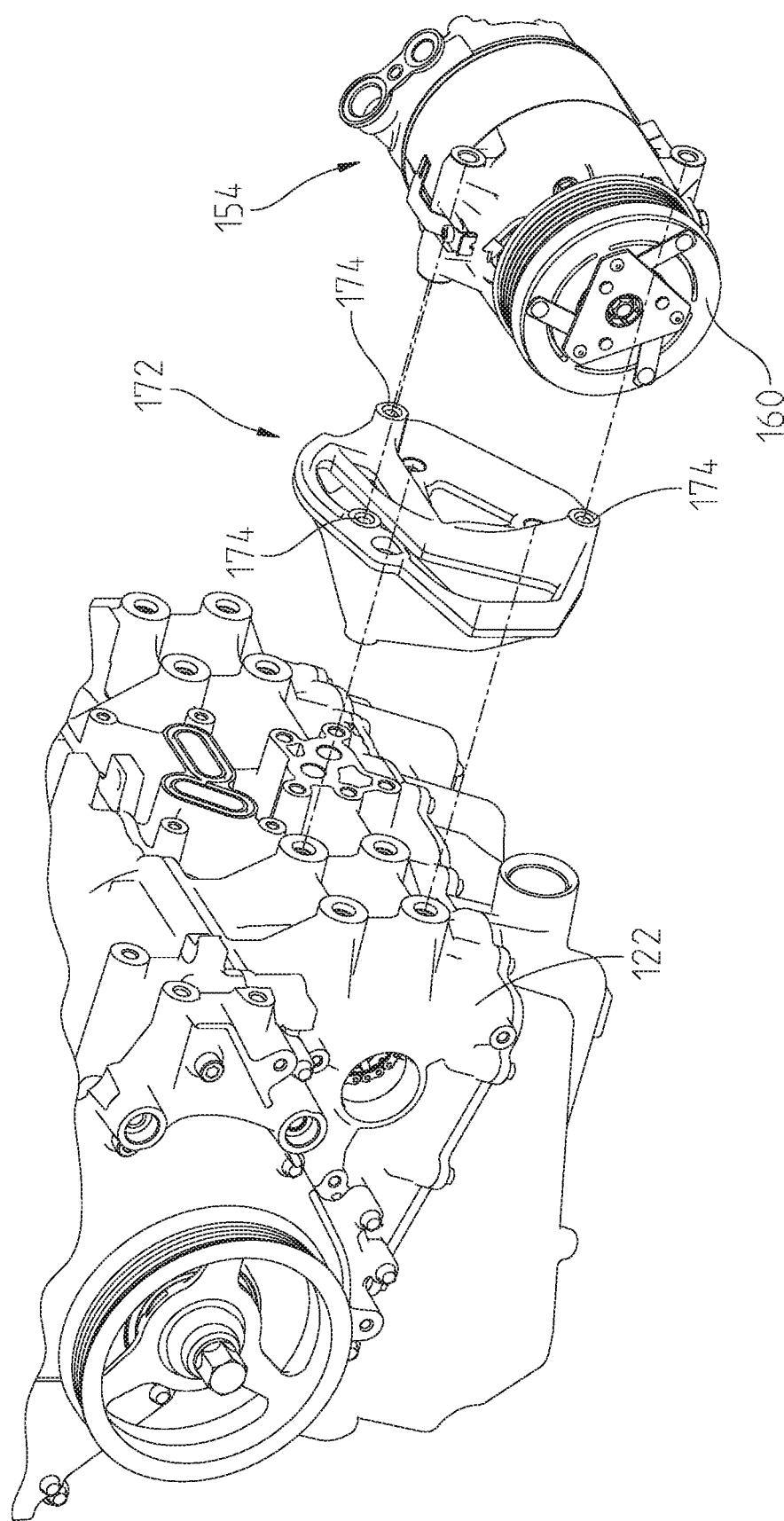
FIG. 31 shows an exploded view of a compressor and a first embodiment of a compressor mount of the present disclosure relative to an engine of the vehicle of FIG. 1.
Figure 32:
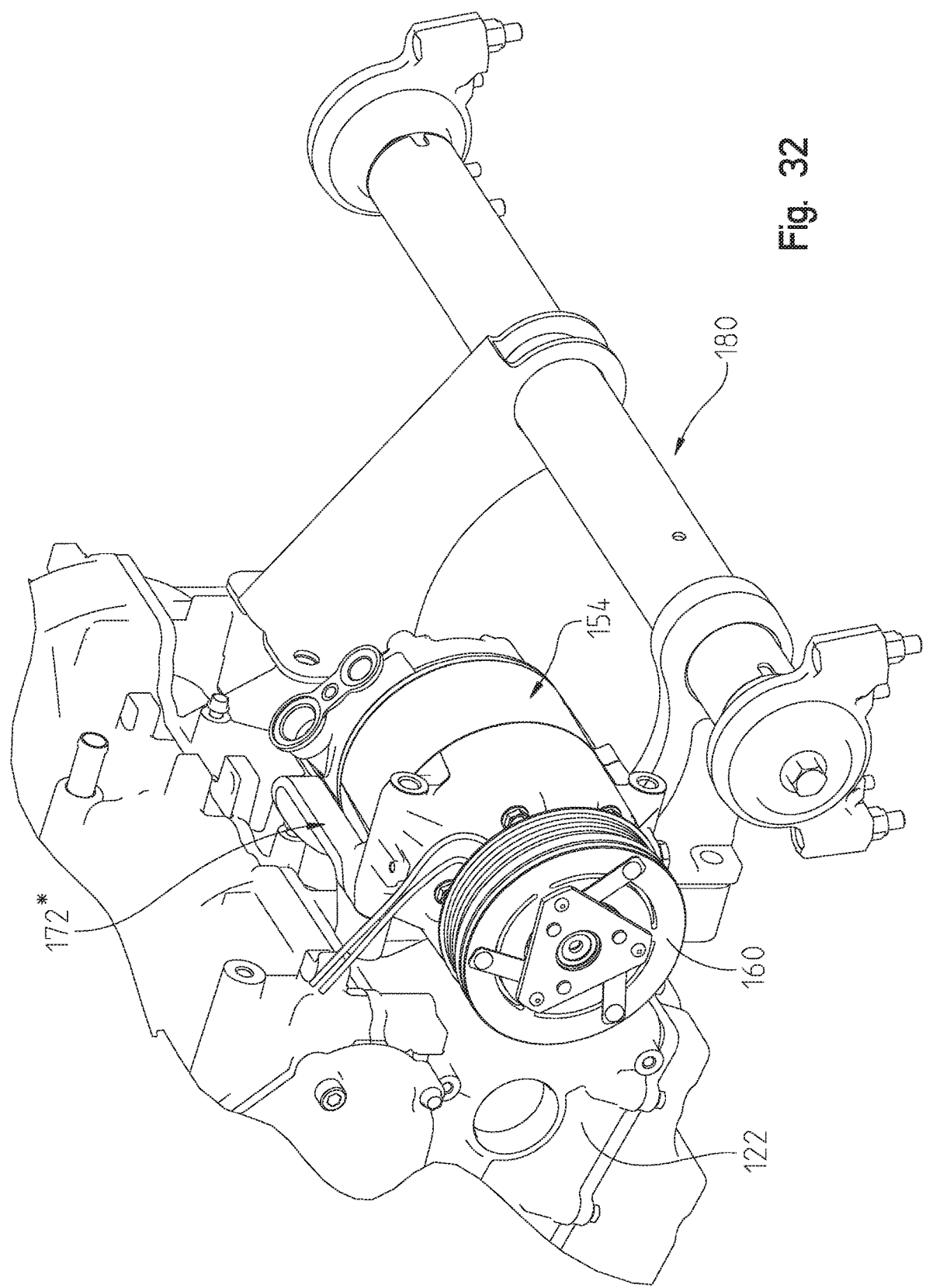
FIG. 32 shows a perspective view of a compressor and a second embodiment of a compressor mount of the present disclosure relative to an engine and an engine mount of the vehicle of FIG. 1.
Figure 33:
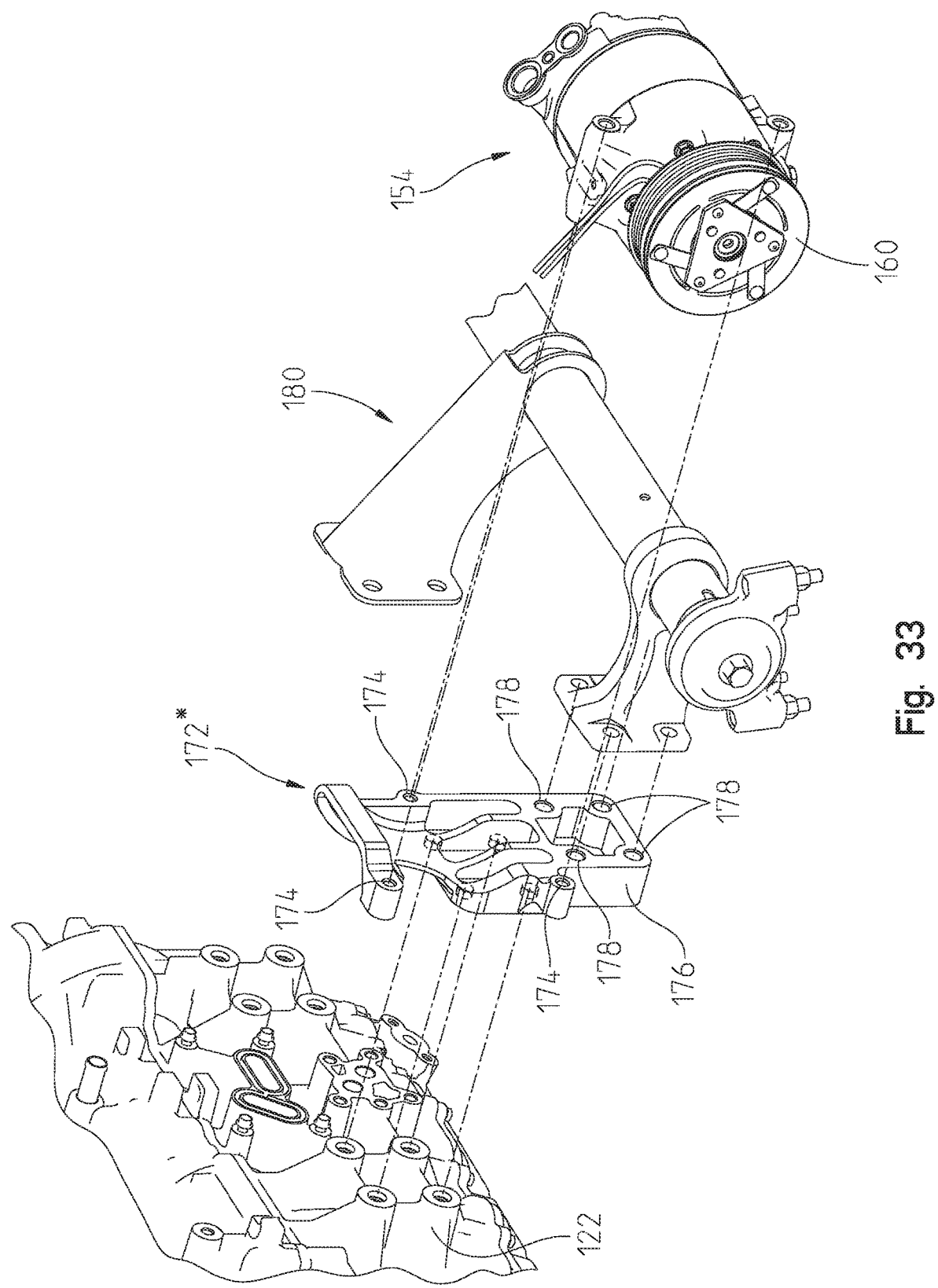
FIG. 33 shows an exploded view of the compressor, the second embodiment of the compressor mount, the engine, and the engine mount of FIG. 32.

With reference to FIGS. 31-33, while alternator 152 and/or compressor 154 may be coupled directly to engine block 122, in various embodiments, alternator 152 and/or compressor 154 may require a casting or engine mount 172 for proper coupling and/or packaging. For example, and as shown in FIGS. 31-33, compressor 154 may be coupled to engine block 122 via casting or engine mount 172. Casting 172 generally includes a plurality of openings 174 for coupling compressor 154 to casting 172 and casting 172 to engine block 122. In various embodiments, an alternative casting 172* may include an extension 176 having a plurality of openings 178 for coupling an engine mount 180 to engine block 122 and for mounting engine 72 to frame 20. Additional details relating to the mounting of alternator 152 and/or compressor 154 may be found in U.S. patent application Ser. No. 15/631,874, filed Jun. 23, 2017, the subject matter of which is incorporated herein by reference.

Figure 34:
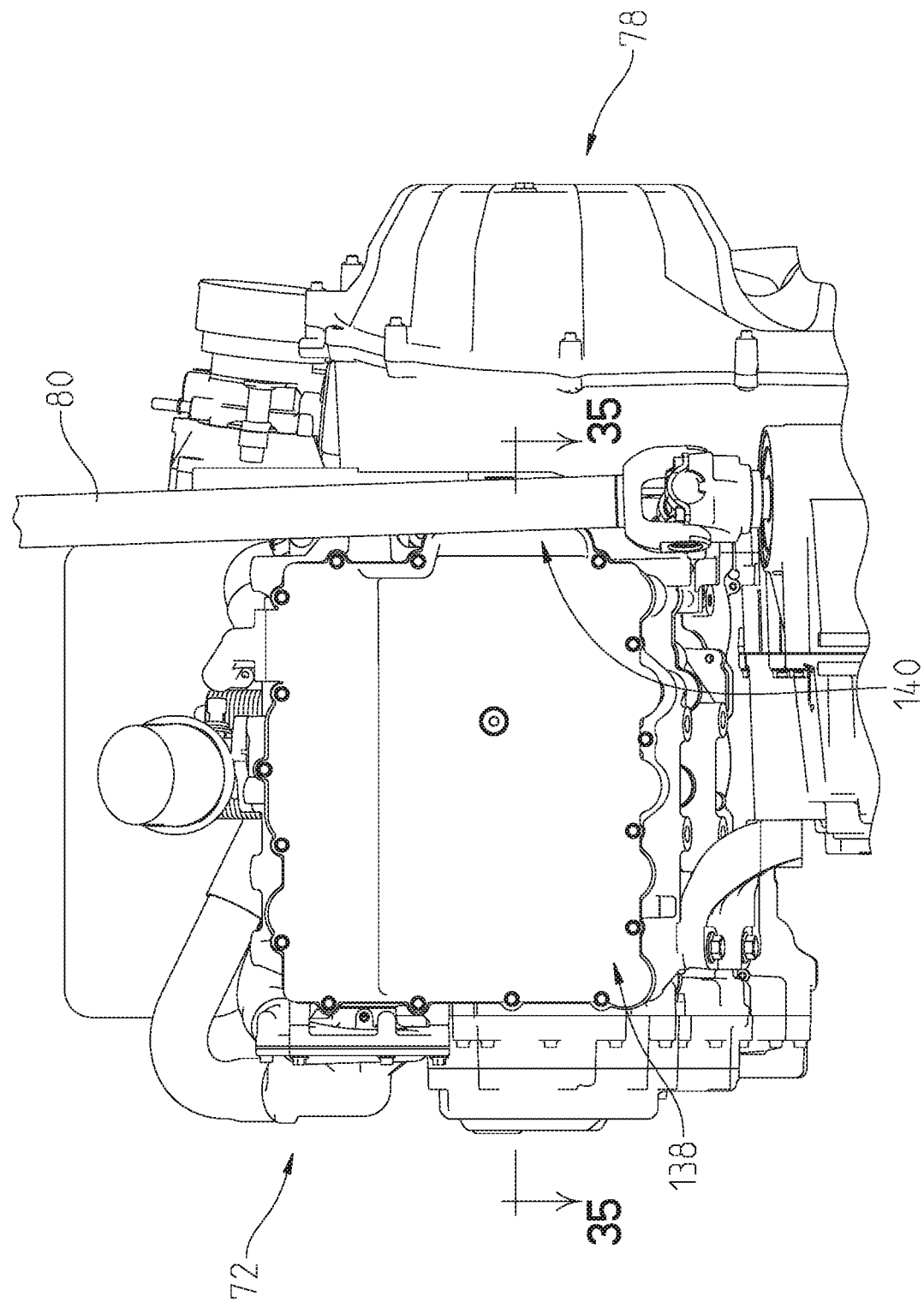
FIG. 34 shows a detailed bottom plan view of a drive shaft and an oil pan of an engine of the present disclosure.
Figure 35:
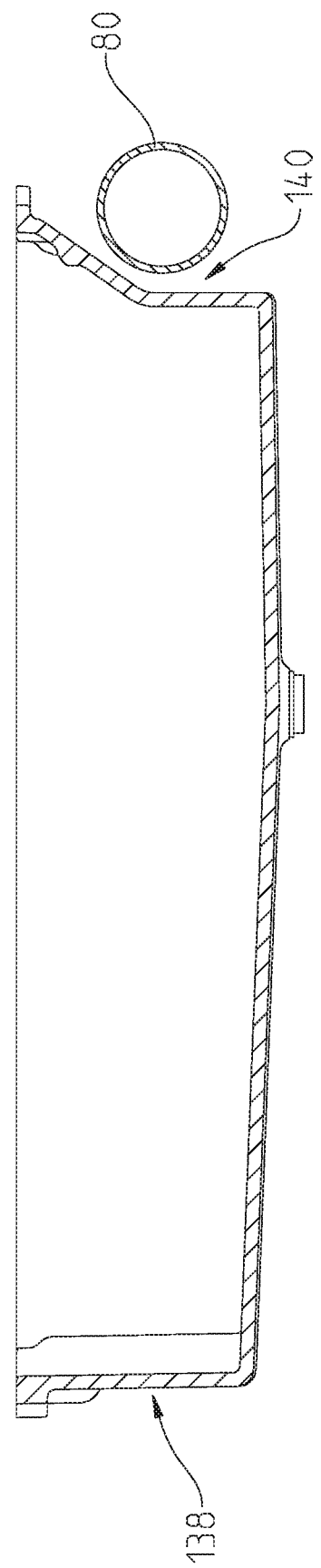
FIG. 35 shows a cross-sectional view of the drive shaft and the oil pan of FIG. 33 taken along line 35-35 of FIG. 34.
Figure 36:
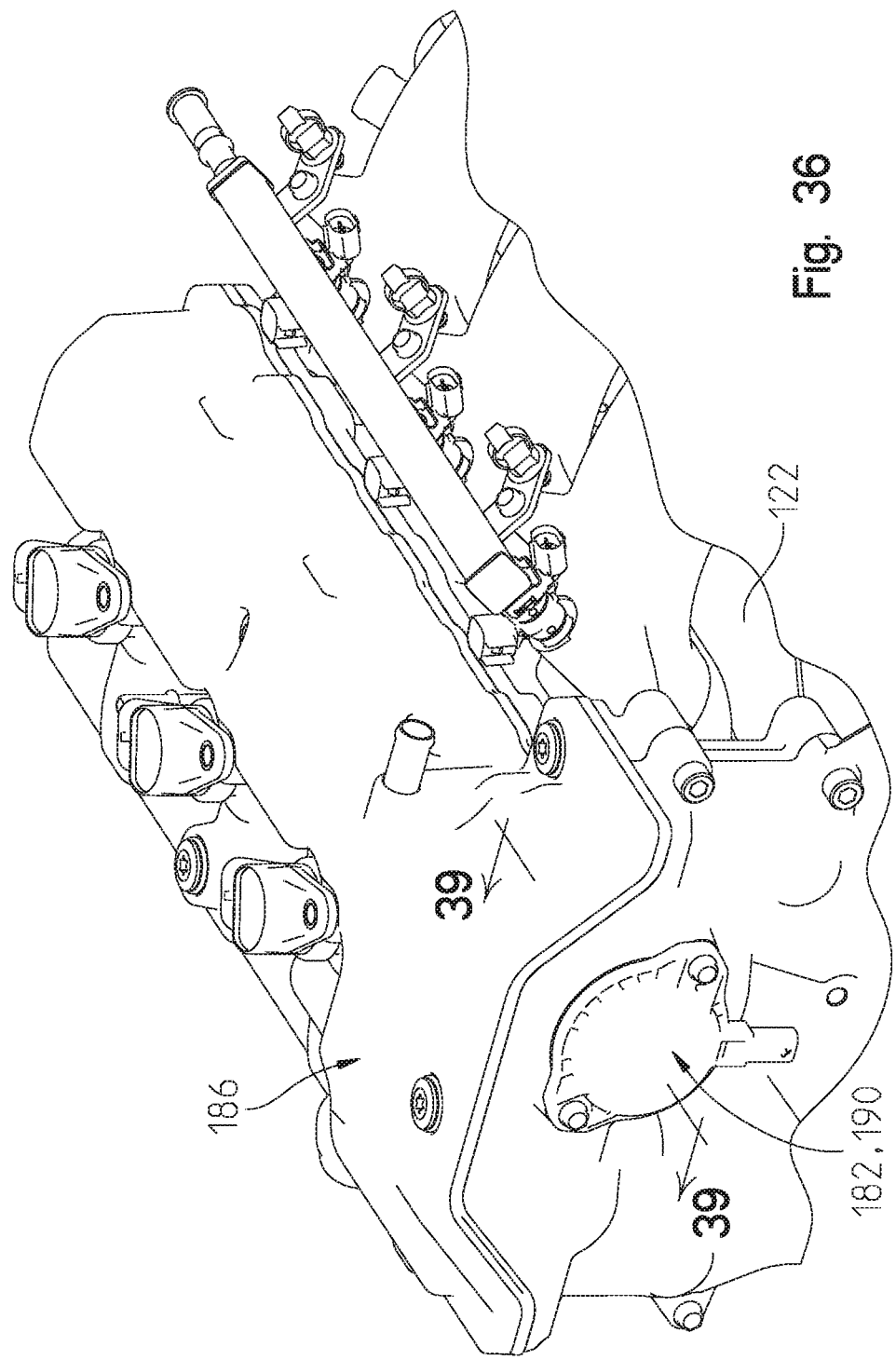
FIG. 36 shows an enlarged perspective view of a top of an engine of the present disclosure, where the engine includes a variable valve timing or phasing system protected by a cam cover.

Referring now to FIGS. 34 and 35, engine 72 may be adapted to allow for proper packaging of drive shaft 80 of the drivetrain. Specifically, an oil pan 138 of engine 72 may include a scalloped portion or cutout 140 such that drive shaft 80 can extend from engine 72 to couple with front ground engaging members 4 while remaining substantially parallel to a longitudinal axis of vehicle 2 and substantially aligned with an output shaft of the drivetrain (not shown).

Figure 37:
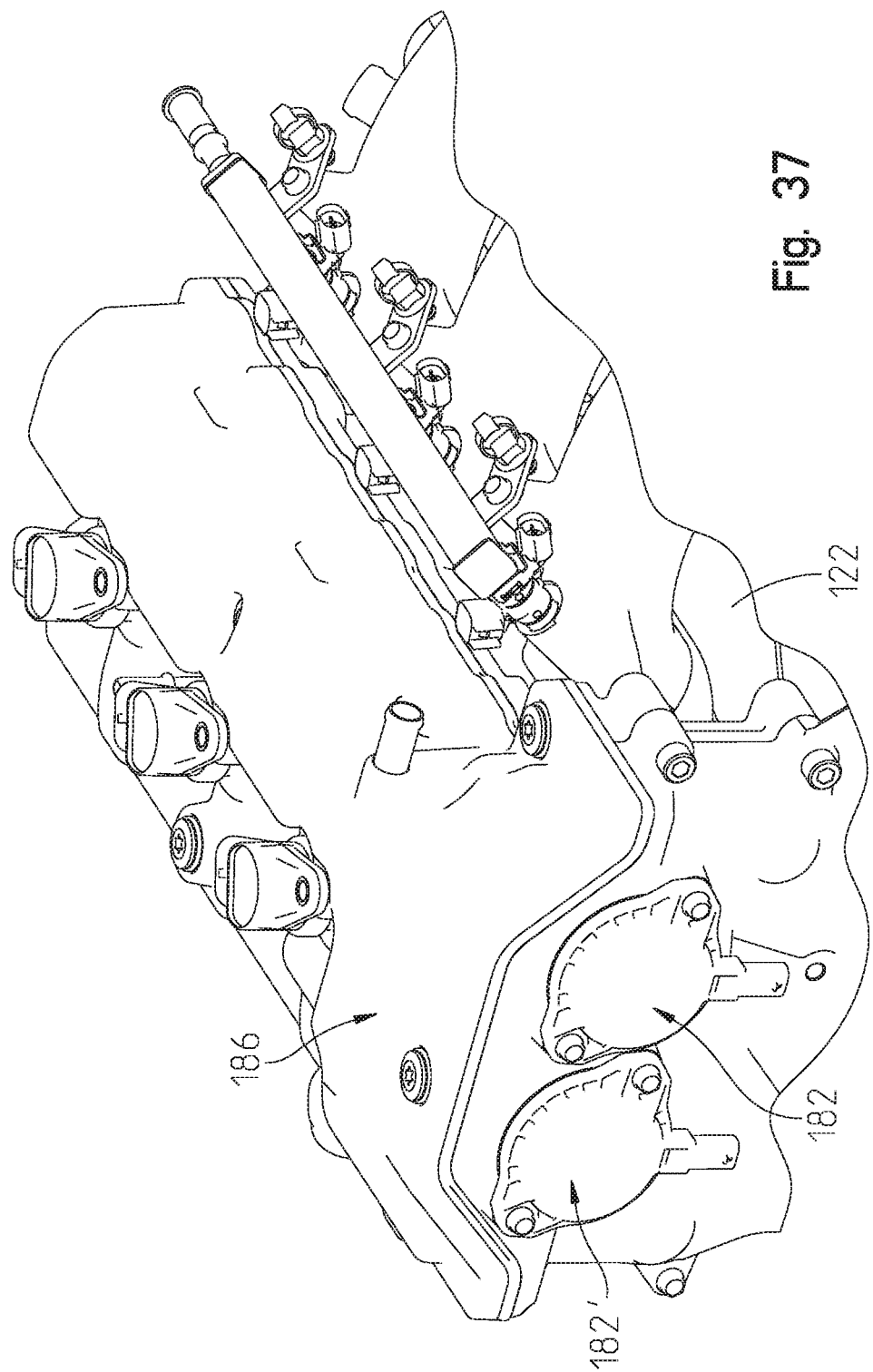
FIG. 37 shows an enlarged perspective view of a top of an engine of the present disclosure, where the engine includes a first variable valve timing or phasing system and a second variable valve timing or phasing system concealed by a cam cover.
Figure 38:
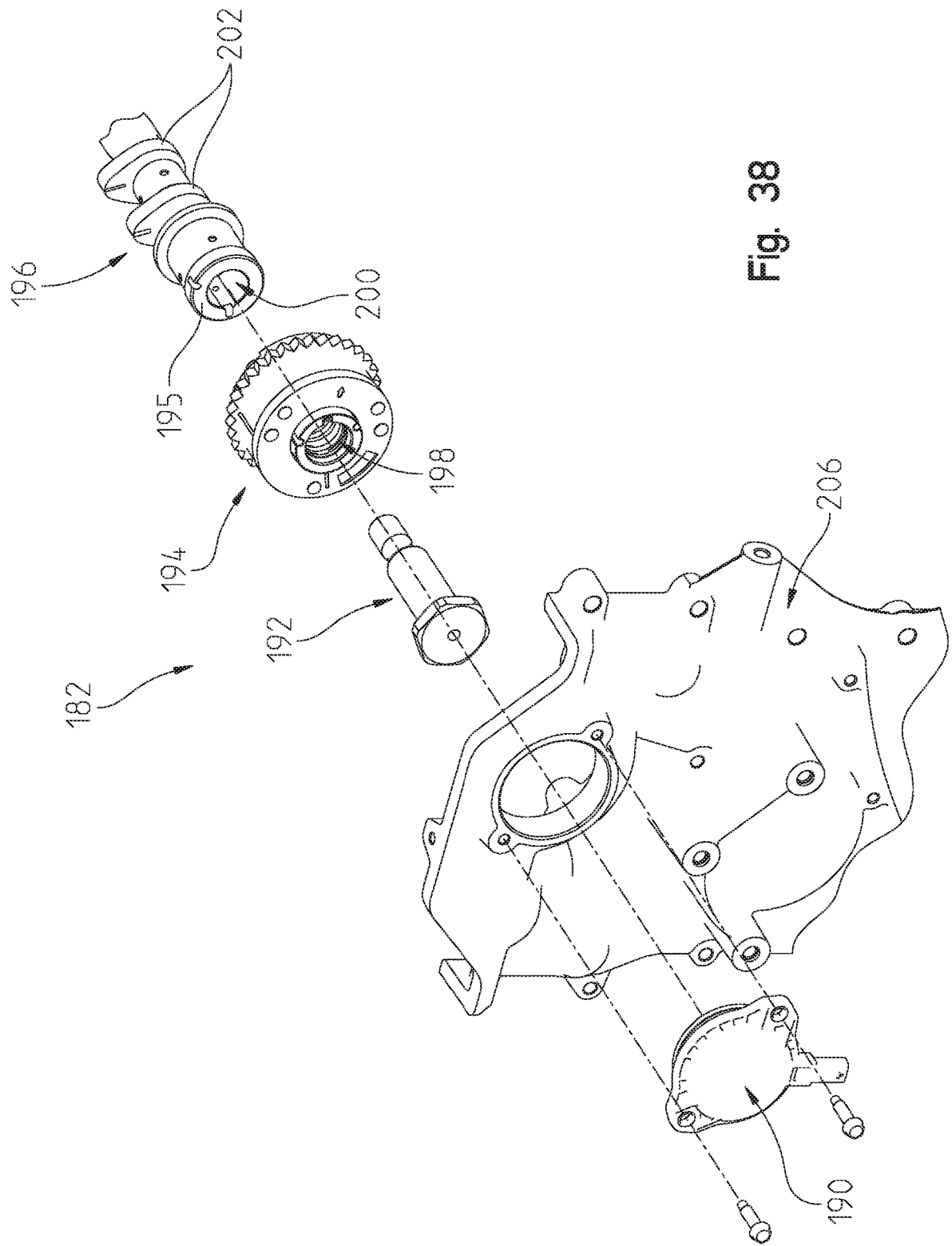
FIG. 38 shows an exploded view of the first variable valve timing or phasing system of FIG. 36, noting that the configuration of the second variable valve timing or phasing system may be identical or similar to that of the first variable valve timing or phasing system.
Figure 39:
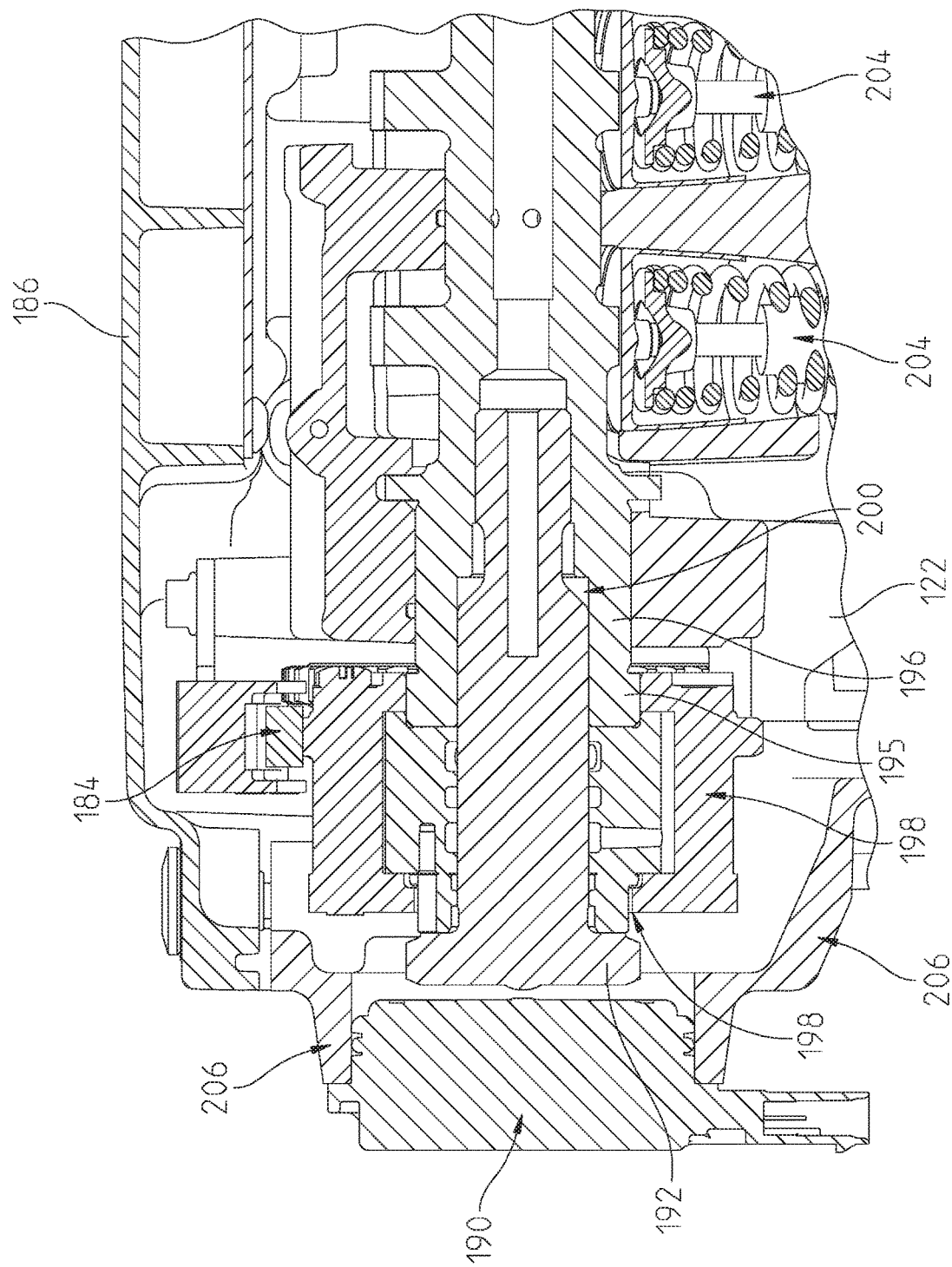
FIG. 39 shows a cross-sectional view of the first variable valve timing or phasing system and the engine of FIG. 36 taken along line 39-39 of FIG. 36.

With reference now to FIGS. 36-39, in various embodiments, engine 72 may include a variable valve timing or phasing system 182 operably coupled to crankshaft 83 via a belt or chain 184 (FIG. 39). Variable valve phasing system 182 is generally positioned atop engine block 122 above cylinders 82 and protected by a cam cover 186, however, variable valve phasing system 182 also may be positioned on a portion of engine block 122 at a position generally adjacent crankshaft 83. In various embodiments, engine 72 may include a second variable valve phasing system 182', where one of variable valve phasing system 182 and 182' is for the intake of engine 72 and the other of variable valve phasing system 182 and 182' is for the exhaust of engine 72 (FIG. 37). In this way, the timing of the engine intake and/or the engine exhaust may be phased or otherwise adjusted, relative to the rotation of crankshaft 83, based on various operating conditions and parameters of powertrain 70 and vehicle 2. Furthermore, in various embodiments, a sealing arrangement (not shown) may be positioned between cam cover 186 and engine block 122.

Variable valve phasing system 182 is operably coupled to an intake cam shaft 196 and generally includes an actuator assembly 190, a phaser control valve 192, and a phaser module 194. Phaser control valve 192 generally extends through a central opening 198 in phaser module 194 and into a central opening 200 in intake cam shaft 196. Phaser module 194 couples with a portion 195 of intake cam shaft 196 such that intake cam shaft 196 may be decoupled from crankshaft 83. Intake cam shaft 196 includes lobes 202 configured to actuate valves 204 of engine 72. In various embodiments, actuator assembly 190 is supported by an engine cover 206 coupled to engine block 122, while in other various embodiments, actuator assembly 190 may be remote to engine block 122 and/or engine cover 206. When actuator assembly 190 is supported by engine cover 206, the sealing arrangement and cam cover 186 may be coupled over a portion of engine cover 206 in addition to engine block 122. Further details relating to the variable valve phasing system may be found in U.S. patent application Ser. No. 16/174,849, filed Oct. 30, 2018, the subject matter of which is incorporated herein by reference.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

The invention claimed is:

1. A utility vehicle, comprising:
a frame;
a body supported by the frame;
a seating area supported by the frame;
front and rear ground engaging members supporting the frame and the body; and
a powertrain drivingly coupled to the front and rear ground engaging members, the powertrain comprising a transmission and an engine having at least three cylinders, an intake comprising an intake manifold, a throttle body, and an exhaust, wherein at least one of the intake and throttle body are positioned longitudinally intermediate a forwardmost point of the at least three cylinders and the seating area, at least a portion of the intake manifold is positioned longitudinally rearwardly of a forwardmost portion of the at least three cylinders, and the exhaust is positioned longitudinally rearward of the engine.

2. The utility vehicle of claim 1, wherein the exhaust extends over at least a portion of the transmission.

3. The utility vehicle of claim 1, wherein the transmission includes an exhaust, the exhaust of the transmission is configured to pass air over at least a portion of the exhaust of the engine.

4. The utility vehicle of claim 3, wherein the powertrain further includes a turbocharger, and the exhaust of the transmission is configured to pass air over the turbocharger.

5. The utility vehicle of claim 4, wherein the turbocharger is positioned longitudinally rearward of the engine.

6. The utility vehicle of claim 1, wherein the intake of the engine includes an intake manifold, the intake manifold being positioned behind the seating area and forward of the engine.

7. The utility vehicle of claim 1, wherein the transmission includes a continuously variable transmission having an exhaust and a gear set coupled to the continuously variable transmission, wherein the exhaust of the transmission is configured to pass air over the gear set.

8. The utility vehicle of claim 1, wherein the at least three cylinders are aligned from a first side of the utility vehicle of a second side of the vehicle along in a direction perpendicular to a longitudinal axis of the utility vehicle.

9. A utility vehicle, comprising:
a frame;
a body supported by the frame;
a seating area supported by the frame;
front and rear ground engaging members supporting the frame and the body;
a powertrain drivingly coupled to the front and rear ground engaging members, the powertrain comprising a transmission and an engine having at least three cylinders, an intake having an intake port, and an exhaust, wherein the intake port is positioned between the seating area and the engine, the engine is positioned between the intake and the exhaust, and the exhaust is positioned between the engine and a rear of the utility vehicle;

the exhaust includes an exhaust manifold and a muffler and the powertrain further includes a turbocharger, the turbocharger being positioned between the exhaust manifold and the muffler and rearward of the engine; and the engine, the exhaust, and the turbocharger are positioned completely rearwardly of the seating area.

10. The utility vehicle of claim 9, wherein the intake includes an intake manifold, and the transmission is positioned rearward of at least a portion of the intake manifold and forward of the muffler.

11. The utility vehicle of claim 9, wherein the intake includes an intake manifold, the intake manifold being positioned rearward of the seating area and forward of the engine.

12. The utility vehicle of claim 9, wherein the intake, the engine, and the exhaust are positioned rearward of the seating area.

13. The utility vehicle of claim 9, wherein the intake further includes an intake manifold and the intake manifold is positioned forwardly of the engine.

14. The utility vehicle of claim 9, wherein the transmission includes an exhaust, the exhaust of the transmission is configured to pass air over at least one of a portion of the exhaust of the engine, a shiftable transmission, and a turbocharger.

15. The utility vehicle of claim 9, further including a throttle body fluidly coupled to the engine, the throttle body positioned forward of an engine centerline.

16. A utility vehicle, comprising:
a frame;
a body supported by the frame;
a seating area supported by the frame;
front and rear ground engaging members supporting the frame and the body; and
a powertrain drivingly coupled to the front and rear ground engaging members, the powertrain comprising a transmission and an engine having at least three cylinders, the engine comprising an engine centerline, an intake, and an exhaust, wherein the intake is positioned longitudinally forward of the engine and the exhaust is positioned longitudinally rearward of the engine and extends over at least a portion the transmission, and the exhaust comprises an exhaust port comprising a face, and the face extends non-parallel to the engine centerline.

17. The utility vehicle of claim 16, wherein the exhaust includes an exhaust manifold and a muffler and the powertrain further includes a turbocharger, the turbocharger being positioned between the exhaust manifold and the muffler and rearward of the engine.

18. The utility vehicle of claim 1, wherein the intake and throttle body are positioned forward of the transmission.

19. The utility vehicle of claim 1, wherein the seating area comprises at least one seat, and the throttle body and the intake are positioned rearwardly of the forwardmost point of the rearward most seat.

20. The utility vehicle of claim 16, wherein the engine centerline and a line extending orthogonal to the face create an angle less than 90 degrees.

21. The utility vehicle of claim 16, wherein the exhaust port is angled upwardly such that a lower surface of the exhaust port extends out further relative to the engine centerline than an upper surface of the exhaust port.

22. A utility vehicle, comprising:
a frame;
a body supported by the frame;
a seating area supported by the frame;
front and rear ground engaging members supporting the frame and the body;
a powertrain drivingly coupled to the front and rear ground engaging members, the powertrain comprising a transmission and an engine having at least three cylinders, an intake, and an exhaust, wherein the intake is positioned between the seating area and the engine, the engine is positioned between the intake and the exhaust, and the exhaust is positioned between the engine and a rear of the utility vehicle;
the exhaust includes an exhaust manifold and a muffler and the powertrain further includes a turbocharger, the turbocharger being positioned between the exhaust manifold and the muffler and rearward of the engine; and
the transmission includes an exhaust, the exhaust of the transmission is configured to pass air over at least one of a portion of the exhaust of the engine, a shiftable transmission, and a turbocharger.

23. The utility vehicle of claim 1, wherein the exhaust is positioned entirely rearwardly of the engine.

24. The utility vehicle of claim 1, wherein the intake is positioned entirely forwardly of the engine.

* * * * *